US012773712B2

(12) United States Patent
Jäger et al.

(10) Patent No.: US 12,773,712 B2
(45) Date of Patent: *Oct. 27, 2026

(54) TREATMENT STATION, TREATMENT UNIT AND METHOD FOR TREATING WORKPIECES

(71) Applicant: Dürr Systems AG, Bietigheim-Bissingen (DE)

(72) Inventors: Tobias Jäger, Karlsruhe (DE); Michael Lauer, Bietigheim-Bissingen (DE); Marek Downar, Ditzingen (DE); Klaus Heinsohn, Weil der Stadt (DE); Oliver Seyboth, Hemmingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/920,450

(22) PCT Filed: Jun. 30, 2021

(86) PCT No.: PCT/DE2021/100554

§ 371 (c)(1),
(2) Date: Oct. 21, 2022

(87) PCT Pub. No.: WO2022/002312

PCT Pub. Date: Jan. 6, 2022

(65) Prior Publication Data

US 2023/0158537 A1 May 25, 2023

(30) Foreign Application Priority Data

Jul. 1, 2020 (DE) ..................... 10 2020 208 248.0

(51) Int. Cl.
*B05C 3/109* (2006.01)
*B05C 11/10* (2006.01)
(Continued)

(52) U.S. Cl.
CPC .............. *B05C 3/109* (2013.01); *B05C 11/10* (2013.01); *B05D 1/18* (2013.01); *B05D 3/10* (2013.01); *B08B 3/14* (2013.01)

(58) Field of Classification Search
None
See application file for complete search history.

(56) References Cited

U.S. PATENT DOCUMENTS 3,945,900 A * 3/1976 Klinkowski ........... C25D 13/24 204/639
4,333,485 A 6/1982 Karlsson et al.
(Continued)

FOREIGN PATENT DOCUMENTS

AT 403021 B 10/1997
CN 210545958 U 5/2020
(Continued)

OTHER PUBLICATIONS

JP H061261 Y2, Surface Treatment Equipment (Year: 1994).*
(Continued)

*Primary Examiner* — Cristi J Tate-Sims
(74) *Attorney, Agent, or Firm* — Hanley, Flight & Zimmerman, LLC

(57) ABSTRACT

In order to provide a device and a method for treating workpieces (102), in which an optimized workpiece treatment is possible, it is proposed that a treatment station (114) comprise a treatment chamber (136) that can be flooded for workpiece treatment.

15 Claims, 24 Drawing Sheets

(51) Int. Cl.

| | |
|---|---|
| ***B05D 1/18*** | (2006.01) |
| ***B05D 3/10*** | (2006.01) |
| ***B08B 3/14*** | (2006.01) |

(56) References Cited

U.S. PATENT DOCUMENTS

| | | | | |
|---|---|---|---|---|
| 5,100,516 | A * | 3/1992 | Nishimura | C25D 17/28 204/198 |
| 5,268,036 | A | 12/1993 | Neubauer et al. | |
| 5,296,031 | A | 3/1994 | Seiler | |
| 5,551,461 | A | 9/1996 | St. Martin | |
| 5,686,148 | A | 11/1997 | Suzuki | |
| 5,693,149 | A | 12/1997 | Passer et al. | |
| 10,081,037 | B2 * | 9/2018 | Käske | B08B 3/04 |
| 2001/0035126 | A1 | 11/2001 | Nonomura et al. | |
| 2003/0213177 | A1 | 11/2003 | Fitzgibbon et al. | |
| 2003/0213429 | A1 * | 11/2003 | Kreuzer | B65G 49/0459 198/377.02 |
| 2005/0104488 | A1 | 5/2005 | Hunt et al. | |
| 2009/0117283 | A1 | 5/2009 | Herre et al. | |
| 2009/0178696 | A1 | 7/2009 | Kaske | |
| 2011/0088726 | A1 | 4/2011 | Käske | |
| 2011/0165833 | A1 | 7/2011 | Schaefer | |
| 2012/0012537 | A1 * | 1/2012 | DeCoster | C02F 1/325 250/435 |
| 2012/0097099 | A1 * | 4/2012 | Roeckle | B65G 49/0463 118/423 |
| 2014/0021054 | A1 | 1/2014 | Robbin | |
| 2014/0202497 | A1 | 7/2014 | Kreis et al. | |
| 2017/0072419 | A1 | 3/2017 | Meissner | |
| 2018/0169689 | A1 | 6/2018 | Doll et al. | |
| 2018/0169717 | A1 | 6/2018 | David et al. | |
| 2018/0230576 | A1 | 8/2018 | Balsone | |
| 2019/0017939 | A1 | 1/2019 | Kim | |
| 2019/0176182 | A1 | 6/2019 | Andersen et al. | |
| 2024/0033769 | A1 * | 2/2024 | Jäger | B08B 9/093 |

FOREIGN PATENT DOCUMENTS

| | | | |
|---|---|---|---|
| DE | 1928642 | U | 12/1965 |
| DE | 3022609 | A1 | 1/1981 |
| DE | 4001721 | A1 | 7/1990 |
| DE | 9216954 | U1 | 4/1993 |
| DE | 4220927 | A1 | 1/1994 |
| DE | 4244693 | A1 | 1/1994 |
| DE | 19514478 | A1 | 10/1995 |
| DE | 10047968 | A1 | 4/2002 |
| DE | 10354165 | B3 | 11/2004 |
| DE | 102006039715 | A1 | 2/2008 |
| DE | 102008036322 | A1 | 2/2010 |
| DE | 102011082789 | A1 | 3/2013 |
| DE | 102012200612 | A1 | 3/2013 |
| DE | 102013203059 | A1 | 8/2014 |
| DE | 102015102494 | A1 | 8/2016 |
| DE | 102015116196 | B3 * | 2/2017 |
| DE | 102015215728 | A1 | 2/2017 |
| DE | 102017107389 | A1 | 10/2018 |
| DE | 102017127946 | A1 | 1/2019 |
| EP | 0146437 | A1 | 6/1985 |
| EP | 0543322 | B1 | 5/1993 |
| EP | 0650775 | A1 | 5/1995 |
| EP | 2345483 | A1 | 7/2011 |
| EP | 2678256 | B1 | 12/2014 |
| EP | 2977116 | A1 | 1/2016 |
| EP | 3354352 | A1 | 8/2018 |
| GB | 1419103 | A | 12/1975 |
| JP | S5649998 | B2 | 12/1974 |
| JP | S60223717 | A | 11/1985 |
| JP | S61143683 | U | 9/1986 |
| JP | H01119378 | A | 5/1989 |
| JP | H061261 | Y2 | 1/1994 |
| JP | H06170343 | A | 6/1994 |
| JP | H07169730 | A | 7/1995 |
| JP | H11197584 | A | 9/1999 |
| JP | 2003328145 | A | 11/2003 |
| JP | 2014109036 | A | 6/2014 |
| JP | 2016128169 | A | 7/2016 |
| JP | 2018162511 | A | 10/2018 |
| SE | 446887 | B | 10/1986 |
| WO | 2009144073 | A2 | 12/2009 |
| WO | 2017162636 | A1 | 9/2017 |

OTHER PUBLICATIONS

International Searching Authority, “International Search Report,” issued in connection with International Patent Application No. PCT/DE2021/100554, mailed Oct. 5, 2021, 8 pages. [English translation included].

International Searching Authority, “Written Opinion,” issued in connection with International Patent Application No. PCT/DE2021/100554, mailed Oct. 5, 2021, 17 pages. [English translation included].

International Searching Authority, “International Preliminary Report on Patentability” issued in connection with International Patent Application No. PCT/DE2021/100554, issued Dec. 13, 2022, 19 pages. [English translation included].

International Searching Authority, “International Search Report,” issued in connection with International Patent Application No. PCT/DE2021/100553, mailed on Oct. 4, 2021, 6 pages. [English translation included].

International Searching Authority, “Written Opinion,” issued in connection with International Patent Application No. PCT/DE2021/100553, mailed on Oct. 4, 2021, 15 pages. [English translation included].

International Searching Authority, “International Preliminary Report on Patentability,” issued in connection with International Patent Application No. PCT/DE2021/100553, issued Dec. 13, 2022, 17 pages. [English translation included].

International Searching Authority, “International Search Report,” issued in connection with International Application No. PCT/DE2021/100551, mailed Oct. 14, 2021, 7 pages. [English translation included].

International Searching Authority, “Written Opinion,” issued in connection with International Application No. PCT/DE2021/100551, mailed Oct. 14, 2021, 12 pages. [English translation included].

International Searching Authority, “International Preliminary Report on Patentability,” issued in connection with International Application No. PCT/DE2021/100551, issued Dec. 13, 2022, 14 pages. [English translation included].

United States Patent and Trademark Office, “Non-Final Office Action,” issued in connection with U.S. Appl. No. 18/010,173, dated Sep. 9, 2024, 8 pages.

Japan Patent Office, “Notice of Reasons for Refusal,” issued in connection with Japanese Patent Application No. 2022-580839, dated Jun. 17, 2025, 9 pages. [English machine translation included.]

United States Patent and Trademark Office, “Advisory Action,” issued in connection with U.S. Appl. No. 18/010,173, dated Apr. 29, 2025, 3 pages.

United States Patent and Trademark Office, “Non-Final Office Action,” issued in connection with U.S. Appl. No. 18/010,173, dated Jul. 28, 2025, 8 pages.

Japan Patent Office, “Notice of Reasons for Refusal,” issued in connection with Japanese Patent Application No. 2022-581355, dated Jul. 29, 2025, 11 pages. [English translation included.].

Korean Intellectual Property Office, “Request for the Submission of an Opinion,” issued in connection with Korean Patent Application No. 10-2022-7046065, dated Dec. 16, 2025, 10 pages [English machine translation included].

Intellectual Property Corporation Of Malaysia, “Substantive Examination Adverse Report,” issued on connection with Malaysian Patent Application No. PI2022006616, dated Jan. 19, 2026, 5 pages.

Brazilian National Institute of Industrial Property, “Search Report,” issued in connection with Brazillian Patent Application No. BR11202202412-9, dated Jan. 19, 2026, 5 pages. [English translation included.].

(56) References Cited

OTHER PUBLICATIONS

Japan Patent Office, "Decision of Final Rejection," issued in connection with Japanese Patent Application No. 2022-581355, dated Feb. 10, 2026, 14 pages. [English machine translation included].
Indonesian Directorate General of Intellectual Property, "Notification of the Results of the Initial Substrantive Examination," issued in connection with Indonesian Patent Application No. P00202215586, dated Feb. 25, 2026, 8 pages. [English machine translation included.].
United States Patent and Trademark Office, "Final Office Action", issued in connection with U.S. Appl. No. 18/010,173, dated Feb. 20, 2025, 8 pages.
United States Patent and Trademark Office, "Notice of Allowance and Fee(s) Due," issued in connection with U.S. Appl. No. 18/010,173, dated Jan. 6, 2026, 9 pages.
Japan Patent Office, "Notice of Reasons for Refusal," issued in connection with Japanese Patent Application No. 2022581654, dated Sep. 2, 2025, 8 pages. [English machine translated included.].
United States Patent and Trademark Office, "Non-Final Office Action," issued in connection with U.S. Appl. No. 18/003,438, dated Nov. 21, 2025, 15 pages.
Mexico Patent Office, "1st Substantive Examination Report," issued in connection with Mexico Patent Application No. MX/a/2022/0169177, dated Sep. 24, 2025, 12 pages [English machine translation included].
Intellectual Property Office Of Vietnam, "Substantive Examination Report," issued in connection with Vietnamese Patent Application No.1-2022-03868, dated Oct. 24, 2025, 4 pages. [English machine translation included.].
Mexico Patent Office, "1st Substantive Examination Report," issued in connection with Mexico Patent Application No. MX/a/2022/016177, dated Sep. 24, 2025, 12 pages [English machine translation included].
Intellectual Property Office Of Vietnam, "Substantive Examination Report," issued in connection with Vietnamese Patent Application No. 1-2022-08368, dated Oct. 24, 2025, 4 pages. [English machine translation.].
United States Patent And Trademark Office, "Supplemental Notice of Allowability," issued in connection with U.S. Appl. No. 18/010,173, dated Apr. 14, 2026, 4 pages.
Mexico Patent Office, "2nd Substantive Examination Report," issued in connection with Mexico Patent Application No. MX/a/2022/016177, dated Mar. 27, 2026, 16 pages [English machine translation included].
European Patent Office, "Communication Pursuant to Article 94(3) EPC," issued in connection with European Patent Application No. 21739957.5, dated Jul. 1, 2026, 14 pages. [English Machine Translation included].
European Patent Office, "Communication Pursuant to Article 94(3) EPC," issued in connection with European Patent Application No. 21739956.7, dated May 28, 2026, 14 pages. [Machine English Translation Included].
Canadian Intellectual Property Office, "Requisition by the Examiner," issued in connection with CA Patent Application NO. 3,180,021, dated Aug. 3, 2026, 7 pages.

* cited by examiner

TREATMENT STATION, TREATMENT UNIT AND METHOD FOR TREATING WORKPIECES

RELATED APPLICATION

This application is a national phase of international application no. PCT/DE2021/100554 filed on Jun. 30, 2021, and claims the benefit of German application no. 10 2020 208 248.0 filed on Jul. 1, 2020, which are incorporated herein by reference in their entirety and for all purposes.

FIELD OF DISCLOSURE

The present invention relates to the field of workpiece treatment, and in particular to cleaning and coating workpieces—for example, vehicle bodies or vehicle parts.

BACKGROUND

For the treatment of workpieces, these can be dipped into dip tanks, for example. In this case, the workpieces are lowered into a dip tank, for example, and are removed from the dip tank after a treatment step. In doing so, a rotation of the workpiece for optimal treatment of the same even at locations that are difficult to access may also be provided.

In such dip treatment plants, it may be disadvantageous if workpieces of different sizes and/or shapes are to be treated and/or if different treatment durations are provided for various workpieces.

SUMMARY OF THE INVENTION

The object of the present invention is therefore to provide devices and methods which allow optimized workpiece treatment by using cost-efficient components.

This object is achieved by the device and the method according to the independent claims.

The device is in particular a treatment station or a treatment plant for treating workpieces.

A treatment station preferably comprises a treatment container which surrounds a treatment chamber for receiving the workpieces.

Furthermore, it may be provided that a treatment station comprise several such treatment containers.

It is preferably provided that the treatment chamber be able to be flooded with a fluid.

The fluid is in particular a treatment fluid, e.g., a cleaning fluid—in particular, for degreasing the workpieces. Furthermore, it may be provided that the fluid be a coating fluid—for example, for phosphating or painting the workpieces.

It may be provided that the treatment container comprise at least one access opening for introducing the workpieces into the treatment chamber and/or for discharging the workpieces from the treatment chamber.

The treatment container preferably comprises a closing device for selectively closing and opening the at least one access opening.

It may be provided that the treatment container comprise a single access opening for introducing the workpieces into the treatment chamber and for discharging the workpieces from the treatment chamber.

Alternatively, it may be provided that the treatment container comprise an access opening for introducing the workpieces into the treatment chamber and a further access opening for discharging the workpieces from the treatment chamber, wherein the access openings are then arranged in particular on opposite sides or ends or front walls of the treatment container.

It may be advantageous if at least one access opening is arranged and/or formed in one or more side walls of the treatment container, and in particular in one or more front walls of the treatment container.

The treatment container is in particular substantially cuboid and preferably comprises a ceiling wall which is, for example, closed, a bottom wall, two or three closed side walls, and two further or one further side wall, which is provided with at least one access opening, wherein the at least one access opening is preferably completely closable by means of the closing device.

It may be favorable if the closing device serves for fluid-tight closing of the at least one access opening.

For this purpose, the closing device comprises in particular a closing element which, for example, is self-locking and/or is provided with a self-locking mechanism and/or with a self-locking seal.

Furthermore, it may be provided that, in order to ensure the sealing effect of the closing device, at least one toggle lever be or be able to be inserted—in particular, in order to press a closing element onto a sealing device.

It may be advantageous if the closing device comprises a lifting device for raising and lowering a closing element of the closing device, and in particular for raising the closing element in order to bring it into an open position and/or for lowering the closing element in order to bring it into a closed position.

Furthermore, it may be provided that, by means of the lifting device, the closing element be able to be lowered in order to bring it into an open position and/or be able to be raised in order to bring it into a closed position.

Such a closing element may, for example, be a gate, and in particular a lock gate.

The closing element may, for example, be formed in one piece and may be movable as a whole. Alternatively, it may be provided that the closing element be formed of several parts, wherein the parts of the closing element are preferably movable independently of one another or perform movements different from one another in order to close or open the access opening.

Alternatively or additionally, it may be provided that the closing device comprise a pushing device for, for example, lateral displacement of the closing element in order to selectively bring it into an open position or into a closed position.

Furthermore, it may be provided that the closing device comprise a pivoting device for pivoting a closing element of the closing device, wherein the closing element can be pivoted in particular about an at least approximately horizontal pivot axis. Alternatively, it may be provided that the closing element be able to be pivoted about an at least approximately vertical pivot axis.

It may be advantageous if one or more closing elements, and in particular at least one folding element, comprise or form one or more conveying elements of a conveying device, and in particular one or more guiding elements of a guiding device of a conveying device. In particular, it may be provided that one or more roller elements of a conveying device designed as a roller conveyor be arranged on one or more closing elements.

It may be advantageous if one or more closing elements of the closing device form part of the conveying device or carry or accommodate part of the conveying device.

The closing device preferably comprises a closing drive for automatically moving a closing element of the closing device—in particular, in order to automatically bring the closing element into the open position and/or into the closed position.

The closing drive can, for example, act electrically or pneumatically or hydraulically on the closing element in order to selectively bring it into an open position or into a closed position. In this case, one or more electric motors and/or spindle gears and/or thrust chains and/or rope winches may, for example, be provided for moving the closing element.

Furthermore, it may be provided that gravity be used to move the closing element, e.g., by mechanical coupling of two closing elements, wherein one closing element is lowered, and a further closing element is thereby raised, or at least its raising is thereby simplified.

It may be favorable if the treatment station comprises a fluid tank for accommodating a fluid, and in particular a treatment fluid.

For flooding the treatment chamber, the fluid can preferably be introduced from the fluid tank into the treatment chamber by means of a fluid guide.

For emptying the treatment chamber, the fluid can preferably be guided, by means of the fluid guide, from the treatment chamber back into the fluid tank.

A direct connection between the treatment chamber and the fluid tank may be provided both for flooding and for emptying. Alternatively, one or more intermediate stations or other devices to be flowed through may be provided.

The treatment station preferably comprises a conveying device for conveying the workpieces, and in particular for introducing the workpieces into the treatment chamber and/or for discharging the workpieces from the treatment chamber and/or for conveying the workpieces from one treatment station to the next.

It may be favorable if the conveying device comprises one or more roller conveyors, lifting conveyors, push conveyors, and/or storage and retrieval devices for conveying and/or moving the workpieces, and in particular for introducing the workpieces into the treatment chamber and/or for discharging the workpieces from the treatment chamber and/or for conveying the workpieces from one treatment station to the next.

Alternatively or additionally, it may be provided that the conveying device comprise one or more driverless transport systems for conveying and/or moving the workpieces, and in particular for introducing the workpieces into the treatment chamber and/or for discharging the workpieces from the treatment chamber and/or for conveying the workpieces from one treatment station to the next.

In one embodiment of the invention, it may be provided that the conveying device comprise several conveying device sections with conveyor technology different from one another with regard to a drive device and/or with regard to an accommodation and guidance of the workpieces, wherein the workpieces can preferably be conveyed by means of a first conveying device section into a region in front of a treatment container of a treatment station, and wherein the workpieces can be introduced into the treatment chamber of the treatment station by means of a second conveying device section different therefrom.

For example, it may be provided that one or more roller conveyors for conveying the workpieces be provided outside the treatment chambers, and that the workpieces be able to be pushed into and/or pulled out of the treatment chambers by means of one or more push conveyors.

It may be favorable if one or more work pieces are arranged on a workpiece carrier. A workpiece carrier is in particular a skid—preferably for receiving a workpiece designed as a vehicle body.

The conveyance and/or movement of the workpieces then preferably takes place together with the workpiece carrier, so that the wording, "conveyance of the workpieces" or "movement of the workpieces," can also be understood to mean a conveyance or movement of at least one workpiece carrier together with at least one workpiece arranged thereon.

In one embodiment of the invention, it may be provided that the workpieces be arranged on, and in particular fixed to, the workpiece carrier through an entire treatment unit of the treatment plant.

Alternatively, it may be provided that the workpieces be conveyed through an entire treatment unit of the treatment plant without a workpiece carrier. The workpieces can then be transferred—in particular, in the treatment chambers—to stationary workpieces provided for this purpose or can be deposited thereon and/or can be fixed thereto.

The workpieces can preferably be moved along a horizontal plane by means of the conveying device, and in particular can be introduced into the treatment chamber and/or can be discharged from the treatment chamber.

In particular, it may be provided that the workpieces be able to be moved by means of the conveying device, and in particular be able to be introduced into the treatment chamber and/or be able to be discharged from the treatment chamber.

It may be favorable if the conveying device comprises one or more drive units for moving the workpieces, wherein the drive units, and in particular all the drive units of the conveying device, are preferably arranged outside the treatment chamber, at least during the performance of a treatment step (workpiece treatment).

It may be advantageous if the conveying device comprises a guiding device for the load-bearing accommodation of the workpieces, wherein the guiding device extends from outside the treatment chamber into the treatment chamber, and in particular through at least one access opening.

In this case, the guiding device is preferably arranged at least in sections within the treatment chamber, even if a treatment step (workpiece treatment) is performed.

Furthermore, it may be provided that the conveying device comprise a guiding device for the load-bearing accommodation of the workpieces, wherein the guiding device comprises both at least one guide path section arranged outside the treatment chamber and at least one guide path section arranged within the treatment chamber, wherein the workpieces can be transferred through the access opening from a guide path section arranged outside the treatment chamber to a guide path section arranged within the treatment chamber—in particular, by driving the workpieces by means of one or more drive units.

A drive unit may, for example, be a pushing device or a gripping device or a roller device.

Preferably, the workpieces can be discharged (removed) from the treatment chamber by means of the same drive unit or a different drive unit after a treatment step has been performed.

In one embodiment of the invention, it may be provided that the conveying device comprise one or more drive units which act on a guide path section of the conveying device from outside the treatment chamber. A drive unit may, for example, be an electric motor or comprise an electric motor.

The one or more drive units are preferably coupled purely mechanically to the guide path section. In particular, it may be provided that a coupling device produce a mechanical connection between the one or more drive units on the one hand and the guide path section of the conveying device on the other. By means of the one or more drive units arranged outside the treatment chamber, a workpiece guided within the treatment chamber on the guide path section can then in particular be driven, and, preferably, linearly moved.

It may be favorable if the one or more drive units are arranged above a maximum filling-level or above a maximum filling-height of the treatment chamber and/or on an outer side of a side wall of a treatment container surrounding the treatment chamber.

Preferably, one or more drive units are arranged on an end region of the treatment container facing away from an access opening of the treatment container and/or in a region, close to the ceiling, of a side wall of the treatment container.

The coupling device is preferably guided through the side wall, and preferably at the height of the one or more drive units. A through-opening for guiding the coupling device is preferably arranged and/or formed above a maximum filling-level or a maximum filling-height of the treatment chamber. A coupling element, guided through the side wall, of the coupling device is preferably a rotating shaft or coupling shaft.

The rotating shaft or coupling shaft is preferably connected by means of a pulling element, and in particular by means of a belt and/or a chain, e.g., a duplex chain, to a further rotating shaft or coupling shaft which is arranged in the region of the guide path section and ultimately acts directly or indirectly on the workpiece in order to move the same.

Alternatively or additionally, it may be provided in one embodiment of the invention that the treatment station comprise one or more sensor devices which enable a state and/or position detection within the treatment chamber from outside the treatment chamber. For example, a correct positioning of a workpiece within the treatment chamber can be determined or monitored by means of a sensor device.

The one or more sensor devices preferably respectively comprise one or more sensor elements which are arranged outside the treatment chamber and preferably coupled purely mechanically to one or more transducer elements within the treatment chamber. In particular, it may be provided that a coupling device produce a mechanical connection between the one or more sensor elements on the one hand and the one or more transducer elements on the other. By means of the one or more sensor elements arranged outside the treatment chamber, a workpiece arranged within the treatment chamber can then in particular be detected, and, preferably, its position determined or monitored.

It may be favorable if the one or more sensor elements are arranged above a maximum filling-level or above a maximum filling-height of the treatment chamber and/or on an outer side of a side wall of a treatment container surrounding the treatment chamber.

Preferably, one or more sensor elements are arranged in a region, close to the ceiling, of a side wall of the treatment container.

The coupling device is preferably guided through the side wall, and preferably at the height of the one or more sensor elements. A through-opening for guiding the coupling device is preferably arranged and/or formed above a maximum filling-level or a maximum filling-height of the treatment chamber. A coupling element, guided through the side wall, of the coupling device is preferably a rotating shaft or coupling shaft.

The rotating shaft or coupling shaft is preferably connected by means of a pulling element or pressure element, and in particular by means of a coupling rod, to a further rotating shaft or coupling shaft, which is arranged, for example, in a bottom region and/or in the region of a guide path section and is connected to a transducer element. By actuating the transducer element, e.g., by rotating the transducer element, a rotation of the further rotating shaft or coupling shaft, and thereby a—for example—vertical displacement of the coupling rod, and thereby a rotation of the (upper) rotating shaft or coupling shaft, can preferably be brought about, wherein the (upper) rotating shaft or coupling shaft guided out of the treatment chamber finally carries out or brings about a movement which can be detected by means of the at least one sensor element. By purely mechanical actuation of the coupling device, a change in the orientation or another movement of the transducer element can thus be detected by means of the one or more sensor elements.

It may be favorable if all bearing points coming into contact with fluid, and in particular treatment fluid, during the operation of the treatment station are designed as lubrication-free and/or graphite-free components, or comprise lubrication-free and/or graphite-free components. In particular, all plain bearings and/or rolling bearings are preferably designed to be lubrication-free and/or graphite-free.

In one embodiment of the invention, it may be provided that all bearing points coming into contact with fluid, and in particular treatment fluid, during the operation of the treatment station be designed as sintered bronze bushings and/or as plastic elements, or comprise sintered bronze bushings and/or plastic elements.

Preferably, all components coming into contact with fluid, and in particular treatment fluid, during the operation of the treatment station are designed to permanently remain with and/or contact the fluid—for example, by the choice of stainless steel as a material, and in particular V4A.

Preferably, no electrical components are arranged within the treatment chamber, and in particular within an interior of the treatment container.

It may be advantageous if the conveying device for conveying workpieces is designed to be open, and/or cover elements for at least partially covering components of the conveying device are dispensed with, at least within the treatment chamber. As a result, simple flow through and/or flushing of the conveying device can be made possible. Moreover, the accessibility is preferably optimized thereby.

The conveying device preferably comprises a locking device for locking the workpieces in a treatment position within the treatment chamber.

By means of the locking device, a movement of the workpiece counter to the direction of gravity, in particular, can be blocked.

By using such a locking device, it can preferably be avoided that the workpieces float or otherwise move or be otherwise raised during the flooding of the treatment chamber.

The locking device can, for example, comprise one or more locking elements or folding elements or holding elements which engage directly in one or more workpieces or in one or more workpiece carriers for accommodating one or more workpieces.

The one or more workpieces can preferably be fixed to one or more workpiece carriers, and in particular can be secured against displacement and/or raising, outside the treatment chamber and/or before being introduced into the treatment chamber. Alternatively or additionally, it may be provided that the one or more workpieces be fixed, and in particular fixed relative to one another and/or relative to the treatment chamber, within the treatment chamber and/or together with one or more workpiece carriers.

Alternatively or additionally, it may be provided that locking take place in that the at least one workpiece or a workpiece carrier for accommodating the at least one workpiece is conveyed into a locking receptacle, which is designed to be complementary thereto at least in sections, and in particular when the at least one workpiece and, where applicable, the workpiece carrier are introduced into the treatment chamber.

It may furthermore be advantageous if the conveying device comprises a movement device for tilting and/or turning the workpieces, and in particular for temporarily changing the position relative to an at least approximately horizontal normal position.

The horizontal normal position is in particular a standard orientation of the workpieces during the conveying and/or treatment of the same. By means of the movement device, a tilting process and/or a turning process can preferably be performed, whereby, in particular, a more efficient drainage of fluid off the workpieces can be achieved.

The treatment station may in particular be part of a treatment plant—for example, a painting plant.

In particular, a method for treating workpieces can be carried out by means of the treatment station. The method preferably comprises the following steps:

- Introducing a workpiece through an access opening of a treatment container into a treatment chamber of the treatment container;
- Closing the access opening of the treatment container by means of a closing device;
- Flooding the treatment chamber with a fluid for performing a workpiece treatment.

After the workpiece treatment (treatment step) has been performed, the fluid is preferably removed, and in particular drained, from the treatment chamber.

Furthermore, the workpiece is then preferably removed from the treatment chamber through the one access opening or a further access opening.

In one embodiment of the invention, it may be provided that the treatment station comprise one or more installation elements which are arranged or can be arranged in the treatment chamber for supporting a flooding process.

Such installation elements are, in particular, components different from a conveying device for conveying the workpieces.

Preferably, these installation elements do not have any further technical effect or do not serve any further purpose apart from supporting the flooding process. However, alternatively, it may also be provided that one or more installation elements serve to accommodate functional components of the treatment station—for example, devices for the fluid distribution in the treatment chamber, measuring devices or other sensor units, etc.

By means of the installation elements, the flooding process can preferably be supported with regard to the time sequence and/or the optimization of a treatment step for treating the workpieces.

It may be favorable if a flow within the treatment chamber is generated and/or optimized, e.g., by means of one or more installation elements and/or by means of one or more feed lines and/or by means of one or more discharge lines and/or by means of one or more pump devices.

It may be favorable if one or more nozzles for feeding and/or circulating fluid are arranged in the treatment chamber, wherein the fluid is directed in particular to regions of the workpiece or the workpieces which require additional treatment and/or in which gas accumulations, e.g., air bubbles, can form during the flooding. By means of the one or more nozzles, the fluid can preferably be applied in such a way that gas accumulations, e.g., air bubbles, are expelled.

Alternatively or additionally thereto, it may be provided that a lifting and/or lowering movement and/or tilting movement and/or rotational movement of the at least one workpiece to be treated be able to be performed by means of the conveying device and/or by means of movement components provided additionally or alternatively to the conveying device, and in particular in order to expel gas accumulations—for example, air bubbles.

In one embodiment of the invention, it may be provided that one or more installation elements be designed as displacement elements, by means of which free spaces within the treatment chamber can in particular be filled which remain free during the flooding process without the respective installation element and would therefore need to be filled with fluid.

By means of one or more installation elements designed as displacement elements, the fluid volume required for performing the flooding process can thus in particular be reduced, and in particular by at least approximately 5%, and preferably at least approximately 10%, e.g., at least approximately 20%, of a fluid volume required overall for performing a flooding process. Furthermore, a total duration for performing the flooding process can preferably be reduced thereby.

It may be advantageous if one or more installation elements are adapted or can be adapted with regard to their position and/or with regard to their function and/or with regard to their shape to the workpieces to be treated.

For example, it may be provided that one or more displacement elements be adapted or be able to be adapted at least in sections or in regions to a shape of the workpiece to be treated. In particular, it may be provided that one or more displacement elements be formed at least in sections and/or to be at least approximately complementary to a workpiece shape so that the free spaces within the treatment chamber can preferably be minimized.

For example, it may be provided that one or more displacement elements be designed to be adapted to side walls and/or bottom regions and/or a front hood region and/or a rear hood region of workpieces designed as vehicle bodies.

Furthermore, it may be provided that one or more installation elements be arranged and/or able to be moved in such a way that, during the treatment of a workpiece, they project into an interior of the same or are at least partially arranged therein—in particular, without touching the workpiece. For example, in the case of workpieces which are designed as vehicle bodies of vans or (small) buses, etc., one or more installation elements can be introduced into the interior of the respective workpiece through a tailgate in order to reduce a free interior volume and thus the fluid volume required for a flooding process.

It may be provided that one or more displacement elements have a hollow body which can preferably be filled and/or kept filled and/or emptied independently of the flooding process.

In particular, one or more displacement elements are designed as hollow bodies and have one or more closable filling openings and/or one or more drainage openings.

Such displacement elements can, in particular, be formed very easily on their own and thus be easily arranged in the treatment chamber. An undesired floating or other movement of the displacement elements during a flooding process is preferably prevented by suitably fixing the displacement elements within the treatment container and/or by weighting down the same—for example, by filling the hollow body. For filling the one or more displacement elements, a fluid different from the fluid for performing the workpiece treatment or the same fluid can be used, for example. Furthermore, water may be provided as filling fluid for the one or more displacement elements.

It may be advantageous if an inner and an outer geometry of one or more displacement elements differ from one another so that, e.g., for filling and emptying, optimized cavities are formed within one or more displacement elements.

In one embodiment of the invention, it may be provided that the treatment container comprise one or more receptacles for fixing one or more installation elements—in particular, displacement elements.

One or more installation elements, e.g., displacement elements, and in particular displacement elements with different shapes and/or dimensions, preferably have fixing sections formed to be complementary to the receptacles so that they can preferably be easily fixed and/or exchanged.

It may be provided that one or more displacement elements be designed to be rigid.

One or more installation elements, and in particular displacement elements, are preferably fixed or fixable in a positive-locking and/or force-locking and/or releasable manner on and/or in the treatment container.

It may be favorable if one or more displacement elements are designed to be flexible and/or reshapeable and/or resizable—for example, inflatable.

As a result, the one or more displacement elements can be adapted in particular to different workpiece types in order to optimize the respective treatment step and/or flooding process.

The treatment station preferably comprises a variation device for varying the shape and/or size of the one or more displacement elements—in particular, for reducing a free space, within the treatment chamber, to be flooded for a treatment process.

A variation device may, for example, be a pump device by means of which filling fluid can be fed to a cavity within the one or more displacement elements in order to optimize the flooding process, wherein a control and/or regulation is in particular provided in such a way that a quantity of the fed filling fluid is selected depending upon the workpiece to be treated in each case, and in particular, automatically, by means of a suitably designed and configured control device.

It may be provided that one or more displacement elements fill one or more free spaces in the region of a conveying device of the treatment station.

Alternatively or additionally, it may be provided that one or more displacement elements fill a free space above a workpiece designed as a vehicle body, and in particular above a vehicle front and/or above a vehicle rear of the vehicle body.

In a further supplementary or alternative embodiment, it may be provided that one or more installation elements be designed as support elements for supporting a workpiece to be treated during the flooding process.

The one or more support elements thus preferably abut against the workpiece during the flooding process and preferably prevent bulging or buckling or another deformation of the respective workpiece. For this purpose, the one or more support elements are preferably movable and/or reshapeable and/or resizable.

In particular, one or more installation elements designed as displacement elements may simultaneously serve as support elements.

In order to perform a treatment step and/or after the treatment chamber has been flooded, the one or more support elements are preferably removed from the workpiece—in particular, in order to ensure complete wetting of the workpiece with the fluid, and in particular the treatment fluid. For this purpose, the one or more support elements can in particular be moved away from the workpiece. Alternatively or additionally, the removal can be realized by changing the shape and/or size of the support element.

It may be favorable if one or more of the support elements respectively have a support section which serves for the direct abutment on the workpiece for supporting the same.

A support section is, in particular, provided with a material that prevents damage to the workpiece and/or is elastically resilient. For example, a textile surface of the support section may be provided.

In a development of the invention, it may be provided that one or more installation elements be designed as temperature-control elements for controlling the temperature of the treatment container and/or of the fluid.

For this purpose, the one or more installation elements are in particular filled or fillable with—and in particular can be flowed through by—a heating medium or cooling medium.

It may be favorable if the one or more installation elements which are designed as temperature-control elements have one or more ribs or other surface enlargements in order to optimize heat transfer.

It may be favorable if the fluid flows over one or more installation elements designed as temperature-control elements during the flooding of the treatment chamber. This may also preferably optimize heat transfer.

Particularly for the variable adaptation of the treatment station to differently dimensioned workpieces, it may be provided that one or more installation elements be arranged or be able to be arranged temporarily, for one or more treatment processes and/or flooding processes, or else permanently in the treatment chamber.

In particular, it may be provided that the treatment station comprise a set of differently dimensioned installation elements, wherein, as required, individual installation elements, and in particular installation elements adapted to particular workpiece types, are introduced into the treatment chamber and fixed therein. When changing the workpiece type, the installation elements are then preferably replaced with differently dimensioned or functionally different installation elements.

It may be provided that one or more installation elements be fixed immovably in the treatment chamber during the flooding process, during the treatment process, and/or during the emptying of the treatment chamber.

Alternatively, for this purpose, it may be provided that one or more installation elements be movable within the treatment chamber, e.g., be able to be introduced during the flooding process into a free space of the treatment chamber that is to be flooded and/or can, after the flooding process and/or the treatment process (treatment step) has been performed, be removed—in particular, automatically—from the free space to be flooded.

It may be provided that one or more installation elements be arranged or be able to be arranged on a closing element for closing an access opening of the treatment container.

The one or more installation elements can then be moved—in particular, be brought into a position in which they support the flooding process—in particular, by moving the closing element itself.

The one or more installation elements can preferably be brought into a displacement position or support position by means of the closing element.

It may be favorable if the one or more installation elements can be moved—in particular, linearly moved—and/or pivoted, together with the closing element.

The workpieces can be treated by means of the treatment station; in particular, vehicle bodies can be cleaned and/or coated.

For this purpose, the workpieces are introduced into a treatment chamber of the treatment container. Subsequently, the treatment chamber is flooded with a fluid for performing a workpiece treatment, wherein the flooding is preferably supported by means of one or more installation elements that are arranged or can be arranged in the treatment chamber.

In an advantageous embodiment of the invention, it may be provided that the treatment station comprise a fluid tank for accommodating a fluid. Furthermore, the treatment station preferably comprises a fluid guide by means of which the fluid can be guided from the fluid tank into the treatment container in order to flood the treatment chamber and/or from the treatment container into the fluid tank in order to empty the treatment chamber.

For this purpose, the fluid guide preferably comprises one or more fluid lines, wherein preferably one fluid line for feeding the fluid from the fluid tank to the treatment container and a further fluid line—in particular, a separate fluid line—for feeding the fluid from the treatment container to the fluid tank are provided.

It may be favorable if the fluid tank is arranged above the treatment container with respect to the direction of gravity.

As a result, gravity can in particular be used for feeding the fluid to the treatment container, wherein a separate pump device can preferably be unnecessary.

In contrast, a pump device may be advantageous in order to pump the fluid from the treatment chamber back into the fluid tank.

Alternatively, for this purpose, it may be provided that the treatment container be arranged above the fluid tank with respect to the direction of gravity. As a result, the fluid can then be guided from the treatment container into the fluid tank without using a pump device, while a pump device is preferably provided in order to guide the fluid from the fluid tank into the treatment container.

It may be provided that the fluid guide comprise a fluid line, designed as a feed line, by means of which the fluid can be fed to the treatment chamber, wherein the feed line preferably opens into the treatment container in a bottom region of the same. In particular, undesired foam formation during the feeding of the fluid into the treatment container can thereby be reduced or completely avoided.

A bottom region of the treatment container is in particular a lower third, and preferably lower fifth, of the treatment chamber with respect to the maximum filling-height of the treatment chamber and/or with respect to a maximum filling-height.

The treatment container preferably comprises an inflow region which is arranged in particular below an access opening of the treatment container. The inflow region is preferably also filled with fluid in an emptied state, provided for replacing a workpiece, of the treatment container.

A minimum filling-height between two flooding processes and/or between the treatments of two workpieces is preferably selected or selectable such that the conveying device and/or other functional components or tank fittings always remain below the filling-level within the treatment chamber. This can prevent drying of contaminants—particularly when sticky or other adhering treatment fluids are used.

Furthermore, alternatively or additionally to avoiding contaminations as a result of sticky media or media that tend to coagulate as well as dry, it may be provided that—particularly after a flooding process, and in particular after emptying of the treatment container—wetting be maintained or cleaning take place in the treatment container, on installation elements and other components in the treatment chamber, and in particular on tank fittings, such as jet blocks, anodes, and a conveying device, as well as on the pipes, for filling and for emptying, necessary for operating the treatment station. For this purpose, liquids and/or filtrates may be used for cleaning, which provide the cleaning performance via suitable measures, such as the use of rigidly attached jet blocks or variably movable tank-cleaning nozzles. Self-cleaning methods, such as a submersible seal with preferably defined outlets, may optionally also be used for components that are difficult to reach, such as a seal between the treatment container and the closing device.

Furthermore, it may be provided that the treatment container and components arranged therein be protected against drying by hermetic sealing. In addition, the air humidity in the sealed unit may be monitored and re-wetted if necessary. This may optionally also be provided in the case of non-hermetically-sealed units.

Optionally, adhesive bonding may also be counteracted by permanent wetting with the medium used—in particular, treatment fluid. This is conceivable in particular in the case of conveying fittings, but also in the case of pipes for filling and for emptying.

The feed line preferably opens into the inflow region, and in particular below a fluid line of the inflow region, in order to enable an optimized fluid feed into the treatment chamber.

Furthermore, it may be provided that the inflow region be arranged and/or formed within the treatment chamber in one or more inflow containers—in particular, displacement elements—wherein the feed line in particular opens into the inflow container. On its upper side, for example, the inflow container in particular comprises outflow openings through which the fluid can flow into the treatment chamber for flooding the same.

In order to avoid sedimentation, it may be provided that the fluid in the inflow region be permanently or regularly circulated and/or treated, and in particular cleaned.

It may be favorable if the fluid guide comprises several feed lines, wherein one or more of these feed lines open into the treatment container in a bottom region of the same and/or wherein one or more feed lines end in or on one or more nozzles or other feed openings, by means of which the fluid can be directed and/or applied, e.g., as a jet or stream, onto the workpieces.

An emptied state of the treatment container is preferably a state of the treatment container in which the one or more access openings can be opened without effecting or risking fluid leakage through the access openings. An empty state thus in particular does not have to be a state of the treatment container in which any residual fluid has been removed from the treatment container.

A medium, and in particular a gas, e.g., air, displaced from the treatment chamber during the flooding of the same, may, for example, be discharged to the environment or treated and/or conducted to an exhaust air cleaning plant, for example, and/or into a dryer for drying the workpieces.

Furthermore, it may be provided that the displaced medium be introduced into the fluid tank.

In particular, when foam formation during a flooding process or filling cycle is to be expected or would be expected due to the type of feeding and/or due to the selected fluid, it may be advantageous if the treatment station comprises a compensation device for minimizing or preventing foam formation. The compensation device comprises in particular a nozzle device, e.g., a jet block, for injecting liquid—in particular, filtrate. The nozzle device is in particular arranged in a ceiling region of the treatment chamber. Alternatively or additionally, it may be provided that the compensation device comprise a vacuum device for evacuating air from the treatment chamber. Furthermore, alternatively or additionally, a chemical medium, and in particular a defoaming medium, may be fed to the fluid.

If the fluids used are media that tend towards air inclusions that make degassing necessary, devices for the removal thereof can additionally be provided for this purpose in the treatment containers. In addition to the possibility of evacuation, the generation of ultrasonic waves in the treatment container for coalescence of the gas bubbles in a batch process and in the continuous flow may, alternatively or additionally, also be provided, wherein the devices necessary for this purpose are integrated or can be integrated into an additionally or already existing circuit, for example. Alternatively, chemical modifications of the formulation and/or an addition of additives to the fluid to be introduced may be provided.

It may be advantageous if the fluid guide comprises a cleaning device for cleaning the fluid.

The cleaning device is preferably arranged outside the treatment container and/or outside the fluid tank.

Preferably, the cleaning device is arranged in a return line for returning the fluid into the fluid tank. As a result, the fluid can preferably be cleaned and/or treated in one or more treatment containers when it is returned and/or before each start of a cycle, and in particular before a new flooding process.

The treatment station preferably comprises a control device by means of which a flooding process in the treatment chamber can be controlled and/or regulated—in particular, by controlling and/or regulating a valve device for opening and closing a feed line for feeding fluid to the treatment chamber.

One or more workpiece parameters, and in particular a geometry and/or size and/or position of the respective workpiece within the treatment chamber, are preferably taken into account in the control and/or regulation of the flooding process.

The one or more workpiece parameters are transferred to the control device in particular via a machine control and/or through CAD data, barcode recognition, RFID information, or other workpiece-specific data sets.

The flooding process is preferably controlled by means of the control device in such a way that a filling speed and/or a rate of change of the fill-level of the fluid in the treatment chamber during the flooding is varied, and in particular adapted to local stability differences of the workpieces and/or adapted to a surface of the water surface which varies along the direction of gravity.

For example, it may be provided that the flooding process be able to be controlled by means of the control device in such a way that a fluid level in the treatment chamber rises at least approximately constantly.

Alternatively, it may be provided that the flooding process be able to be controlled by means of the control device in such a way that the volume flow of the fed fluid is increased if the fluid level sweeps over more stable regions of the workpieces, and that the volume flow of the fed fluid is reduced if the fluid level of the fluid sweeps over less stable regions of the workpieces.

The treatment station may, for example, comprise one or more measuring devices by means of which, for example, a volume flow of the fluid flowing into the treatment chamber and/or a fill-level or filling-level within the treatment chamber and/or a fill-level or filling-level in the fluid tank can be determined.

One or more measured values of the one or more measuring devices are preferably taken into account in the control and/or regulation of the flooding process.

Preferably, a maximum filling-height (maximum filling-level) during a flooding process is selected according to the workpiece geometry and/or position. For example, in the case of a workpiece designed as a vehicle body, it may be provided that the treatment chamber be always filled with fluid to such an extent that the filling-level is just above a roof of the vehicle body, e.g., at most approximately 10 cm, and preferably at most approximately 5 cm, e.g., at most approximately 3 cm, above the roof.

Furthermore, it may be provided that one or more leakages be determined by means of one or more measuring devices, e.g., by means of fill-level or filling-level or volume-flow monitoring by means of one or more measuring devices. Preferably, a leak-tightness of one or more closing devices can be deduced therefrom.

In one embodiment, the treatment station may have a counter tank which is in particular arranged below the treatment chamber with respect to the direction of gravity and to which the fluid to be discharged from the treatment chamber can be fed.

In this case, the fluid can preferably be guided from the fluid tank into the treatment chamber and/or from the treatment chamber into the counter tank using only gravity.

By means of a pump device, for example, the fluid can preferably be guided from the counter tank back into the fluid tank.

The fluid tank is thus in particular a storage tank for providing the fluid—in particular, in a state of the fluid that is ready for performing a treatment process. For this purpose, the fluid can be cleaned or treated—in particular, by means of a cleaning device—in particular, on the conveying path between the counter tank and the fluid tank.

It may be advantageous if the treatment station comprises two or more than two treatment chambers, and in particular two or more than two treatment containers with one treatment chamber each.

In this case, a common fluid tank for feeding the fluid to the two or more than two treatment chambers may be provided.

Alternatively, several fluid tanks may be provided, and in particular for several fluids in the same treatment chamber.

For example, it may be provided that a treatment chamber of a treatment station be able to be flooded selectively, and in particular alternately, with different fluids—in particular, in order to perform different treatment steps on one or more workpieces located in the treatment chamber.

Furthermore, it may be provided for this purpose that several counter tanks be provided for the several fluids.

Moreover, a common counter tank for more than two treatment chambers may be provided.

In this description and the appended claims, a tank is in particular a general receptacle for a fluid; for example, this may be individual containers, or several containers coupled to one another.

It may be provided that the treatment station comprise a flushing device for flushing and/or cleaning the treatment chamber, wherein a flushing medium can be introduced, and in particular sprayed, into the treatment chamber and can be removed from the same, and in particular discharged, by means of the flushing device—in particular, independently of the fluid, independently of the fluid tank, and/or independently of a counter tank.

The flushing device may comprise spray nozzles which are in particular arranged in the treatment chamber and/or are directed into the treatment chamber and which serve, in particular, for rinsing walls and/or a conveying device arranged in the treatment chamber.

In order to treat the workpieces, it may in particular be provided in the treatment station described that the workpieces be introduced into the treatment chamber of the treatment container and that the treatment chamber be flooded with a fluid in order to perform a workpiece treatment, wherein the fluid is guided from the fluid tank into the treatment container in order to flood the treatment chamber and/or from the treatment container into the fluid tank in order to empty the treatment chamber.

The treatment station can in particular be used in a treatment plant.

A treatment plant in particular serves for treating workpieces.

The treatment plant preferably comprises several treatment stations for treating the workpieces, and in particular for cleaning and/or coating vehicle bodies.

Each treatment station preferably comprises at least one treatment container, which surrounds a treatment chamber for accommodating the workpieces, wherein each treatment station separately, or several treatment stations jointly, comprise a fluid tank for accommodating a fluid, and wherein the treatment stations preferably comprise a fluid guide, by means of which the fluid can be guided from the fluid tank into the respective treatment container in order to flood one or more treatment chambers and/or from the respective treatment container into the fluid tank in order to empty the treatment chambers.

During flooding of one or more treatment chambers, a fluid level inside the treatment chamber is preferably increased by a factor of at least 10, and preferably at least 50, e.g., at least 100.

Furthermore, when flooding one or more treatment chambers, the liquid level is preferably raised from a minimum level to at least approximately 50%, and preferably at least approximately 70%, e.g., at least approximately 90%, of an overall interior height of the treatment chamber.

For emptying one or more treatment chambers, preferably at least approximately 50%, and in particular at least approximately 80%, e.g., at least approximately 90%, of the fluid—in particular, the treatment fluid—located therein is removed from the treatment chamber.

A flooding process and an emptying process are preferably performed for each workpiece or each group of workpieces that is or are introduced separately into the treatment chamber.

In one embodiment of the invention, it is provided that the treatment plant comprise several first treatment stations for performing a first step and several second treatment stations for performing a second treatment step, wherein one or more first treatment stations and one or more second treatment stations respectively are preferably part of or form a treatment unit of the treatment plant that is passed through by the workpieces in order to perform the treatment steps.

A treatment unit in particular comprises several successive treatment stations along a main conveying direction of a conveying device for conveying the workpieces. All treatment steps that can be successively performed for the workpiece treatment can preferably be performed by means of a treatment unit.

It may be provided that the treatment plant comprise several treatment units which, in particular, respectively comprise one or more first treatment stations and one or more second treatment stations, and/or which, in particular, form distinct treatment lines of the treatment plant.

One or more first treatment stations of distinct treatment units preferably have a common fluid guide and/or a common fluid tank. Alternatively or additionally, it may be provided that one or more second treatment stations of distinct treatment units have a common fluid guide and/or a common fluid tank.

Furthermore, it may alternatively or additionally be provided that one or more first treatment stations of distinct treatment units have a common counter tank and/or a common cleaning device. Moreover, it may alternatively or additionally be provided that one or more second treatment stations of distinct treatment units have a common counter tank and/or a common cleaning device.

It may be favorable if a fluid, and in particular a first treatment fluid, can be fed, by means of the fluid guide, first a) to one or more treatment chambers of one or more treatment stations, and in particular first treatment stations, of a first treatment unit, and thereafter
b) to one or more treatment chambers of one or more treatment stations, and in particular first treatment stations, of a second treatment unit. One or more interim storage tanks may be arranged between the first treatment unit and the second treatment unit and/or between two treatment stations of the same treatment unit or of distinct treatment units.

It may be favorable if a fluid, and in particular a second treatment fluid, can be fed, by means of the fluid guide, first a) to one or more treatment chambers of one or more treatment stations, and in particular second treatment stations, of a first treatment unit, and thereafter
b) to one or more treatment chambers of one or more treatment stations, and in particular second treatment stations, of a second treatment unit. One or more interim storage tanks may be arranged between the first treatment unit and the second treatment unit and/or between two treatment stations of the same treatment unit or of distinct treatment units.

It may be favorable if the fluid can alternately be fed, by means of the fluid guide, to treatment chambers of distinct treatment units.

Alternatively or additionally, it may be provided that the fluid be able to alternately be fed, by means of the fluid guide, to treatment chambers of the same treatment unit.

The fluid guide is preferably connected to a cleaning device or comprises such a cleaning device so that the fluid can in particular be cleaned after removal from one of the treatment chambers and/or before a new feeding to a further one of the treatment chambers.

The cleaning of the fluid preferably takes place during the emptying of a treatment chamber and/or after a single or multiple use of the same in a flooding process and/or treatment step.

A total quantity of a fluid contained overall in a fluid guide is preferably at most approximately twice, and in particular at most approximately three times, a quantity of the fluid required for performing a single flooding process in a treatment chamber.

The fluid guide preferably comprises all the components conducting and accommodating the fluid, and in particular one or more fluid tanks, one or more treatment chambers, one or more interim storage tanks, and/or one or more counter tanks, as well as, optionally, one or more cleaning devices.

The quantity of fluid is in particular a mass of the fluid and/or a volume of the fluid—in particular, under normal conditions.

In order to perform cleaning work, the fluid can preferably be selectively brought, and in particular pumped, into individual or multiple components of the fluid guide and stored therein. For example, it may be provided that, for cleaning at least one fluid tank, the fluid be able to be accommodated completely in one or more treatment containers and/or in one or more counter tanks. Furthermore, for cleaning the one or more treatment containers, it may, for example, be provided that the fluid be able to be accommodated completely in one or more fluid tanks and/or in one or more counter tanks. Moreover, it may optionally be provided that, for cleaning the one or more counter tanks, for example, the fluid be able to be accommodated completely in one or more fluid tanks and/or in one or more treatment containers.

It may be advantageous if several, and in particular all, of the treatment stations of a treatment unit, and in particular one or more or all of the first treatment stations and one or more or all of the second treatment stations of a treatment unit, are arranged on a common level of the treatment plant. This is to be understood in particular as meaning that the treatment chambers of the treatment stations are accessible to the workpieces exclusively through a horizontal movement of the same, and in particular without a height change or level change.

It may be advantageous if several treatment units of the treatment plant are arranged on distinct levels of the treatment plant.

It may be provided that several treatment stations be arranged one above the other along the direction of gravity. The treatment stations may in this case be arranged, and in particular supported, on different sections or levels of a supporting structure, and in particular a steel construction, of the treatment plant. Furthermore, it may be provided that one or more treatment stations respectively accommodate in a load-bearing manner one or more further treatment stations arranged thereabove. An additional supporting structure may here be unnecessary. For this purpose, the treatment containers are preferably dimensioned and/or designed in such a way that they can accommodate the weight forces of one or more treatment stations arranged thereabove.

It may be advantageous if one or more fluid tanks or counter tanks are arranged above one or more treatment containers or between two treatment containers, and in particular are held in a load-bearing manner by the one or more treatment containers. An additional supporting structure for the one or more fluid tanks or counter tanks is then, preferably, unnecessary.

Furthermore, it may be provided that one or more treatment containers be arranged directly on one or more fluid tanks and/or counter tanks, and that the one or more fluid tanks and/or counter tanks accommodate the one or more treatment containers in a load-bearing manner.

One or more treatment stations of distinct treatment units of the treatment plant, which have a common fluid guide and/or which serve to perform the same treatment step, are preferably arranged one above the other along the direction of gravity.

The several treatment units arranged on different levels of the treatment plant are preferably functionally identical so that, in particular with each treatment unit, the same treatment steps can be performed, in order to be able to ultimately provide a greater treatment capacity of the treatment plant in comparison to a single treatment unit.

In this case, the workpieces are preferably respectively assigned separately to a single one of the several treatment units and pass through only this single treatment unit. In contrast, one or more fluid guides are preferably designed to spread across several treatment units and are in particular assigned to several treatment units for performing the same treatment steps.

It may be favorable if treatment stations arranged one above the other along the direction of gravity are connected by means of a common fluid guide, so that in particular a fluid can be fed in succession to the individual treatment stations and can be used for performing flooding processes, wherein the fluid can be guided from a treatment station to a further treatment station located below the direction of gravity in particular by using gravity.

It may be favorable if a common counter tank is arranged under all treatment stations and/or if a common fluid tank is arranged above all treatment stations.

The fluid can then be guided in particular from the fluid tank to an upper treatment station, then to a lower treatment station (where applicable, in-between to a central treatment station), and finally to the counter tank. The fluid can preferably be pumped from the counter tank back into the fluid tank by means of a pump device.

It may be advantageous if the treatment plant comprises several fluid guides for guiding distinct treatment fluids, wherein the fluid guides are assigned to distinct treatment stations for performing different treatment steps.

Alternatively or additionally, it may be provided that the treatment plant comprise several fluid guides for guiding distinct treatment fluids, wherein the fluid guides are assigned to the same treatment stations so that one of the treatment fluids can selectively be fed to the treatment stations in order to selectively perform different treatment steps.

In order to treat workpieces, a method is in particular carried out in which the following method steps are performed:

Introducing one or more workpieces into one or more treatment chambers of one or more treatment stations;

Flooding the one or more treatment chambers with a fluid for performing the treatment, wherein, by means of a fluid guide, the fluid is guided from the fluid tank into the respective treatment chamber in order to flood one or more treatment chambers and/or from the respective treatment chamber into the fluid tank in order to empty the treatment chambers.

It may be favorable if the fluid is removed from the fluid tank successively, and in particular completely staggered in time, and fed to one or more treatment chambers.

In particular, thereafter, e.g., subsequently or at a later point in time, the fluid is preferably guided back into the fluid tank—optionally, after a cleaning of the fluid in a cleaning device. The fluid tank and/or the one or more treatment chambers are thus preferably alternately filled and emptied.

Furthermore, it may be provided that the fluid be fed successively, and in particular completely staggered in time, to one or more treatment chambers in a treatment station of a first treatment unit, and thereafter, and in particular subsequently or at a later point in time, e.g., after interim storage in an interim storage tank, be fed to one or more treatment chambers of a treatment station of a second treatment unit.

It may be advantageous if a treatment plant comprises several treatment stations for treating the workpieces, and in particular for cleaning and/or coating vehicle bodies, wherein one or more treatment stations, preferably, respectively comprise at least one treatment container which surrounds a treatment chamber for accommodating the workpieces.

The treatment plant preferably comprises a fluid guide by means of which one or more of the treatment chambers can be selectively flooded or emptied.

It may be favorable if the treatment plant comprises a conveying device for conveying the workpieces, by means of which the workpieces can be introduced into the one or more treatment chambers or discharged from the same in an emptied state of the same. It may be provided that the workpieces be able to be moved along a horizontal plane by means of the conveying device, and in particular be able to be introduced into the treatment chamber and/or be able to be discharged from the treatment chamber.

In particular, the workpieces can be introduced into the treatment chamber through an access opening or can be discharged from the treatment chamber through a further or the same access opening.

The treatment plant preferably comprises a main conveying path which extends in a main conveying direction and along which the workpieces can be conveyed by means of the conveying device from a treatment station to a further treatment station, wherein distinct treatment steps are preferably performed or can be performed at the treatment stations.

The workpieces can preferably be conveyed in a transverse orientation of the same along the main conveying direction or along the main conveying path.

A transverse orientation of the workpieces is in particular an orientation of the workpieces in such a way that a main longitudinal axis of the workpieces, and in particular a main longitudinal axis of the vehicle bodies, is oriented transversely, and preferably at least approximately perpendicularly, to the movement direction, and in particular the main conveying direction, when the workpieces are conveyed along the movement direction, and in particular the main conveying direction.

A longitudinal orientation of the workpieces is in particular an orientation of the workpieces in such a way that a main longitudinal axis of the workpieces, and in particular a main longitudinal axis of the vehicle bodies, is oriented at least approximately in parallel to the movement direction, and in particular the main conveying direction, when the workpieces are conveyed along the movement direction, and in particular the main conveying direction.

It may be provided that the workpieces be able, in a longitudinal orientation of the same, to be introduced into or discharged from one or more treatment chambers.

A movement direction of the workpieces during the introduction into the treatment chambers and/or during the discharge of the same from the treatment chambers is preferably transverse, and in particular at least approximately perpendicular, to the main conveying direction.

In particular, it may be provided that the workpieces be able to be introduced into the treatment chambers in an introduction direction, wherein the introduction direction is transverse, and in particular at least approximately perpendicular, to a main conveying direction of the conveying device.

The treatment plant preferably comprises several treatment stations for performing identical treatment steps, wherein two or more such treatment stations are preferably arranged on opposite sides of a main conveying path of the conveying device.

By means of the conveying device, the conveyed workpieces can preferably be alternately distributed to the treatment stations.

Furthermore, it may be provided that the treatment plant comprise several treatment stations for performing identical treatment steps, wherein two or more such treatment stations are arranged along a main conveying direction of the conveying device in succession and/or next to one another and/or on the same side with respect to the main conveying path. By means of the conveying device, the workpieces may preferably also be allocated to these treatment stations—in particular, in order to enable optimized utilization of the treatment plant.

It may be provided that several treatment stations form one treatment unit, wherein several, and in particular all, treatment stations of a treatment unit, and in particular one or more or all of the first treatment stations and one or more or all second treatment stations of a treatment unit, are arranged on a common level of the treatment plant.

In one embodiment of the invention, it may be provided that the treatment plant include a main conveying path which extends in a main conveying direction and along which the workpieces can be conveyed by means of the conveying device from a treatment station to a further treatment station, wherein the main conveying path comprises one or more tunnel sections for housing the main conveying path.

Preferably, one or more tunnel sections, and in particular one or more tunnel sections arranged along the main conveying direction between two treatment stations, have a cleaning station and/or flushing station and/or spraying station, e.g., for applying a cleaning fluid, e.g., a degreasing fluid. The applied fluid can in particular be sprayed onto the workpieces or delivered to the workpieces in a stream-like manner.

It may happen that fluid drips off the workpieces during the conveyance of the same. The conveying device, and in particular a main conveying path, therefore preferably comprises one or more collecting elements which are designed, for example, as collecting troughs and serve to accommodate the fluid that drips down from the workpieces.

For sealing in a transition region between a treatment container and one or more collecting elements, and/or between a treatment container and a tunnel section, a flush termination and/or one or more sealing elements, e.g., sealing plates, sealing brushes, sealing hoods, and/or one or more suction devices, may be provided, for example.

It may be advantageous if the treatment station and/or the treatment plant comprises a blower device for blowing fluid from the workpieces. Such a blower device may be arranged, for example, within a treatment container and/or in a tunnel section and/or at a transition between them. For example, a blower device may be arranged and/or formed outside the treatment container in the region of the closing device.

A blower device comprises in particular one or more air-curtain devices for generating an air curtain for the global inflow of the workpieces and/or one or more nozzle devices, e.g., jet nozzles, for generating individual flow jets for local inflow of the workpieces, and in particular for directed blowing out of fluid accumulations.

The treatment plant preferably comprises two treatment units which are arranged on a common level of the treatment plant, wherein main conveying paths of the conveying devices of the two treatment units are oriented in antiparallel to one another and/or are arranged linearly in succession.

In particular, it may be provided that the two treatment units have feeding stations, arranged facing away from one another, for feeding the workpieces and/or removal stations, arranged facing one another, for removing the workpieces, and/or a common removal station for removing the workpieces, which is arranged in particular centrally between the main conveying paths.

Alternatively, it may be provided that the two treatment units have removal stations, arranged facing away from one another, for removing the workpieces and/or feeding stations, arranged facing one another, for feeding the workpieces, and/or a common feeding station for feeding the workpieces, which is arranged in particular centrally between the main conveying paths.

It may be advantageous if the conveying device comprises one or more branching conveyors by means of which the workpieces can be removed from a main conveying path and can be introduced into one or more treatment chambers, and/or by means of which the workpieces can be discharged from one or more treatment chambers and can be brought back onto the main conveying path.

In particular, in the case of such treatment plants, it may be provided, for the treatment of workpieces, and in particular for cleaning and/or coating vehicle bodies, that the following method steps be performed:

- Conveying one or more workpieces by means of a conveying device;
- Introducing the one or more workpieces into a treatment chamber of a treatment station for performing a treatment step;
- Flooding the treatment chamber with a fluid;
- Removing the fluid and discharging the workpieces from the treatment chamber by means of the conveying device, wherein the workpieces are in particular introduced into the treatment chamber and discharged from the same in an at least approximately horizontal direction.

It is preferably further provided that the workpieces be conveyed along a main conveying direction from one treatment station to the next and be introduced into the treatment chambers of the treatment stations in an introduction direction extending transversely, and in particular perpendicularly, to the main conveying direction.

In a further embodiment of a treatment plant, it may be provided that the treatment plant comprise several treatment stations for treating the workpieces, and in particular for cleaning and/or coating vehicle bodies, wherein one or more treatment stations respectively comprise at least one treatment container which surrounds a treatment chamber for accommodating the workpieces, wherein the treatment plant comprises a fluid guide by means of which one or more of the treatment chambers can be selectively flooded or emptied.

The treatment plant preferably comprises a conveying device for conveying the workpieces, by means of which, in an emptied state of the respective treatment chamber, the workpieces can be introduced into the same through an access opening designed as an introduction opening, and by means of which, in an emptied state of the respective treatment chamber, the workpieces can be discharged from the same through an access opening designed as a discharge opening.

The introduction opening and the discharge opening are preferably distinct access openings, and in particular in opposite side walls of a treatment station.

It may be advantageous if the workpieces can be moved, and in particular can be introduced into the treatment chamber and/or can be discharged from the treatment chamber, along a horizontal plane by means of the conveying device.

Preferably, a height position of the workpieces remains at least approximately unchanged during the introduction of the same into the treatment chamber and/or during the discharge of the same from the treatment chamber.

It may be favorable if the treatment plant comprises a main conveying path which extends in a main conveying direction and along which the workpieces can be conveyed by means of the conveying device from a treatment station to a further treatment station.

Furthermore, it may be provided that the workpieces be able to be conveyed, in a longitudinal orientation of the same, along the main conveying direction and/or along the main conveying path.

The workpieces can preferably be conveyed, in a longitudinal orientation of the same, through one or more treatment chambers.

It may be provided that the conveying device comprise one or more transfer stations, at which or by means of which the workpieces can selectively be transferred from a treatment station to a further treatment station, which follows along a main conveying direction, of the same treatment unit and/or of a treatment unit different therefrom of the treatment plant. By means of such a transfer station, a transfer of workpieces from a treatment unit to a further treatment unit, in particular, can take place, e.g., in order to be able to temporarily bypass a treatment station, which is defective or to be maintained or to be cleaned, of a treatment unit without having to completely take the relevant treatment unit out of operation.

It may be favorable if the treatment plant comprises several treatment stations for performing identical treatment steps, wherein two or more such treatment stations are preferably arranged adjacently to one another and/or are parts of treatment units, extending in parallel to one another, or their treatment lines of the treatment plant.

A treatment line is in particular a treatment unit in which the treatment stations of the treatment unit are arranged in succession along a treatment direction, and in particular a main conveying direction.

In one embodiment of the invention, it may be provided that the treatment plant comprise a main conveying path which extends in a main conveying direction and along which the workpieces can be conveyed by means of the conveying device from a treatment station to a further treatment station, wherein the main conveying path comprises one or more tunnel sections for housing the main conveying path, wherein one or more tunnel sections, and in particular one or more tunnel sections arranged along the main conveying direction between two treatment stations, have a cleaning station and/or flushing station and/or spraying station.

One or more cleaning stations and/or flushing stations and/or spraying stations are preferably arranged and/or formed on one or more transfer stations.

In order to separate individual tunnel sections and/or one or more cleaning stations and/or flushing stations and/or spraying stations, a mechanical gate, e.g., a rolling gate or a high-speed gate, may be provided.

The treatment plant preferably comprises at least two treatment stations for performing the same treatment process, wherein a distributor device or a combining device are arranged in front of and/or after these treatment stations with respect to a main conveying direction of the workpieces.

By means of a distributor device, the workpieces fed via a conveying device can preferably be allocated or distributed to the at least two treatment stations. As a result, a common feeding of the workpieces may be provided in order to optimize the conveying outlay.

By means of a combining device, the workpieces discharged from the at least two treatment stations can preferably be combined and conveyed further together, so that a conveying outlay can preferably likewise be minimized.

The distributor device and/or the combining device are preferably respectively designed as a transverse displacement device.

In the case of such a transverse displacement device, it is in particular provided that the workpieces be displaced in a direction transverse, and in particular perpendicular, to a main conveying direction, in order to subsequently enable further conveying offset in parallel to the main conveying direction, and in particular a further conveying offset in parallel to the main conveying path.

The treatment plant preferably comprises one or more treatment stations for performing flooding processes and one or more treatment stations for performing dipping processes.

In treatment stations for performing flooding processes, the workpiece is preferably kept stationary while the fluid is introduced into the treatment chamber and a flooding process is thus performed.

In contrast, in treatment stations for performing dipping processes, the fluid is preferably substantially stationary so that the workpiece is introduced into the fluid in particular from above and is moved upwards out of the fluid after the treatment process has been performed, e.g., by turning in and turning out or lowering and raising the respective workpiece.

The one or more treatment stations for performing flooding processes are respectively used for pretreating, and in particular cleaning, degreasing, and/or phosphating, the workpieces.

The one or more treatment stations for performing dipping processes are preferably used for coating, and in particular for painting, the workpieces; for example, a cathodic dip-painting plant in the form of treatment stations for performing dipping processes maybe provided subsequent to one or more treatment stations for performing flooding processes.

In order to treat the workpieces, a method is in particular carried out which comprises the following:

- Conveying one or more workpieces by means of a conveying device;
- Introducing the one or more workpieces into a treatment chamber of a treatment station for performing the treatment step;
- Flooding the treatment chamber with a fluid;
- Removing the fluid and discharging the workpieces from the treatment chamber by means of the conveying device,
- wherein, in an empty state of the respective treatment chamber, the workpieces are introduced into the same by means of the conveying device through an access opening designed as an introduction opening and by means of which, in an empty state of the respective treatment chamber, the workpieces are discharged from the same through an access opening designed as a discharge opening, wherein the introduction opening and the discharge opening are preferably distinct access openings.

The workpieces are preferably conveyed, in a longitudinal orientation of the same, along a main conveying direction from one treatment station to the next and are conveyed in the same longitudinal orientation through the treatment chambers of the treatment stations.

It may be favorable if one or more treatment stations, and in particular one or more treatment containers and/or fluid tanks, are designed and/or arranged to be transported modularly and/or separately as a whole. In particular, it may be provided that one or more treatment stations, and in particular one or more treatment containers and/or fluid tanks, be arranged as required on a main conveying path or remotely therefrom and accordingly be able to optionally be populated with workpieces or be able to be bypassed in the treatment sequence.

Further preferred features and/or advantages of the invention are the subject matter of the following description and the drawings illustrating exemplary embodiments.

Figure 1:
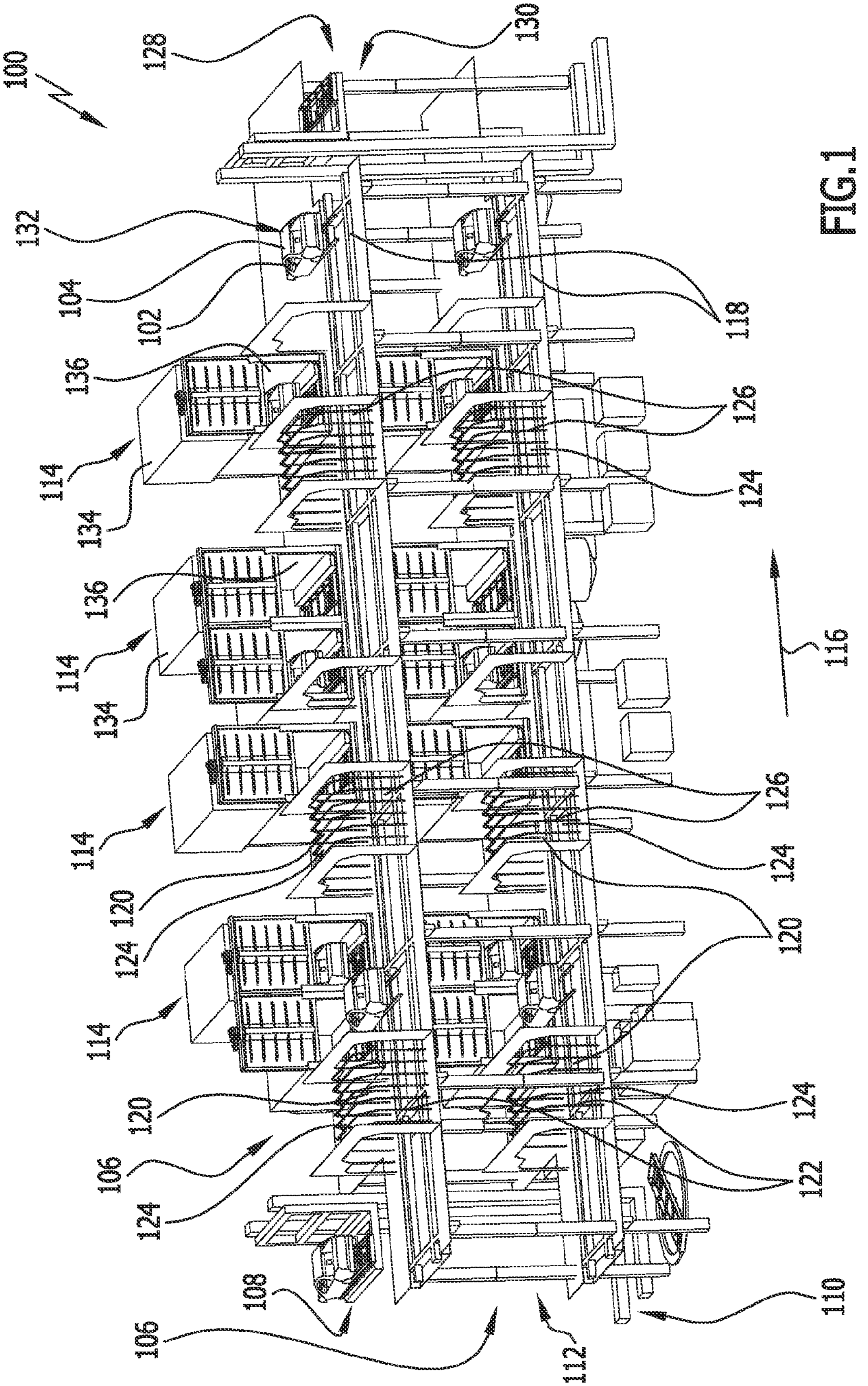
FIG. 1 shows a schematic perspectival illustration of a first embodiment of a treatment plant in which two treatment units arranged one above the other are provided with in each case several treatment stations, wherein the workpieces can be conveyed by means of a conveying device in a transverse orientation along a main conveying direction.
Figure 2:
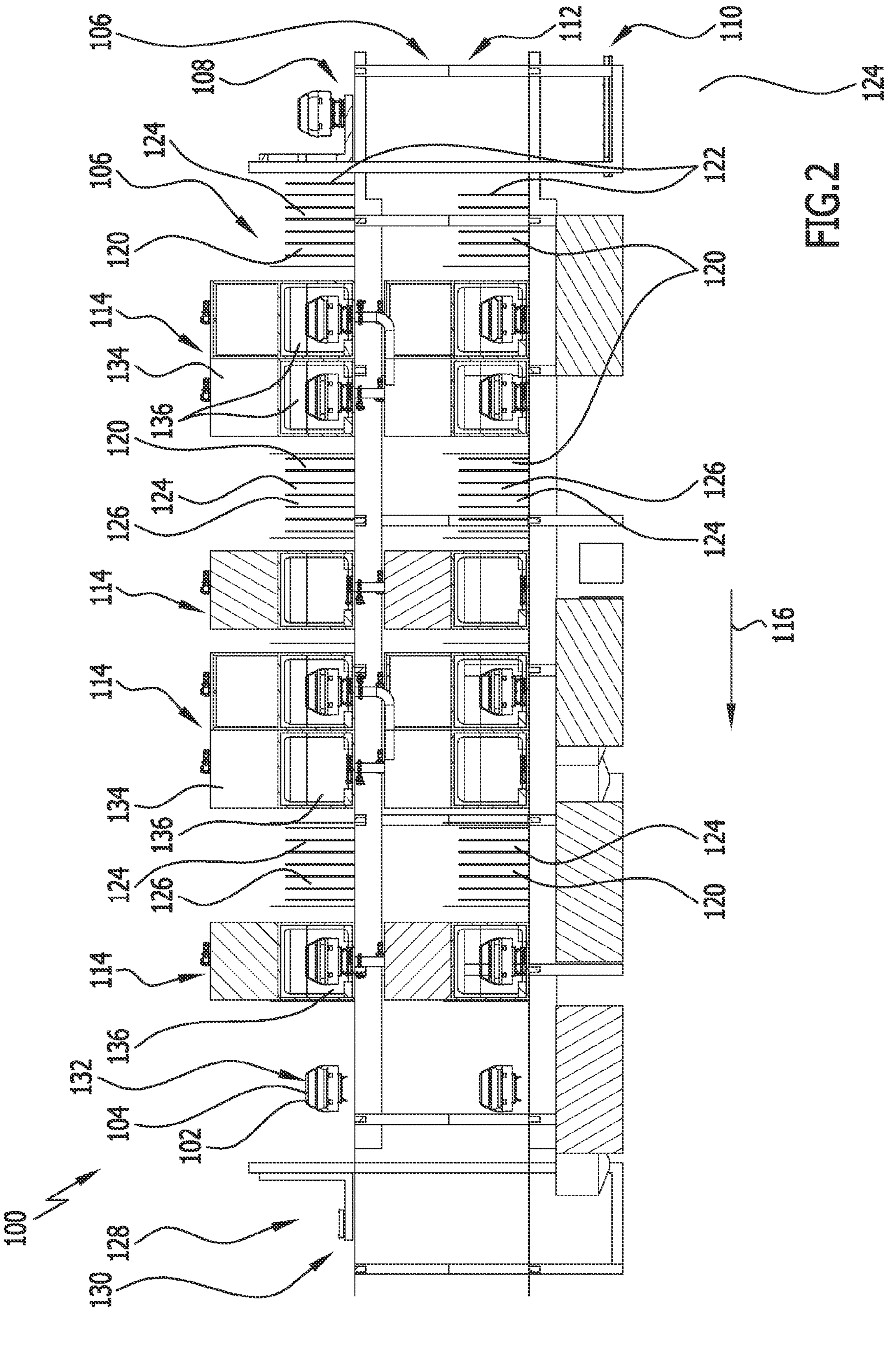
FIG. 2 shows a schematic vertical sectional view through the treatment plant of FIG. 1.

The same or functionally equivalent elements are provided with the same reference signs in all figures.

DETAILED DESCRIPTION OF THE DRAWINGS

A treatment plant shown in FIGS. 1 through 6 and denoted as a whole by 100 serves for treating workpieces 102, e.g., vehicle bodies 104.

The treatment plant 100 comprises one or more treatment units 106, e.g., two treatment units 106, which are selectively passed through by the workpieces 102 in order to perform several treatment steps.

In the first embodiment of the treatment plant 100 shown in FIGS. 1 through 6, a feeding station 108 for feeding to the treatment units 106 is provided.

The feeding station 108 is part of a conveying device 110 of the treatment plant 100.

Preferably, the feeding station 108 forms a distributor device 112 for distributing the workpieces 102 to the treatment units 106.

The feeding station 108 is designed, for example, as a lift and serves to feed the workpieces 102 to treatment units 106 arranged on different levels of the treatment plant 100.

The treatment plant 100, and in particular each treatment unit 106, comprises one or more treatment stations 114 for treating the workpieces 102, and in particular for performing flooding processes to be described in greater detail.

The treatment stations 114 are arranged in succession along a main conveying direction 116 of the conveying device 110.

In the first embodiment of the treatment plant 100 shown in FIGS. 1 through 6, a main conveying path 118 of the conveying device 110 is provided, which extends along all treatment stations 114 and from which the workpieces 102 can be fed to the individual treatment stations 114.

The main conveying path 118 comprises in particular one or more tunnel sections 120 for housing at least individual sections of the main conveying path 118.

Furthermore, the main conveying path 118 preferably comprises one or more cleaning stations 122 and/or spraying stations 124 and/or flushing stations 126.

The cleaning station 122, the spraying station 124, and/or the flushing station 126 are arranged and/or formed—in particular, with respect to the main conveying direction 116—in front of one or more treatment stations 114, between several treatment stations 114, and/or after one or more treatment stations 114.

After the treatment of the workpieces 102, the same can be conveyed further by means of a removal station 128.

The removal station 128 in particular forms a combining device 130 for combining the workpieces 102 treated on the different treatment units 106 and for the joint further conveying of the same.

In the first embodiment of the treatment plant 100 shown in FIGS. 1 through 6, the workpieces 102 can be conveyed in particular in a transverse orientation 132, and in particular can be conveyed along the main conveying direction 116 in a transverse orientation 132.

Into the treatment stations 114, which in particular laterally adjoin the main conveying path 118, the vehicle bodies 104 are preferably introduced along a longitudinal axis of the same.

Figure 3:
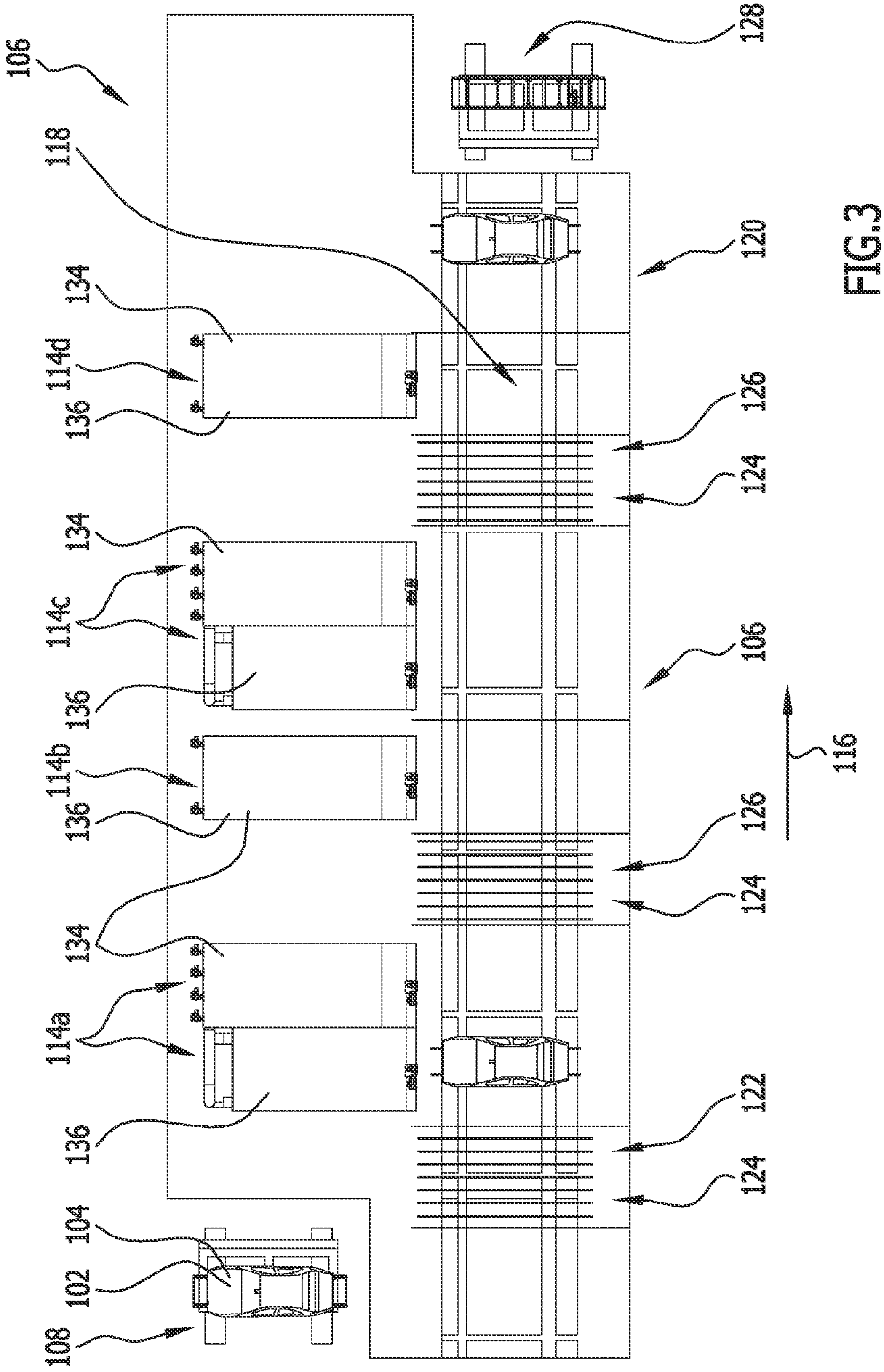
FIG. 3 shows a schematic plan view from above of the treatment plant of FIG. 1.

As can be seen in particular in FIG. 3, a first treatment station 114*a*, a second treatment station 114*b*, a third treatment station 114*c*, and a fourth treatment station 114*d* are provided in each treatment unit 106, for example.

A fluid tank 134 is preferably assigned to each treatment station 114*a*, 114*b*, 114*c*, 114*d*.

Moreover, each treatment station 114*a*, 114*b*, 114*c*, 114*d* comprises one or more treatment containers 136 for performing a workpiece treatment.

The workpieces 102 can be treated in particular with one or more fluids formed as liquids.

During the conveying of the workpieces 102, it is thus possible in particular for liquid to drip off the same.

The conveying device 110, and in particular the main conveying path 118, therefore preferably comprises one or more collecting elements 138, which are designed, for example, as collecting troughs and serve to accommodate liquid dripping down from the workpieces 102.

The collecting elements 138 are in particular integrated into a fluid guide, to be described, of the treatment plant 100 in order to be able to reuse or discharge the liquid collected therewith.

Figure 6:
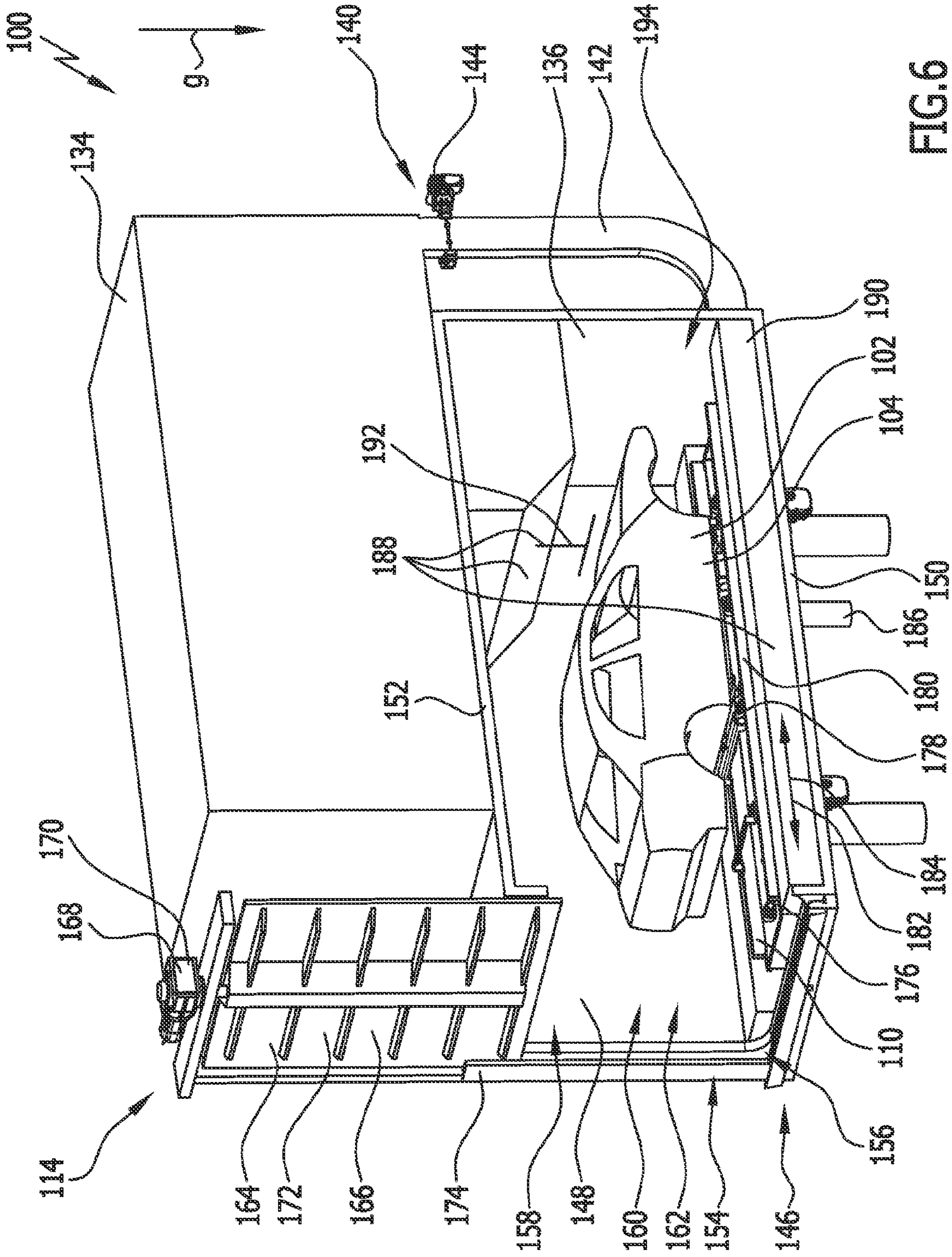
FIG. 6 shows a further schematic perspectival illustration of the treatment station of FIG. 5, wherein a side wall of a treatment container of the treatment station is hidden.
Figure 7:
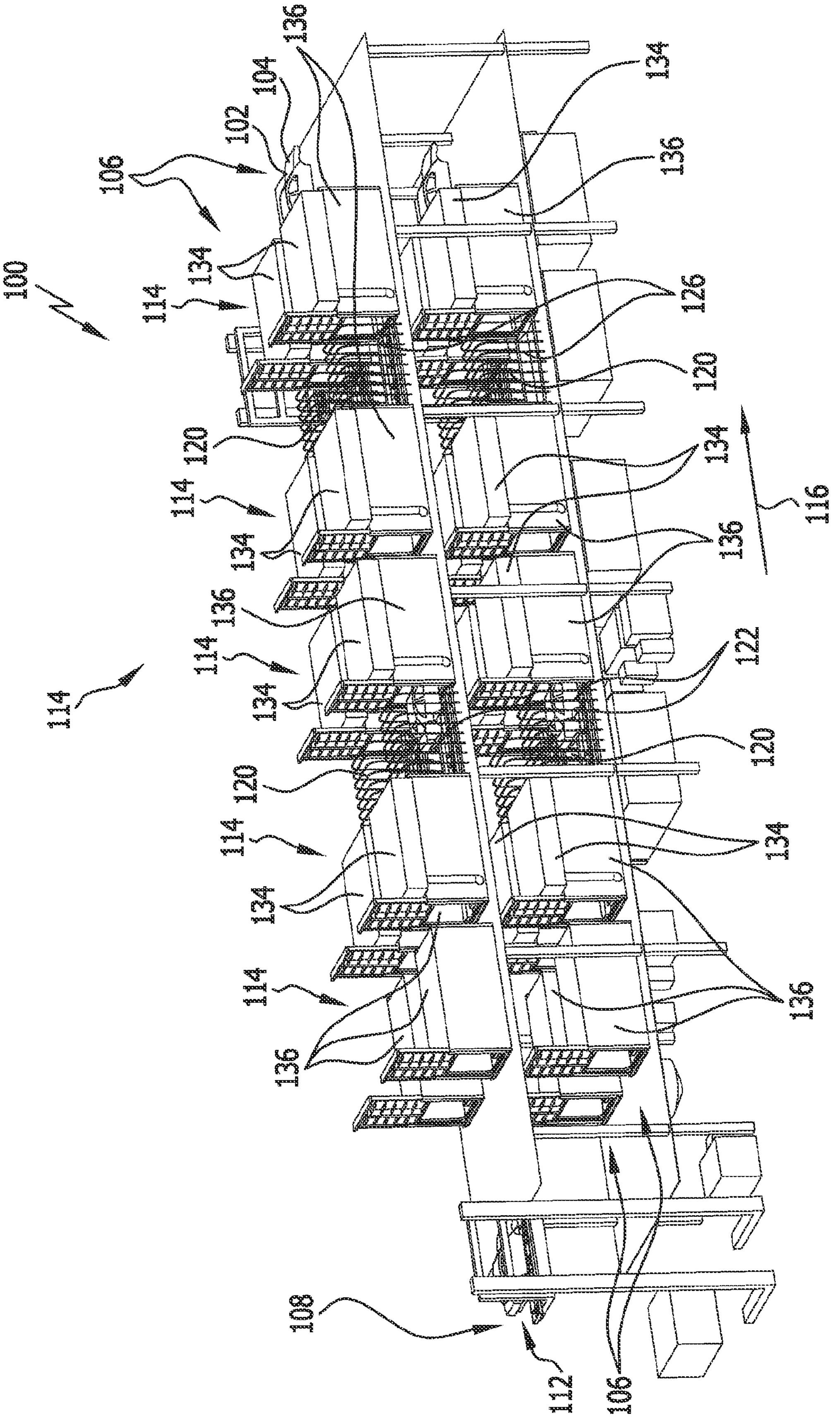
FIG. 7 shows a schematic perspectival illustration, corresponding to FIG. 1, of a second embodiment of a treatment plant in which the workpieces can be conveyed, in a longitudinal orientation of the same, along a main conveying direction.
Figure 8:
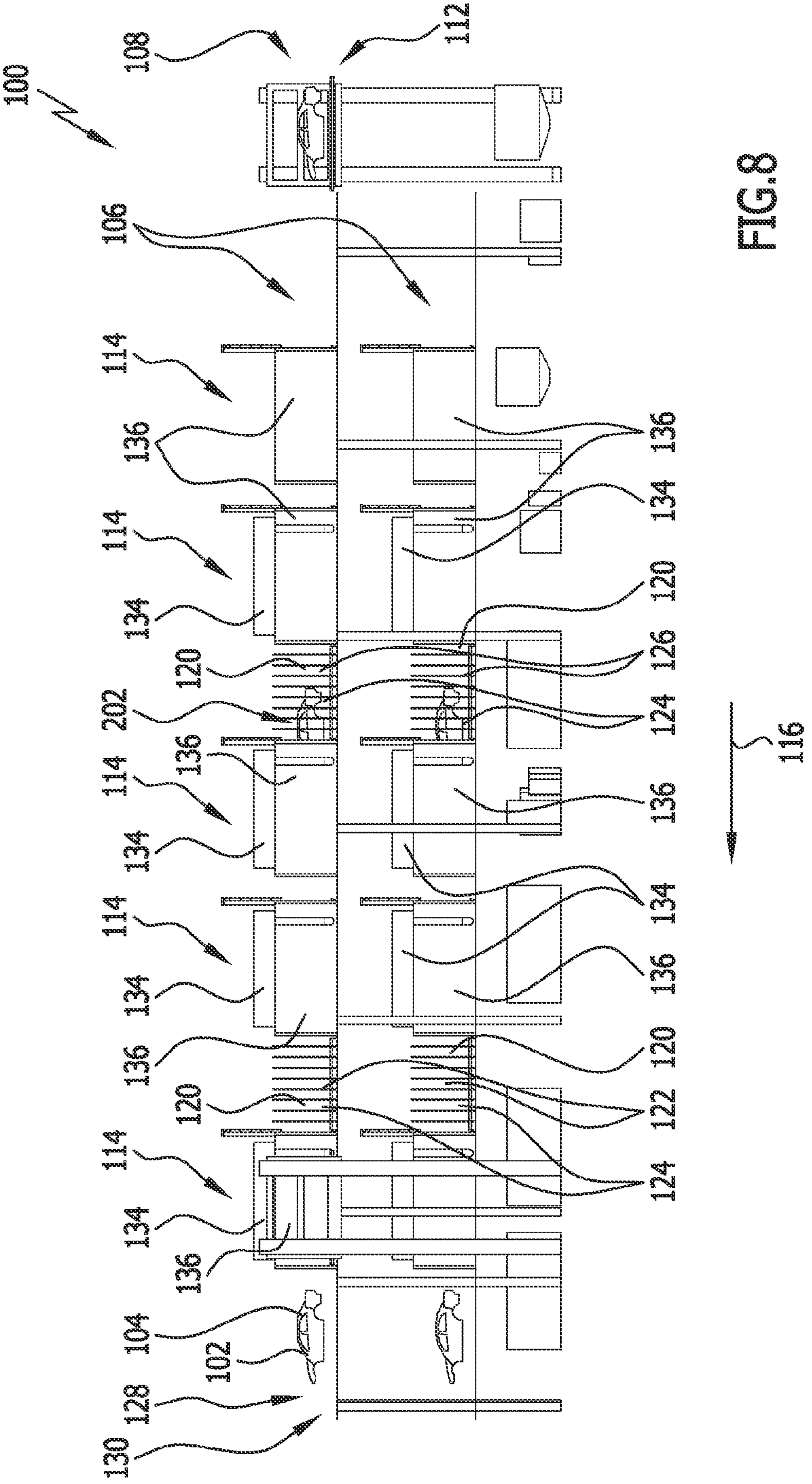
FIG. 8 shows a schematic side view of the treatment plant of FIG. 7.
Figure 9:
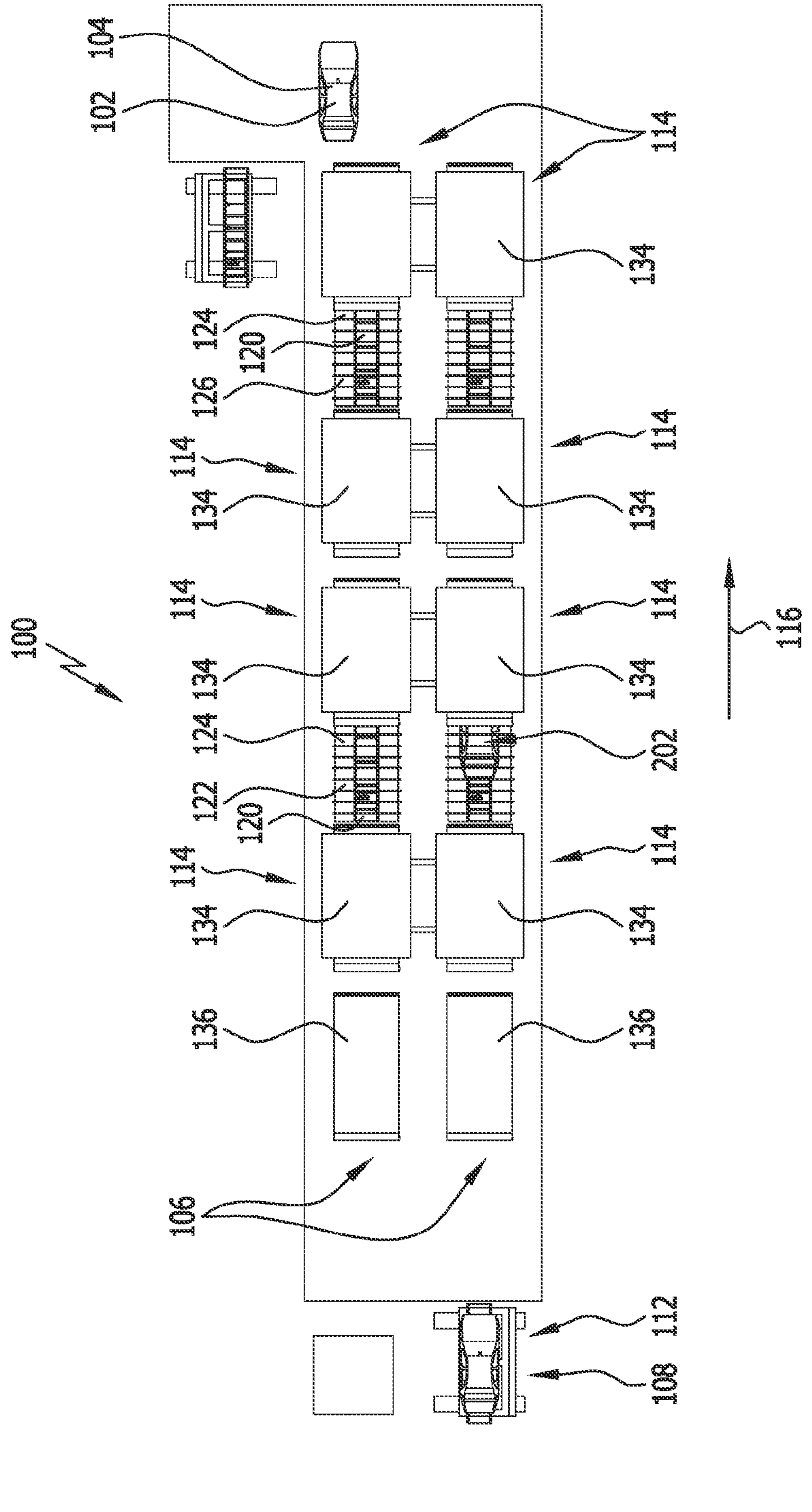
FIG. 9 shows a schematic plan view from above of the treatment plant of FIG. 7.
Figure 10:
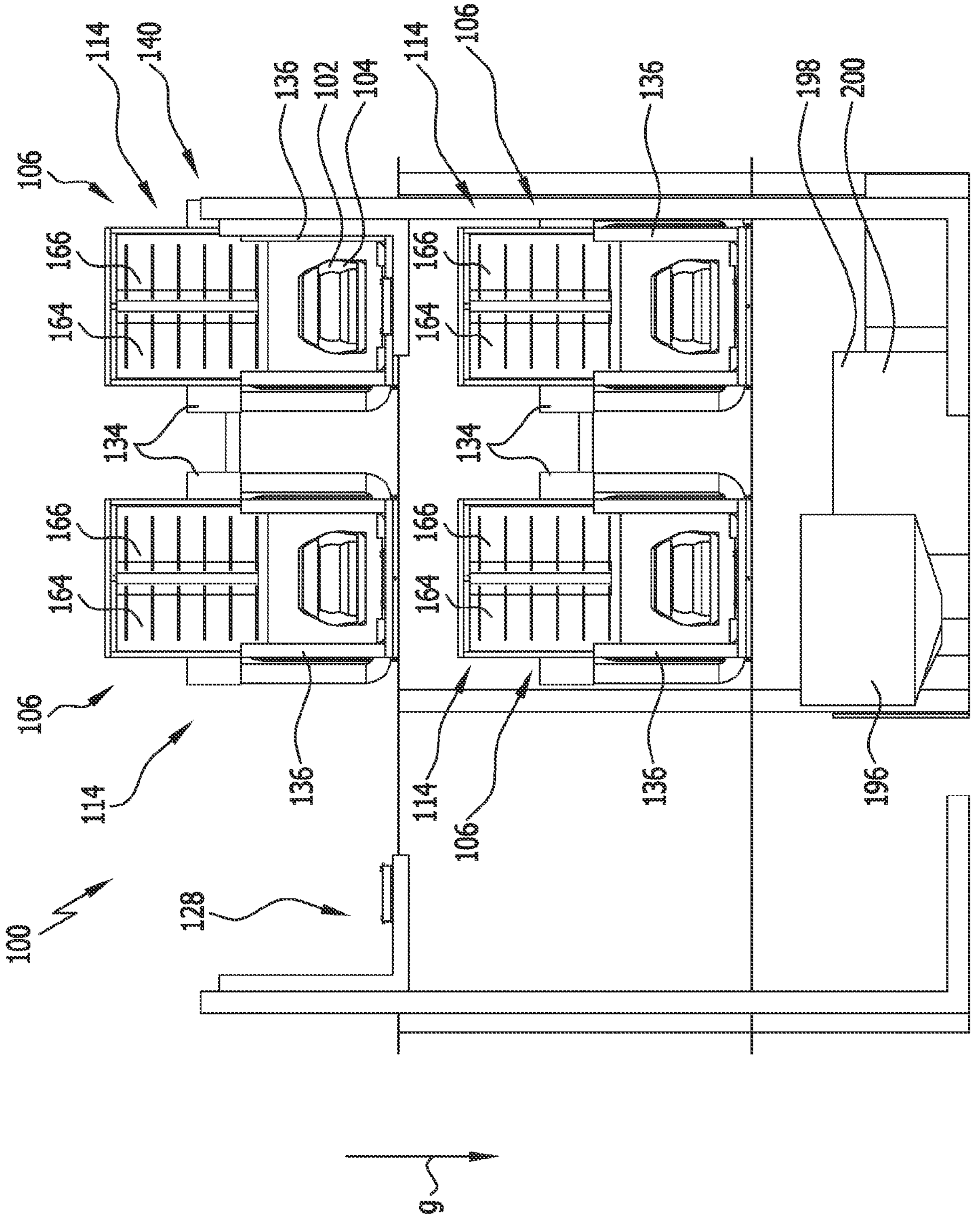
FIG. 10 shows a schematic vertical cross-section through the treatment plant of FIG. 7.

As is apparent in particular in FIG. 6, each treatment station 114 comprises a fluid tank 134, which is arranged, for example, above a treatment container 136 and is, for example, a liquid tank.

The fluid tank 134 and the treatment container 136 are connected to one another by means of a fluid guide 140 or form a part of a fluid guide 140.

The fluid guide 140 in particular comprises a fluid line, e.g., a feed line 142, by means of which the fluid from the fluid tank 134 can be introduced into the treatment container 136.

By means of a valve device 144, the feeding can in particular be controlled and/or regulated with regard to the volume flow.

The feed line 142 in particular opens in a bottom region 146 into a treatment chamber 148 within the treatment container 136.

The treatment container 136 in particular comprises a closed bottom wall 150, a closed top wall 152, two closed sides walls 154, and a closed front wall (further side wall) 156.

The further front wall 156, i.e., the further and thus fourth side wall 154, is preferably provided with an access opening 158.

The access opening 158 preferably extends over at least approximately 60%, preferably at least approximately 80%, and in particular at least approximately 95%, of a total area of the front wall 156.

The access opening 158 in particular serves to introduce the workpieces 102 and/or to discharge the workpieces 102.

The access opening 158 is thus in particular an introduction opening 160 and/or a discharge opening 162.

The access opening 158 can preferably be closed by means of a closing device 164 of the treatment station 114.

The closing device 164 in particular comprises a closing element 166 which can be selectively brought into an open position or into a closed position by means of a closing drive 168.

The closing drive 168 is or comprises, for example, a lifting device 170.

In particular, the closing drive 168 comprises an electric motor and a spindle drive for driving, and in particular raising and lowering, the closing element 166.

The closing element 166 can thereby preferably be moved in front of the access opening 158 or raised above the same.

The closing element 166 in particular forms a lock gate 172 of the closing device 164.

For guiding the closing element 166 and/or for supporting a fluid pressure acting on the closing element 166 during a flooding process in the treatment container 136, a guiding device 174 is preferably, on the treatment container 136, provided for the displaceable accommodation and guidance of the closing element 166.

The closing device 164 is preferably designed to be self-locking and/or self-sealing in order to ensure fluid tightness of the treatment container 136.

A conveying device 110 or at least a section of a conveying device 110 is in particular arranged and/or formed in the bottom region 146 of the treatment container 136.

In particular, a guiding device 176 of the conveying device 110 for the load-bearing accommodation of the workpieces 102 is arranged and/or formed in the bottom region 146.

By means of this guiding device 176, accommodation devices 178, e.g., skids 180 for accommodating workpieces 102 designed as vehicle bodies 104, can in particular be accommodated and can be introduced into the treatment chamber 148 and/or discharged from the same in an introduction direction 182, and in particular in a horizontal direction 184. The conveying device 110 preferably has only the guiding device 176 within the treatment container 136. Drive components of the conveying device 110 are preferably arranged and/or formed outside the treatment container 136.

In order to perform a flooding process in the treatment container 136, the fluid can be fed via the feed line 142. By means of a discharge line 186, the fluid can preferably be discharged from the treatment container 136.

In order to be able to have fluid flow completely around the workpiece 102 or to let the workpiece 102 completely sink into the fluid, the interior (treatment chamber 148) of the treatment container 136 must be filled with fluid to a certain filling-height.

In order to minimize the quantity of fluid required for this purpose, one or more installation elements 188, and in particular installation elements 188 designed as displacement elements 190, are preferably provided.

A displacement element 190 serves in particular to minimize the free space in the treatment chamber 148, which would unnecessarily have to be filled with fluid.

In this case, the displacement elements 190 are in particular adapted at least in sections to a shape of the workpiece 102 to be treated; for example, a shape, facing the workpiece 102, at least approximately follows a shape of a front region of the workpiece 102 (see FIG. 6).

Moreover, in the region of the conveying device 110, at least one installation element 188 designed as a displacement element 190 may be provided in order to minimize the free spaces in the bottom region 146.

For example, one or more support elements 192 may be provided as further installation elements 188.

A support element 192 may, for example, support the workpiece 102 at least in regions in order to secure it, and in particular to support it, against a movement and/or deformation during the flooding process. As a result, an accelerated flooding of the treatment chamber 148 can preferably be realized.

After flooding has taken place, the respective support element 192 is preferably removed from the workpiece 102 in order to ensure complete wetting of and/or flow around the workpiece 102 with fluid.

Furthermore, one or more displacement elements 190 may be moved before, during, and/or after the flooding process in order to enhance the flooding process.

In particular when the fluid tends towards foam formation during inflow of the same, it may be provided that it flow into the treatment chamber 148 in an inflow region 194 below a permanent and/or minimum fluid level. This inflow region 194 is in particular arranged below the access opening 158 in order to avoid undesired outflow of fluid when the closing device 164 is opened.

Figure 4:
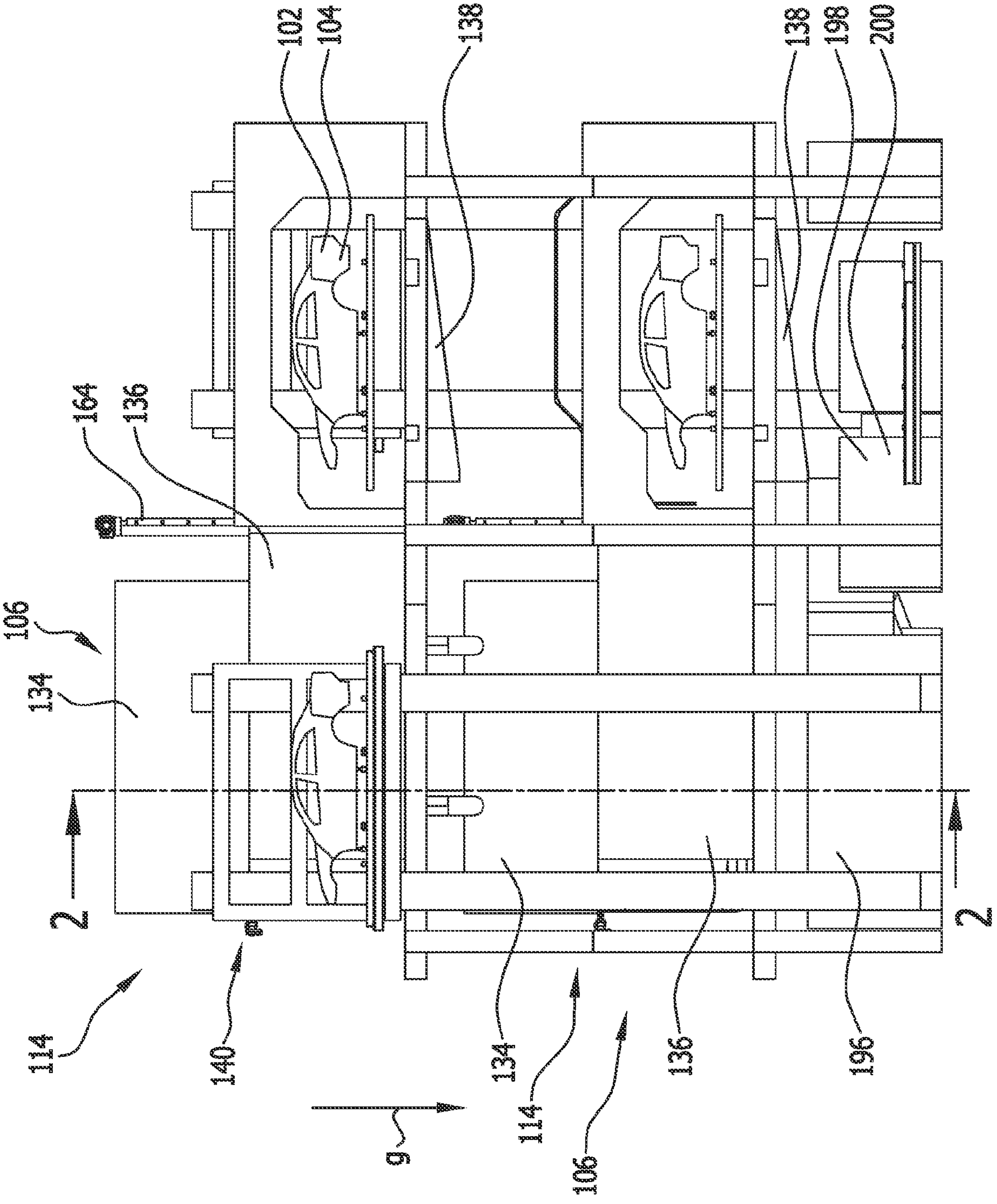
FIG. 4 shows a schematic vertical cross-section through the treatment plant of FIG. 1.
Figure 5:
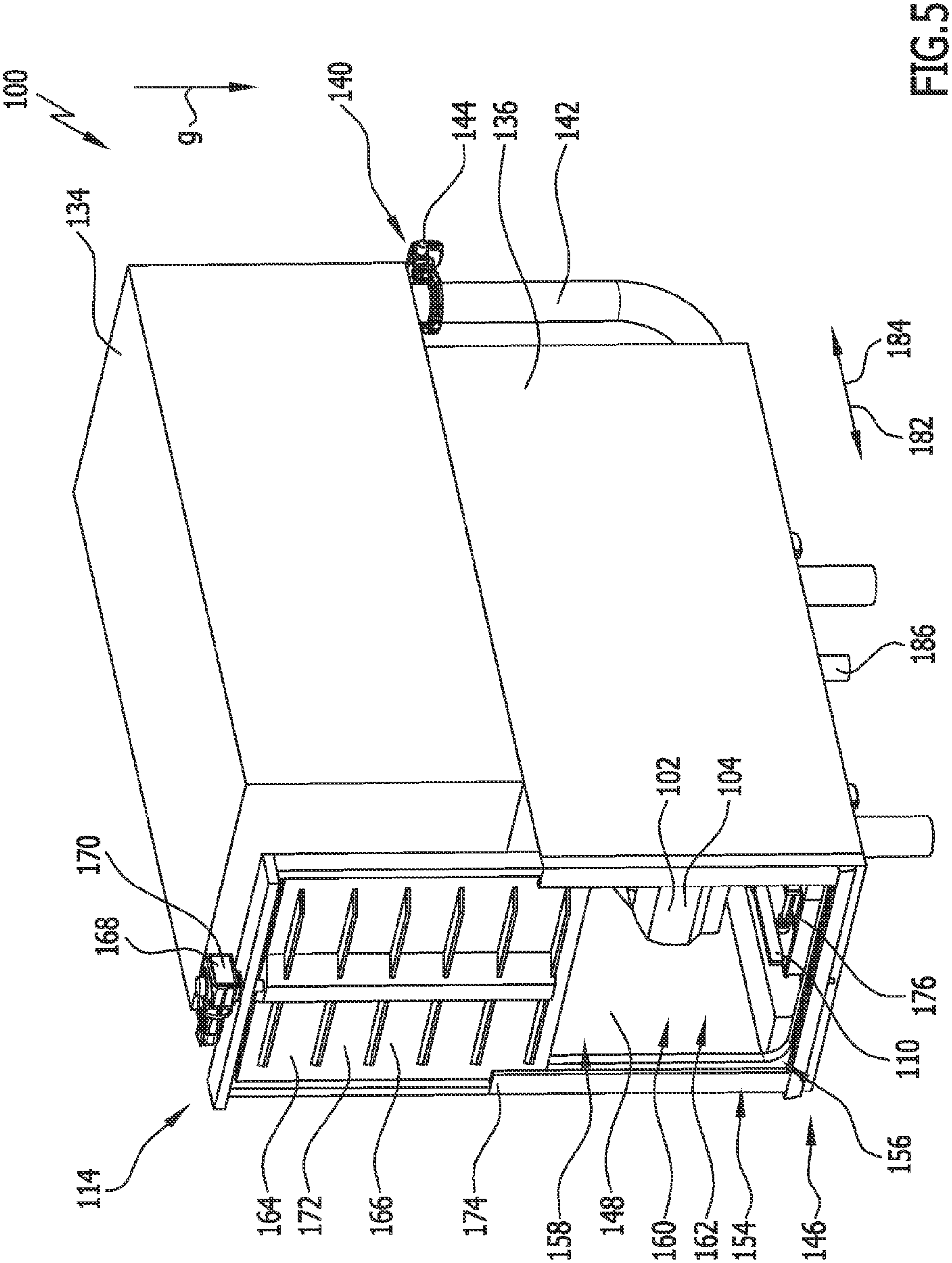
FIG. 5 shows a schematic perspectival illustration of a treatment station of the treatment plant of FIG. 1.

As can be seen in particular in FIG. 4, the treatment stations 114 of distinct treatment units 106 can be connected to one another by means of one or more common fluid guides 140.

It may in particular be provided that, by means of the fluid guide 140, fluid from a fluid tank 134 of an upper—with respect to the direction of gravity g—treatment unit 106 first be guided into a treatment container 136 of this upper treatment unit 106, subsequently be introduced from the treatment container 136 into a fluid tank 134 of a lower—with respect to the direction of gravity g—treatment unit 106, and thus be available for use for a flooding process in a treatment container 136 of the lower treatment unit 106.

Subsequently, the fluid can be guided, for example, into a counter tank 196, arranged below the lower treatment unit 106, from where the fluid is guided, for example, by means of a pump device 198 and/or after cleaning thereof by means of a cleaning device 200 back into the fluid tank 134 of the upper treatment unit 106.

Such fluid guides 140 can in principle be provided for any type of treatment station 114 of in each case several treatment units 106.

A second embodiment of a treatment plant 100 shown in FIGS. 7 through 12 differs from the first embodiment shown in FIGS. 1 through 6 essentially in that the workpieces 102 are conveyed in a longitudinal orientation 202 along the main conveying direction 116 through the treatment containers 136 of the treatment stations 114.

Figure 11:
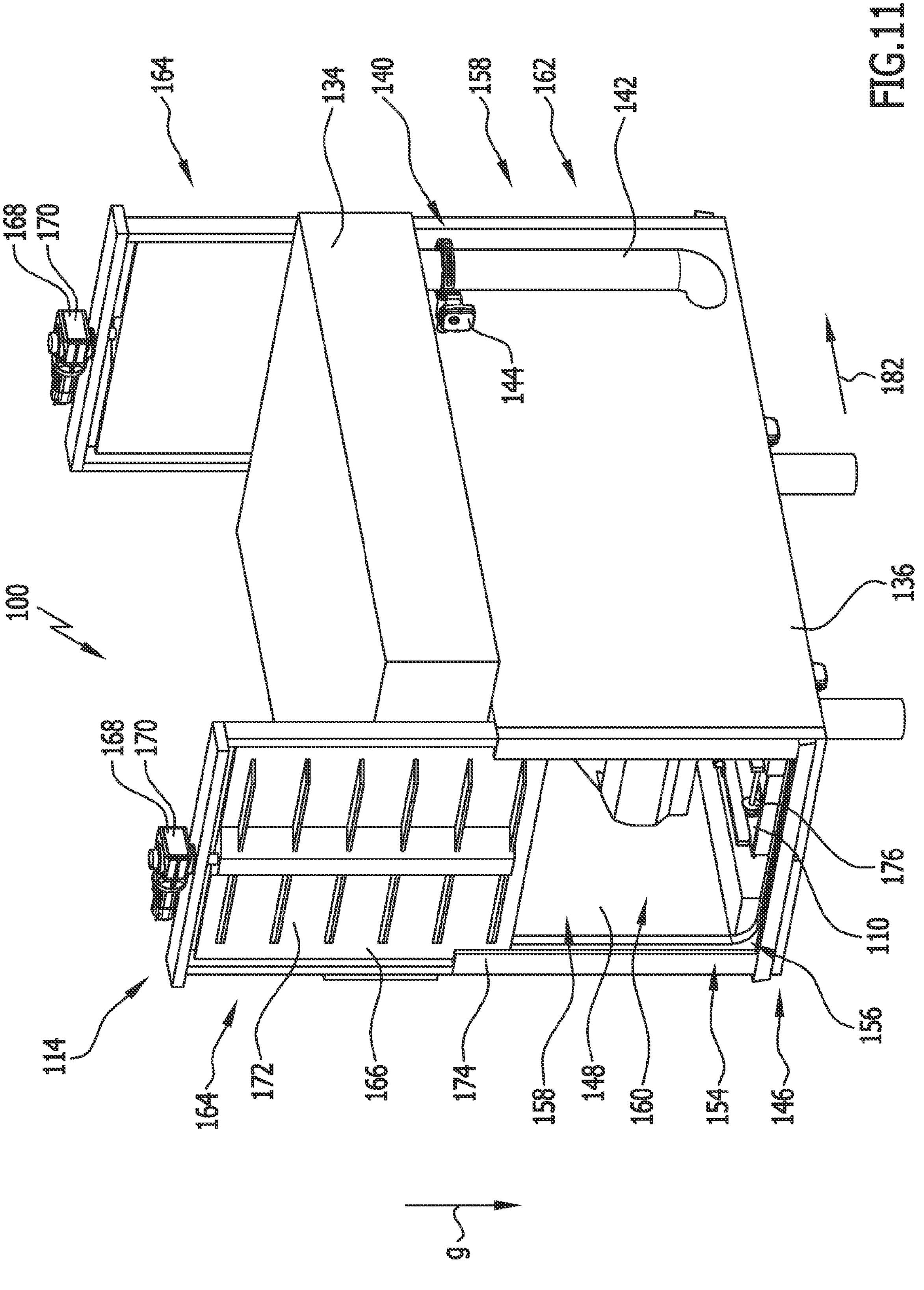
FIG. 11 shows a schematic perspectival illustration, corresponding to FIG. 5, of a treatment station of the treatment plant of FIG. 7.
Figure 12:
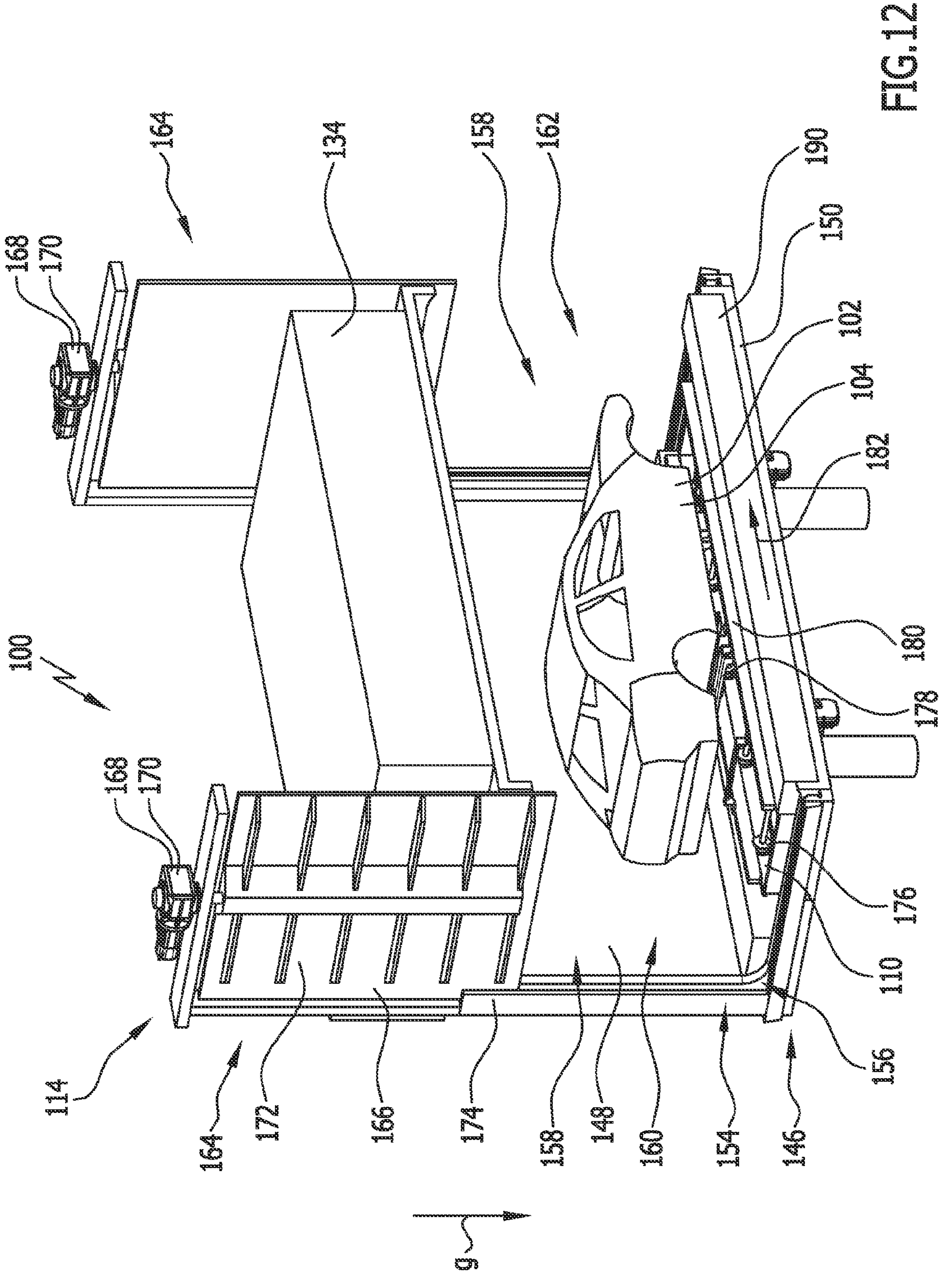
FIG. 12 shows a schematic perspectival illustration, corresponding to FIG. 11, of the treatment station of the treatment plant of FIG. 7, wherein a side wall of a treatment container of the treatment station is hidden.

As can be seen in particular in FIGS. 11 and 12, the treatment containers 136 of the treatment stations 114 are provided for this purpose on both sides with access openings 158, wherein an access opening 158 forms the introduction opening 160, and the further access opening 158 forms the discharge opening 162.

In this case, the workpieces 102 can be conveyed through the treatment chambers 148 in particular in the introduction direction 182.

Both access openings 158 are to be closed for performing a flooding process in the treatment chambers 148. For this purpose, a separate closing device 164 is assigned to each access opening 158.

In the embodiment shown in FIGS. 7 through 12, the treatment stations 114 arranged one behind the other form treatment lines, for example.

Each treatment line may be a treatment unit 106, so that, for example, two treatment units 106, respectively, can be arranged on the same level.

The fluid guides 140 may be assigned to the treatment stations 114 on the same level or on different levels (see in particular FIG. 10) in order to enable optimized fluid guidance and/or fluid utilization.

Otherwise, the second embodiment of the treatment plant 100 shown in FIGS. 7 through 12 corresponds with regard to structure and function to the first embodiment shown in FIGS. 1 through 6, so that reference is made, in this respect, to the above description thereof.

Figure 13:
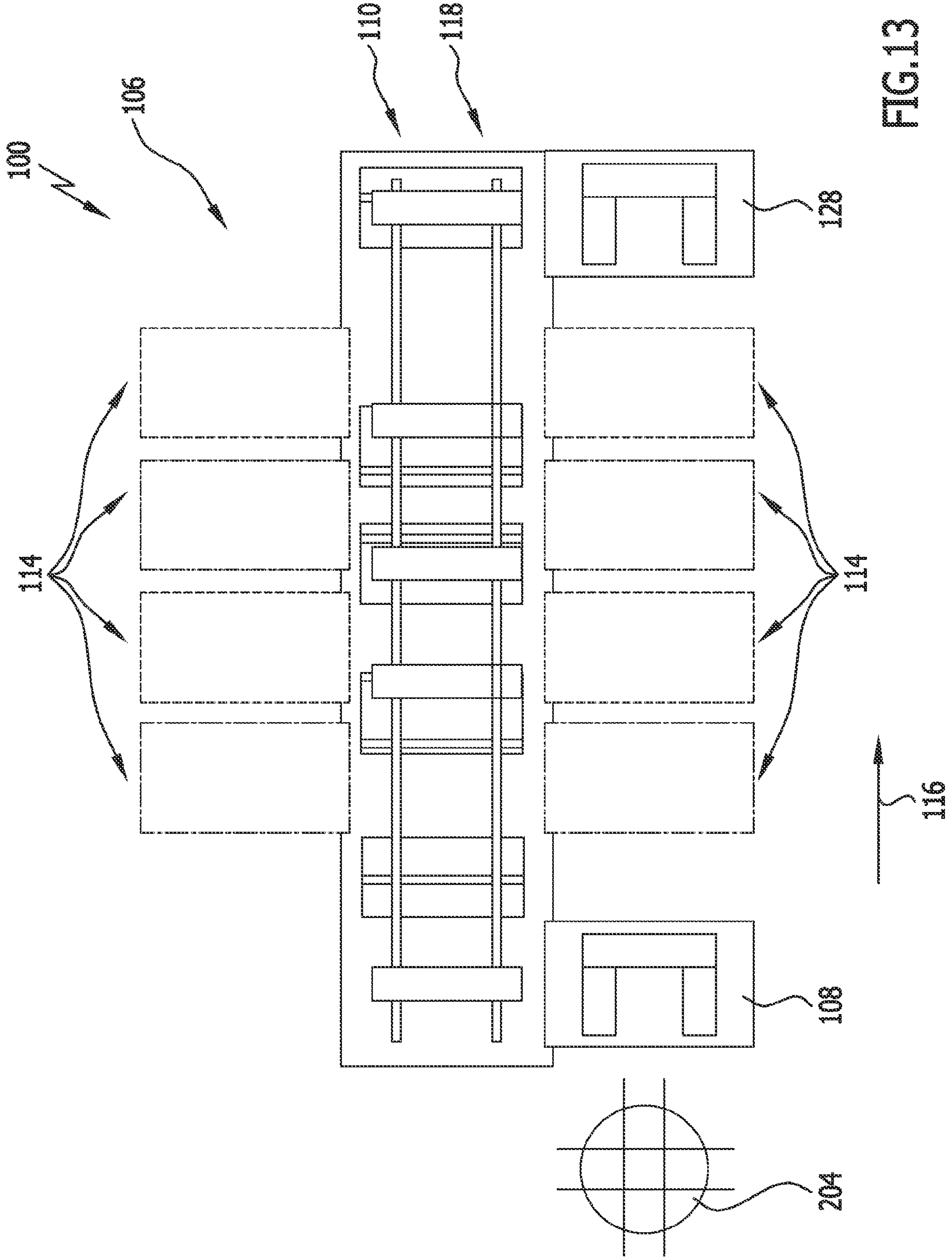
FIG. 13 shows a schematic plan view of a third embodiment of a treatment plant in which treatment stations are provided on both sides of a main conveying path.

A third embodiment of a treatment plant 100 shown in FIG. 13 differs from the first embodiment shown in FIGS. 1 through 6 essentially in that the treatment stations 114 are arranged on both sides of the main conveying path 118.

By means of the conveying device 110, the workpieces 102 can thus be introduced selectively to the right or left of the main conveying path 118 into the treatment chambers 148 of the treatment stations 114 in order to perform the workpiece treatment. As a result, the main conveying path 118 can be particularly short and compact.

By means of a turntable 204, an orientation of the workpieces 102 can be changed in particular in front of or at the feeding station 108 in order to enable an optimized feeding to the main conveying path 118.

A fluid guide 140 (not shown in FIG. 13) is, for example, provided in the third embodiment shown in FIG. 13 in such a way that the treatment stations 114 arranged opposite one another with respect to the main conveying path 118 always have a common fluid guide 114, and thus serve to perform the same treatment step.

The third embodiment of the treatment plant 100 shown in FIG. 13 can form a treatment unit 106, which can of course be provided several times, and in particular one above the other.

Otherwise, the third embodiment of the treatment plant 100 shown in FIG. 13 corresponds with regard to structure and function to the first embodiment shown in FIGS. 1 through 6, so that reference is made, in this respect, to the above description thereof.

Figure 14:
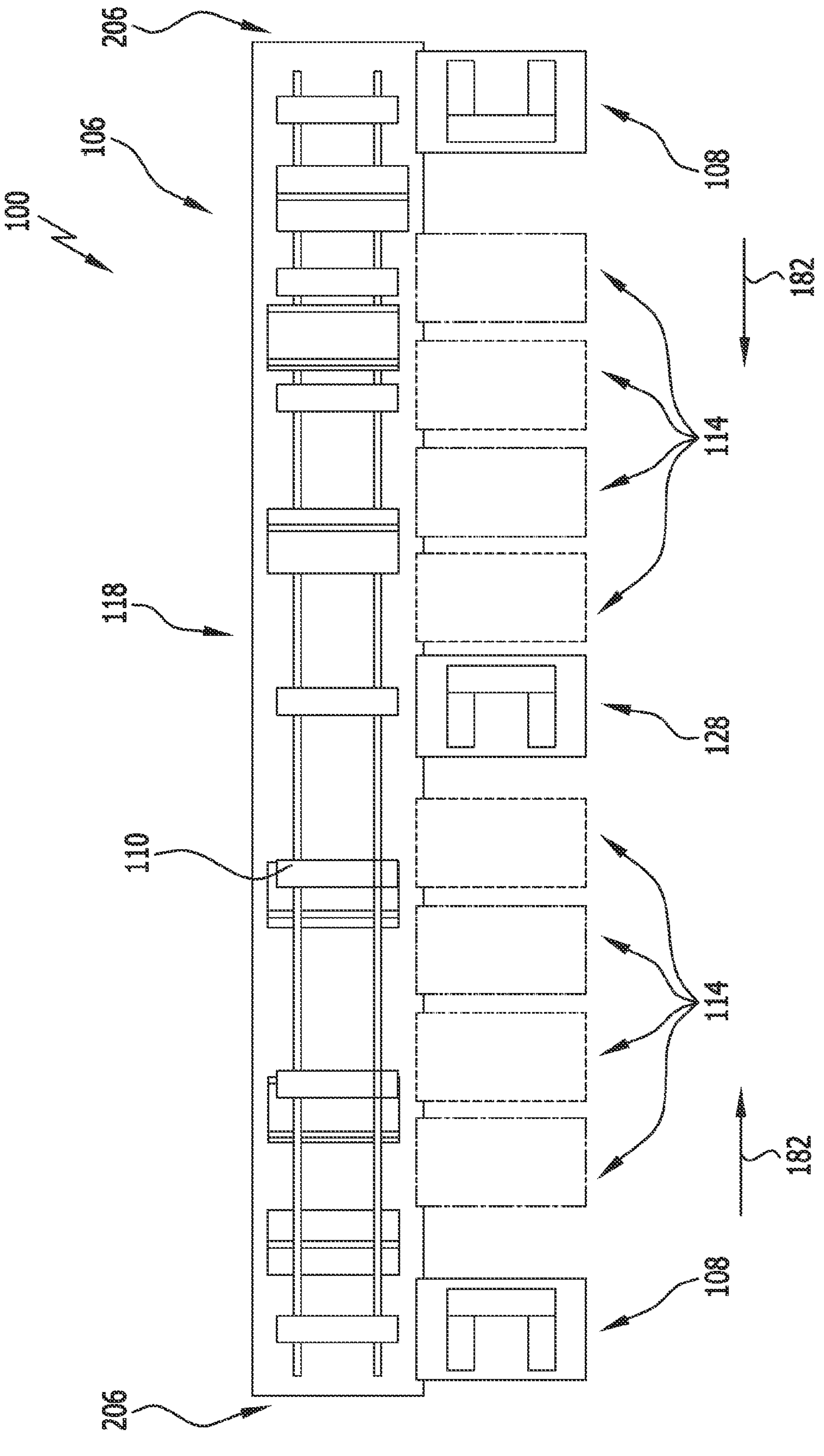
FIG. 14 shows a schematic plan view of a fourth embodiment of a treatment plant in which two ends, facing away from one another, of a common main conveying path or two main conveying paths are adjacent to feeding stations for feeding the workpieces, wherein a common removal station for removing the workpieces is provided essentially centrally.

A fourth embodiment of a treatment plant 100 shown in FIG. 14 differs from the first embodiment shown in FIGS. 1 through 6 essentially in that a removal station 128 which is arranged centrally with respect to the main conveying path 118 or with respect to two main conveying paths 118 is provided. The workpieces 102 are thus removed centrally from the treatment unit 106 and are accordingly fed to the main conveying path 118 at ends 206 facing away from one another. For this purpose, a feeding station 108 is provided at each of the ends 206.

The workpieces 102 are thus conveyed towards one another by the two feeding stations 108 and are discharged and conveyed further by means of the common removal station 128.

Otherwise, the fourth embodiment of the treatment plant 100 shown in FIG. 14 corresponds with regard to structure and function to the first embodiment shown in FIGS. 1 through 6, so that reference is made, in this respect, to the above description thereof.

Figure 15:
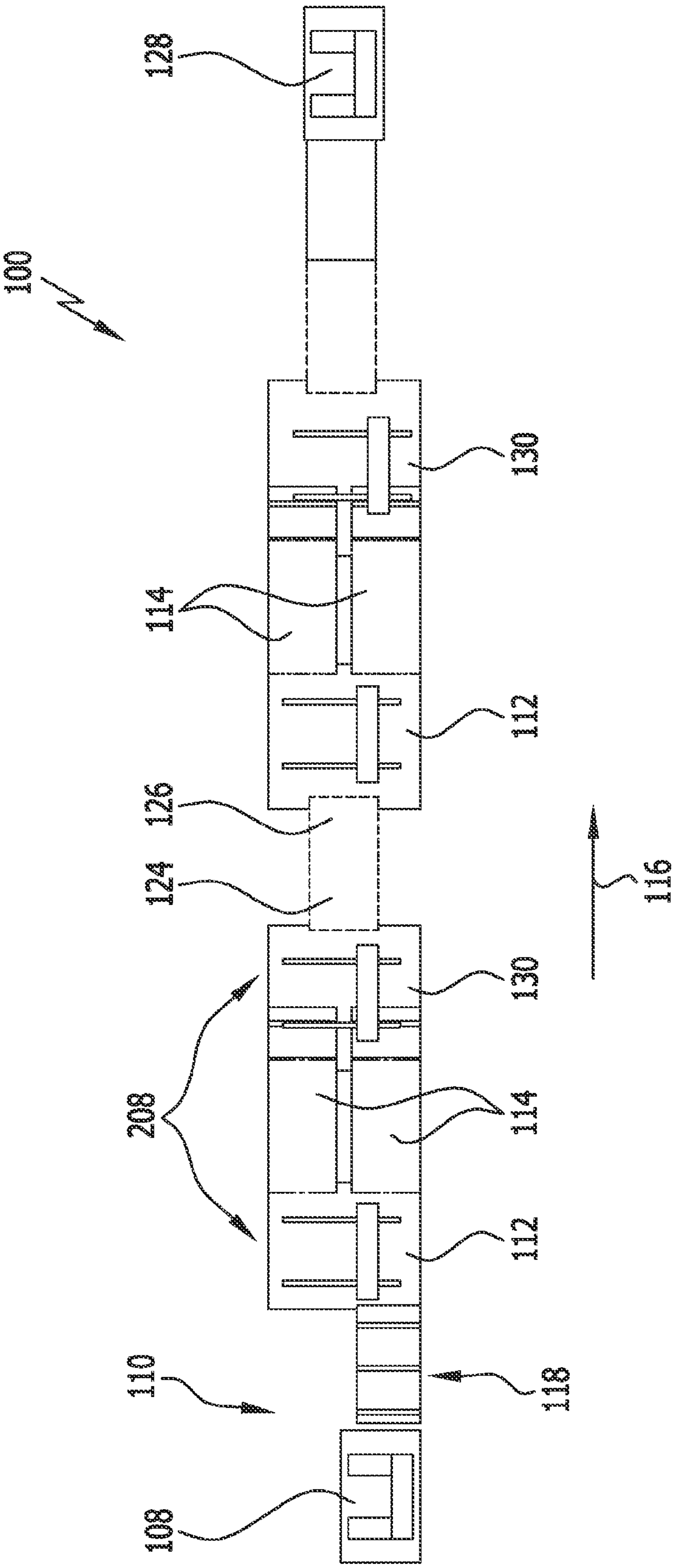
FIG. 15 shows a schematic plan view of a fifth embodiment of a treatment plant in which distributor devices and combining devices of a conveying device are provided so that the workpieces can be distributed to different treatment stations and can be combined to minimize the conveying outlay.

A fifth embodiment of a treatment plant 100 shown in FIG. 15 differs from the second embodiment shown in FIGS. 7 through 12 essentially in that a treatment unit 106 forming a treatment line comprises several treatment stations 114 that can be populated in parallel to one another.

A main conveying path 118 of the conveying device 110 of the treatment plant 100 preferably comprises for this purpose one or more distributor devices 112 in order to distribute the workpieces 102, fed via a feeding station 108, to treatment stations 114 arranged in parallel to one another.

The distributor device 112 is in particular a transverse displacement device 208.

A further transverse displacement device 208 preferably forms a combining device 130, which is arranged after the treatment stations 114 and serves to combine the workpieces 102 and further convey them together. In particular, the workpieces 102 can then be fed to a flushing station 126 or spraying station 124.

One or more further distributor devices 112, treatment stations 114 arranged in parallel to one another, and/or combining devices 130 can then be provided for further treatment steps of the treatment plant 100.

In the fifth embodiment of the treatment plant shown in FIG. 15, two such treatment steps are provided with treatment stations 114 each arranged in parallel with one another.

Otherwise, the fifth embodiment of the treatment plant 100 shown in FIG. 15 corresponds with regard to structure and function to the second embodiment shown in FIGS. 7 through 12, so that reference is made, in this respect, to the above description thereof.

Figure 16:
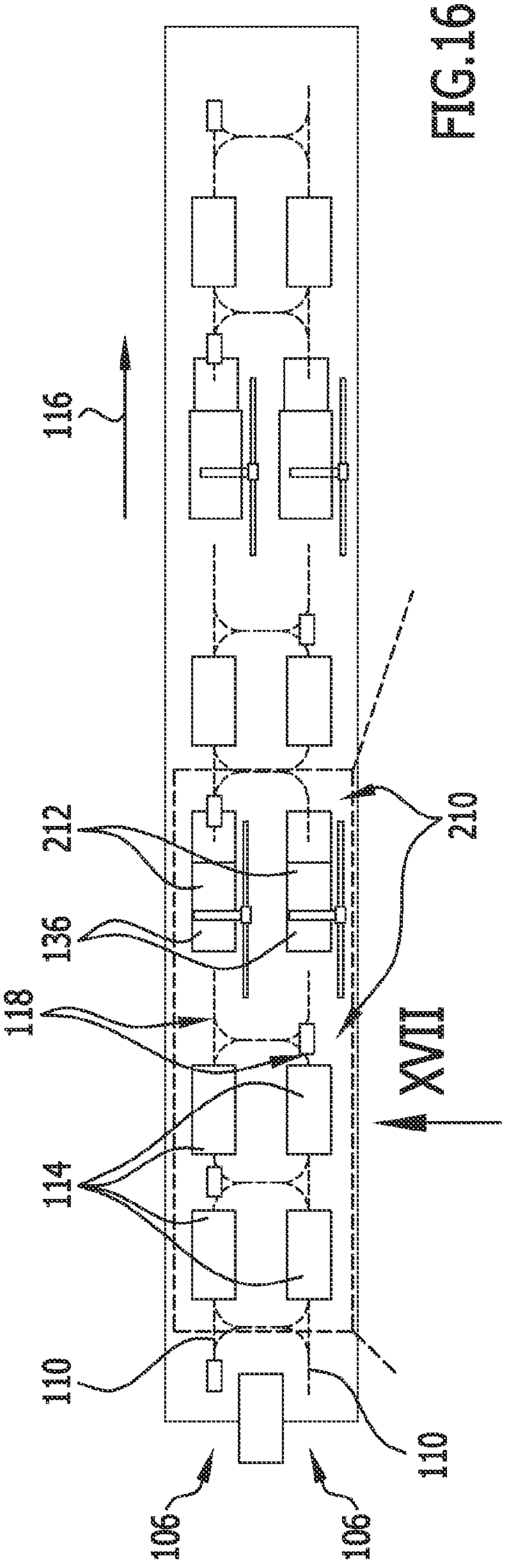
FIG. 16 shows a schematic plan view of an upper side of a sixth embodiment of a treatment plant in which a combination of treatment stations for performing flooding processes and treatment stations for performing dipping processes is provided.
Figure 17:
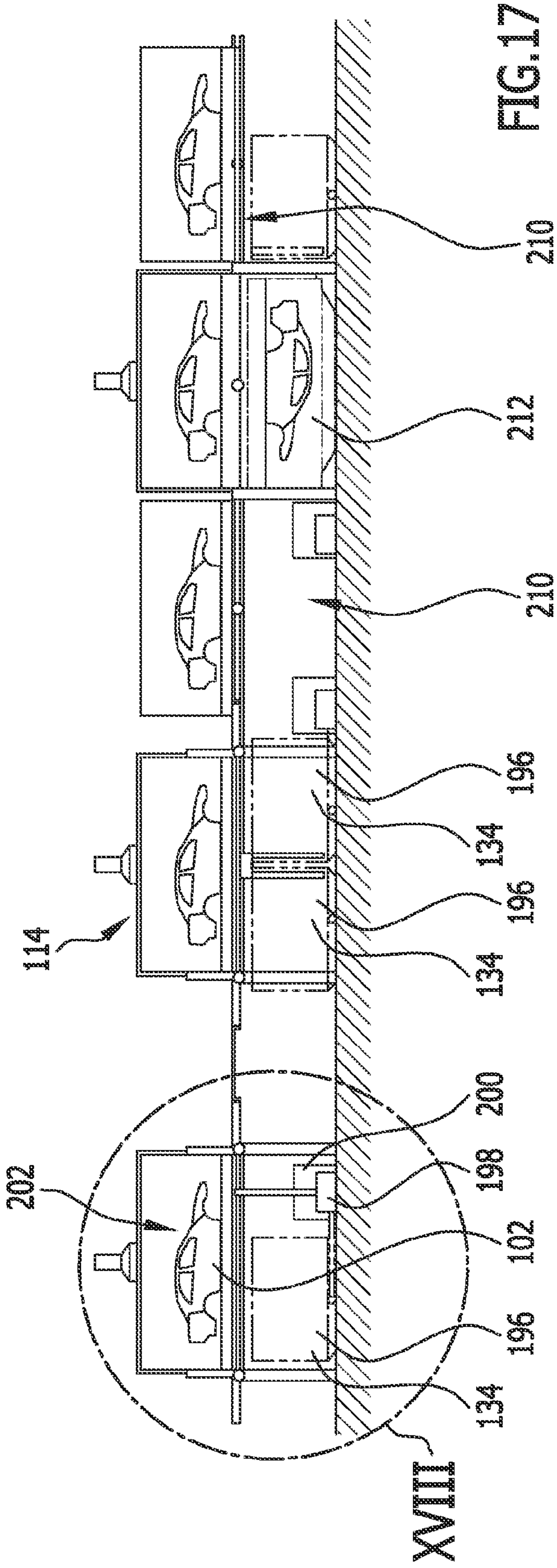
FIG. 17 shows an enlarged illustration of the region XVII in FIG. 16 in the form of a vertical, longitudinal, sectional illustration.
Figure 18:
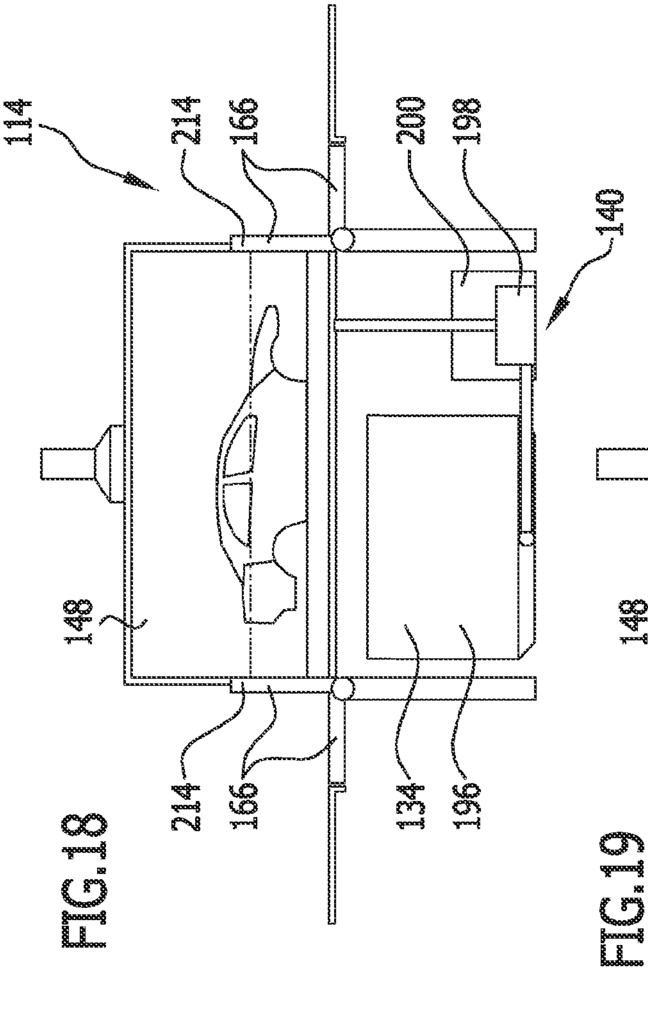
FIG. 18 shows an enlarged illustration of the region XVIII in FIG. 17.

A sixth embodiment of a treatment plant 100 shown in FIGS. 16 through 18 differs from the second embodiment shown in FIGS. 7 through 12 essentially in that a workpiece exchange 102 is possible between two treatment units 106 arranged on one level.

For this purpose, the conveying devices 110 of the treatment units 106 comprise one or more transfer stations 210, by means of which the workpieces 102 can be transferred from the conveying device 110 of the one treatment unit 106 to the conveying device 110 of the further treatment unit 106.

In particular, the workpieces 102 can be transferred from a main conveying path 118 of the one treatment unit 106 to the main conveying path 118 of the further treatment unit 106 by means of a transfer station 210.

As a result, treatment stations 114 to be maintained and/or cleaned and/or repaired can be bypassed in an isolated manner, without having to temporarily stop the entire treatment unit 106.

As can also be seen in particular in FIG. 17, in the sixth embodiment of the treatment plant 100 shown in FIGS. 16 through 18, a workpiece treatment by dipping the workpieces is further provided in addition to the workpiece treatment by flooding.

For this purpose, one or more treatment containers 136 designed as dip tanks 212 are provided, wherein the associated treatment stations 114 serve to perform dipping processes.

Such dip tanks 212 serve, in particular, to coat the workpieces 102, e.g., the painting of the same in the context of a cathodic dip coating.

In particular, several such dip tanks 212 can be arranged in succession along the main conveying direction 116, e.g., after one or more treatment stations 114 for performing flooding processes for the workpiece pretreatment.

As can be seen in particular in FIG. 17, it may be provided that several fluid tanks 134 and/or several counter tanks 196 be assigned to a treatment station 114 in order to be able to perform different treatment steps in the same treatment chamber 148.

The treatment chamber 148 can then in particular be alternately or successively flooded with different fluids, and in particular treatment liquids.

As can be seen in particular in FIG. 18, folding elements 214 could also be provided as closing elements 166, instead of closing elements 166 designed as lock gates 172.

The folding elements 214 are in particular arranged so as to be pivotable about a substantially horizontal axis and can be brought into a vertical orientation in order to close the respective access opening 158, and into a horizontal orientation in order to open the access opening 158 (both states are shown in FIG. 18).

The closing elements 166 may, for example, bring about only a partial coverage of the access opening 158, or else a complete coverage of the access opening 158. In the embodiment shown in FIG. 18, only a partial coverage of the access opening 158 is provided, so that the treatment station 114 according to FIG. 18 is suitable only for a partial flooding process.

The dimensioning of the closing element 166 can be selected according to the required filling-level for performing the workpiece treatment.

At least one closing element 166, and in particular at least one folding element 214, can comprise or form, for example, one or more conveying elements of a conveying device 110, and in particular one or more guiding elements of a guiding device 176 of a conveying device 110 (not shown in the figures). The closing element 166 then in particular serves to guide the one or more workpieces 102, during the introduction of the same, in a load-bearing manner across the closing element 166 into the treatment chamber 148.

Otherwise, the embodiment of the treatment plant 100 shown in FIGS. 16 through 18 corresponds with regard to structure and function to the second embodiment shown in FIGS. 7 through 12, so that reference is made, in this respect, to the above description thereof.

Figure 20:
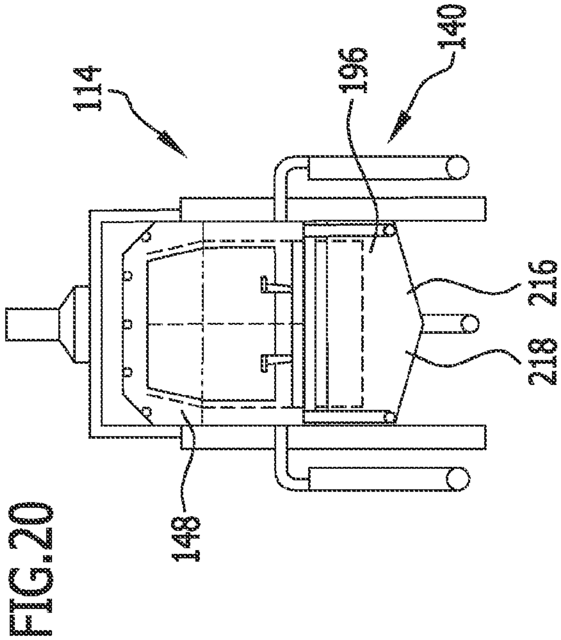
FIG. 20 shows a schematic vertical cross-section through the treatment station according to FIG. 19, wherein a different workpiece to be treated is arranged within a treatment chamber of the treatment station.
Figure 19:
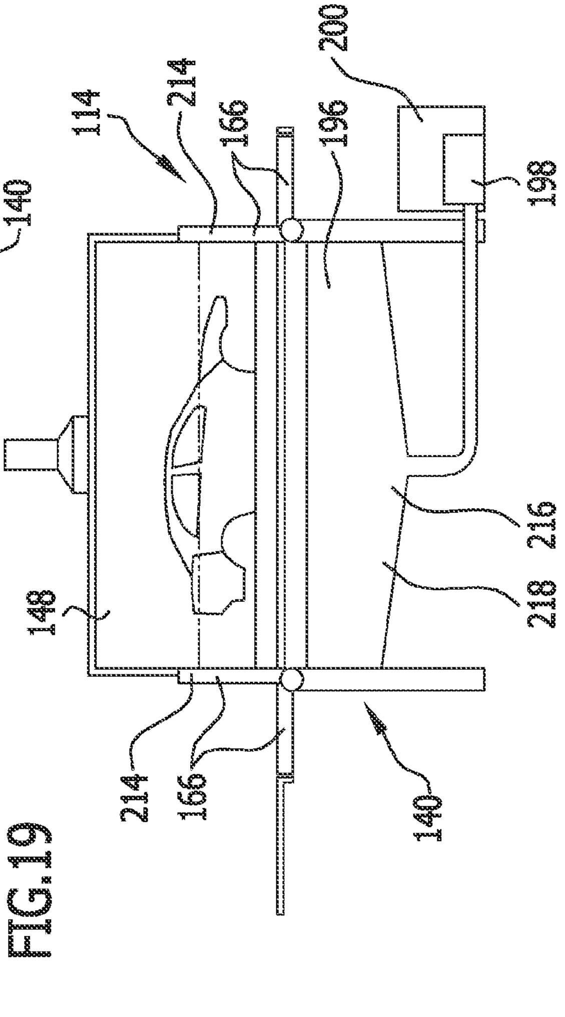
FIG. 19 shows an alternative configuration of the treatment station shown in FIG. 18.
Figure 21:
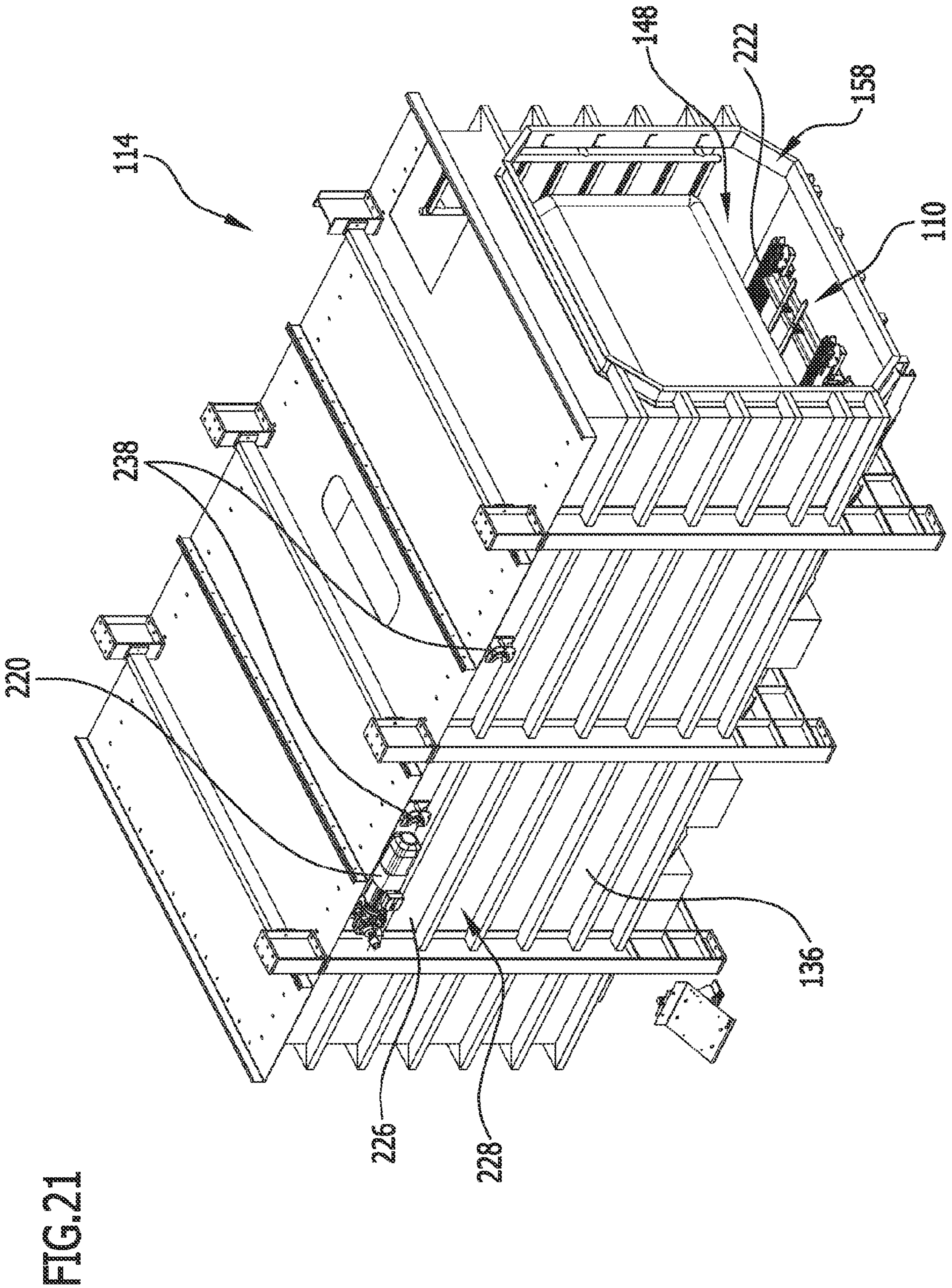
FIG. 21 shows a schematic perspectival illustration of a treatment station in which an external drive unit of a conveying device and two external sensor elements of a sensor device are provided.
Figure 22:
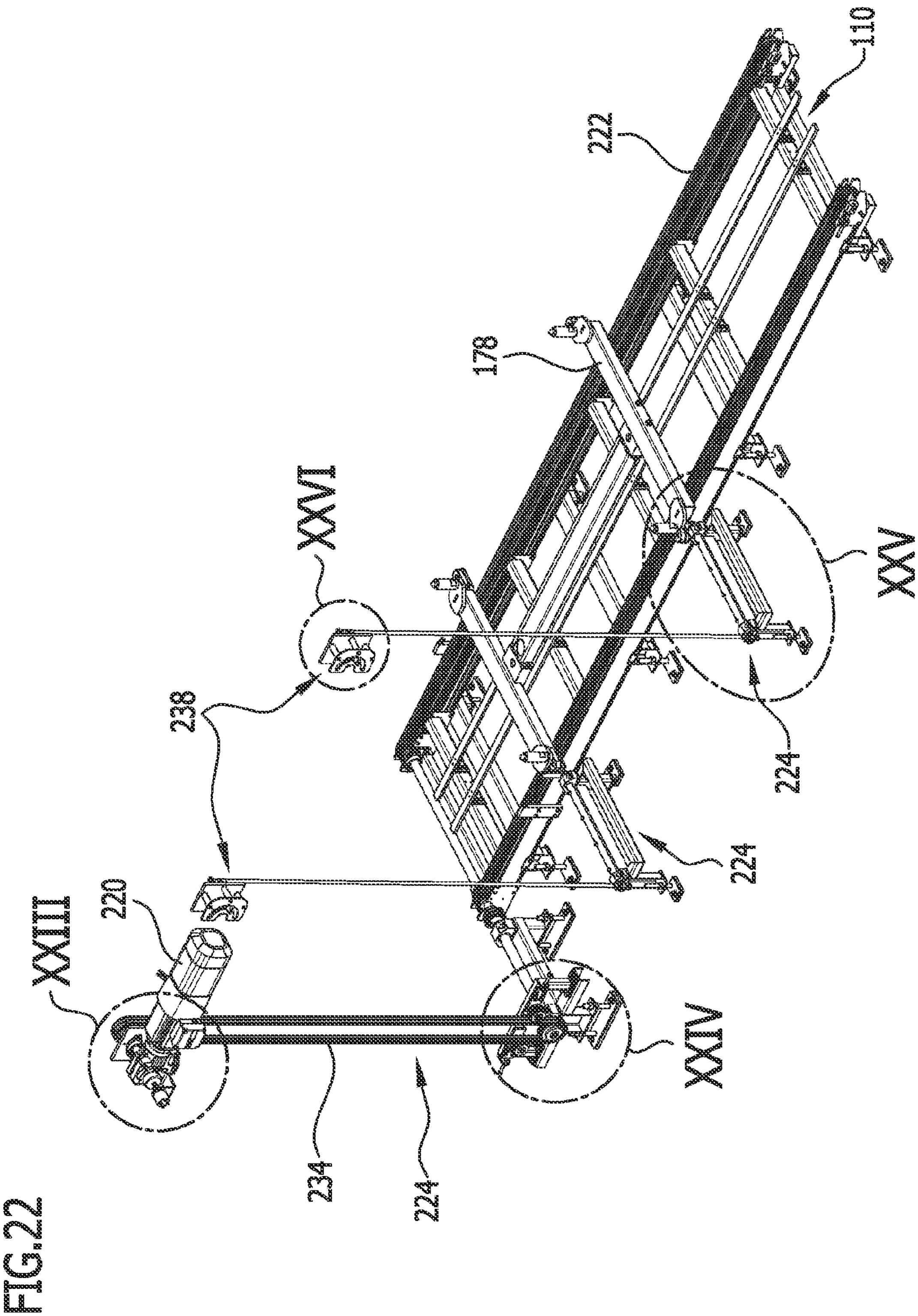
FIG. 22 shows a schematic perspectival isolated illustration of the conveying device and the sensor device of FIG. 21.
Figure 23:
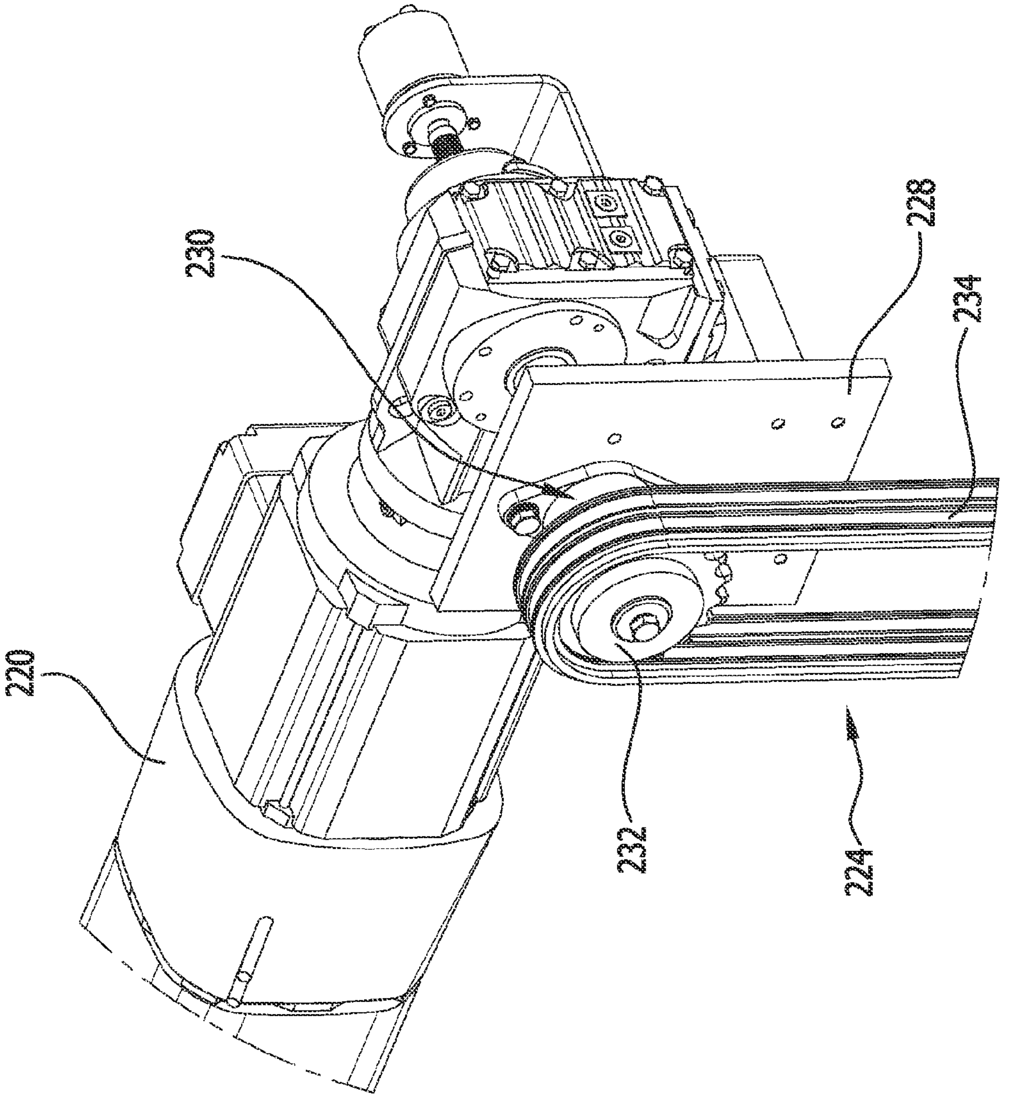
FIG. 23 shows an enlarged illustration of the region XXIII in FIG. 22, with a view of an inner side, facing the treatment chamber, of the drive unit and an upper part of a coupling device.
Figure 24:
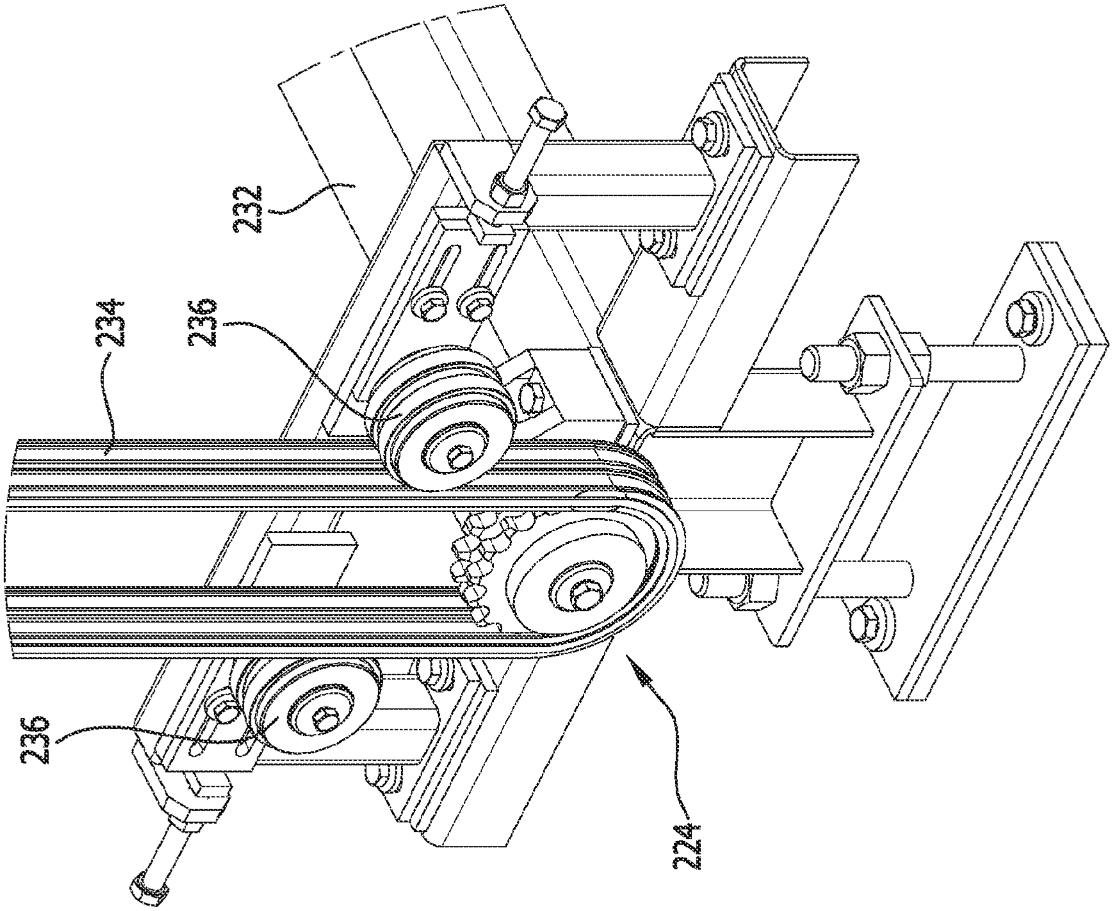
FIG. 24 shows an enlarged illustration of the region XXIV in FIG. 22.

FIGS. 19 and 20 show a further alternative embodiment of a treatment station 114, which substantially corresponds to the embodiment of a treatment station 114 shown in FIG. 18, but comprises, below the treatment chamber 148, a collecting container 218, which is designed, for example, as a collecting funnel 216 by means of which the fluid to be discharged from the treatment chamber 148 can be collected.

The collecting container 218 thus in particular forms a counter tank 196 of a fluid guide 140.

Otherwise, the embodiment of a treatment station 114 shown in FIGS. 19 and 20 corresponds with regard to structure and function to the embodiment shown in FIG. 18, so that reference is made, in this respect, to the above description thereof.

FIGS. 21 through 27 show an optional development of the treatment station 114. Here, it is provided that the conveying device 110 comprise one or more drive units 220 which act on a guide path section 222 of the conveying device 110 from outside the treatment chamber 148. A drive unit 220 may, for example, be an electric motor or comprise an electric motor.

The one or more drive units 220 are preferably coupled purely mechanically to the guide path section 222. In particular, it may be provided that a coupling device 224 produce a mechanical connection between the one or more drive units 220, on the one hand, and the guide path section 222 of the conveying device 110 on the other. By means of the one or more drive units 220 arranged outside the treatment chamber 148, a workpiece 102 guided within the treatment chamber 148 on the guide path section 222 can then in particular be driven, and, preferably, linearly moved, e.g., introduced into the treatment chamber 148 or discharged from the same.

It may be favorable if the one or more drive units 220 are arranged above a maximum filling-level or above a maximum filling-height of the treatment chamber 148, and/or on an outer side 226 of a side wall 228 of a treatment container 136 surrounding the treatment chamber 148.

Preferably, one or more drive units 220 are arranged on an end region of the treatment container 136, which end region faces away from an access opening 158 of the treatment container 136, and/or in a region, close to the ceiling, of a side wall 228 of the treatment container 136.

The coupling device 224 is preferably guided through the side wall 228, and preferably at the height of the one or more drive units 220. A through-opening 230 for guiding the coupling device 224 is preferably arranged and/or formed above a maximum filling-level or above a maximum filling-height of the treatment chamber 148. A coupling element 232, guided through the side wall 228, of the coupling device 224 is preferably a rotating shaft or coupling shaft.

The rotating shaft or coupling shaft is preferably connected by means of a pulling element 234, and in particular by means of a belt and/or a chain, e.g., a duplex chain, to a further rotating shaft or coupling shaft which is arranged in the region of the guide path section 222 and ultimately acts directly or indirectly on the workpiece 102 in order to drive the same. The pulling element 234 can in particular be tensioned by means of one or two tensioning elements 236, and in particular tensioning rollers.

Furthermore, it is provided in the embodiment shown in FIGS. 21 through 27 that the treatment station 114 comprise one or more sensor devices 238 which enable a state and/or position detection within the treatment chamber 148 from outside the treatment chamber 148. For example, a correct positioning of a workpiece 102 within the treatment chamber 148 can be determined or monitored by means of a sensor device 238.

Figure 25:
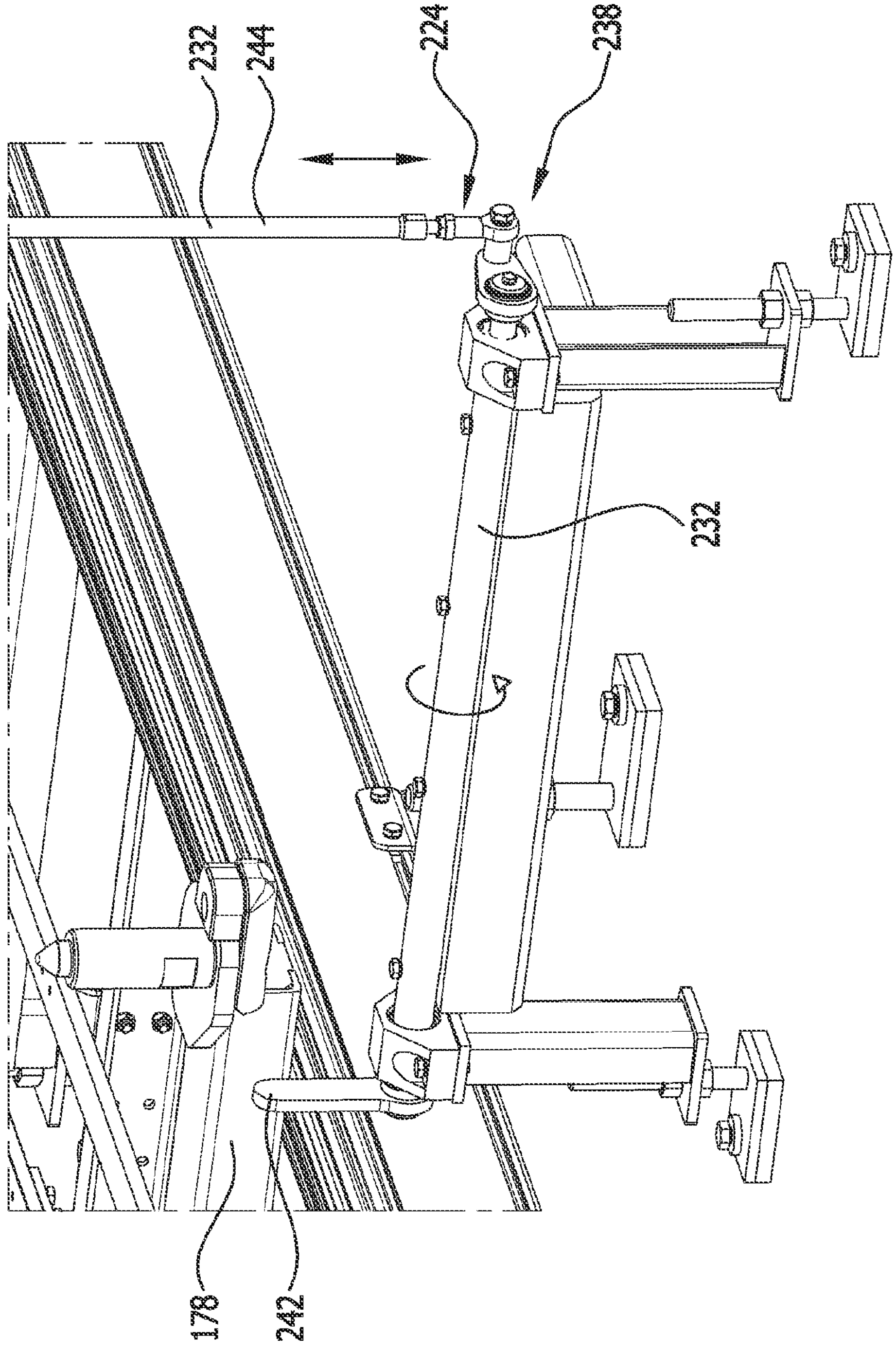
FIG. 25 shows an enlarged illustration of the region XXV in FIG. 22.
Figure 26:
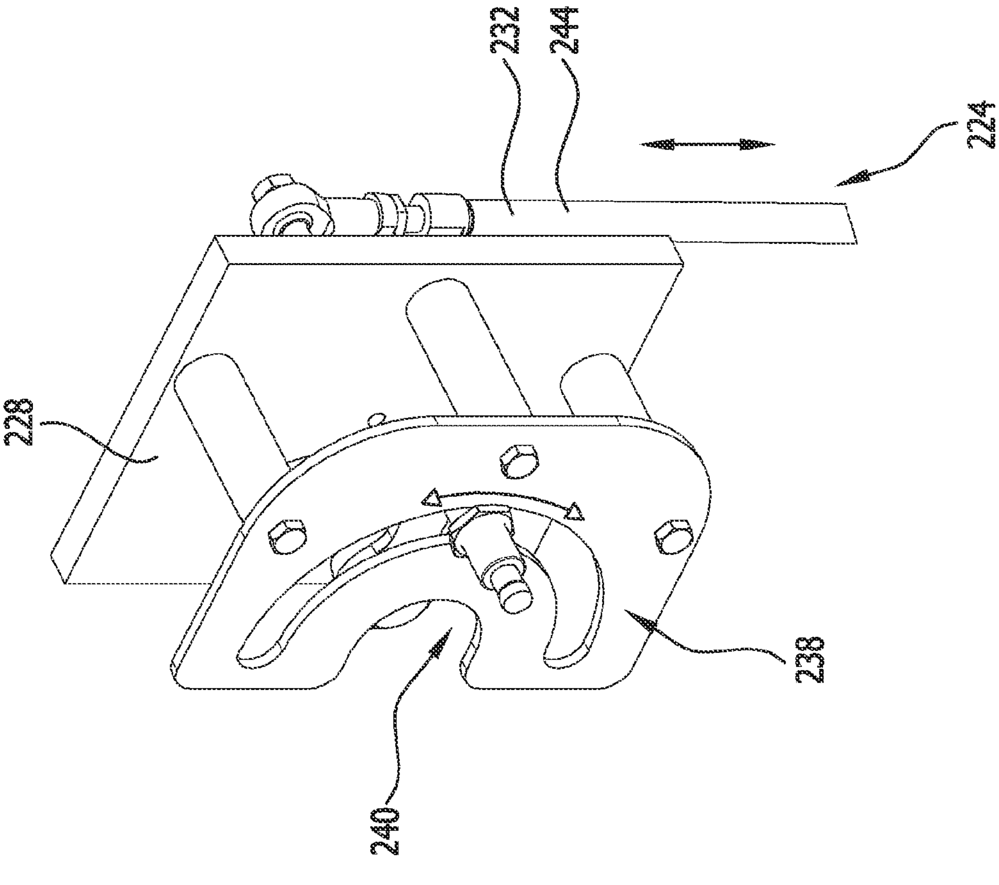
FIG. 26 shows an enlarged illustration of the region XXVI in FIG. 22.
Figure 27:
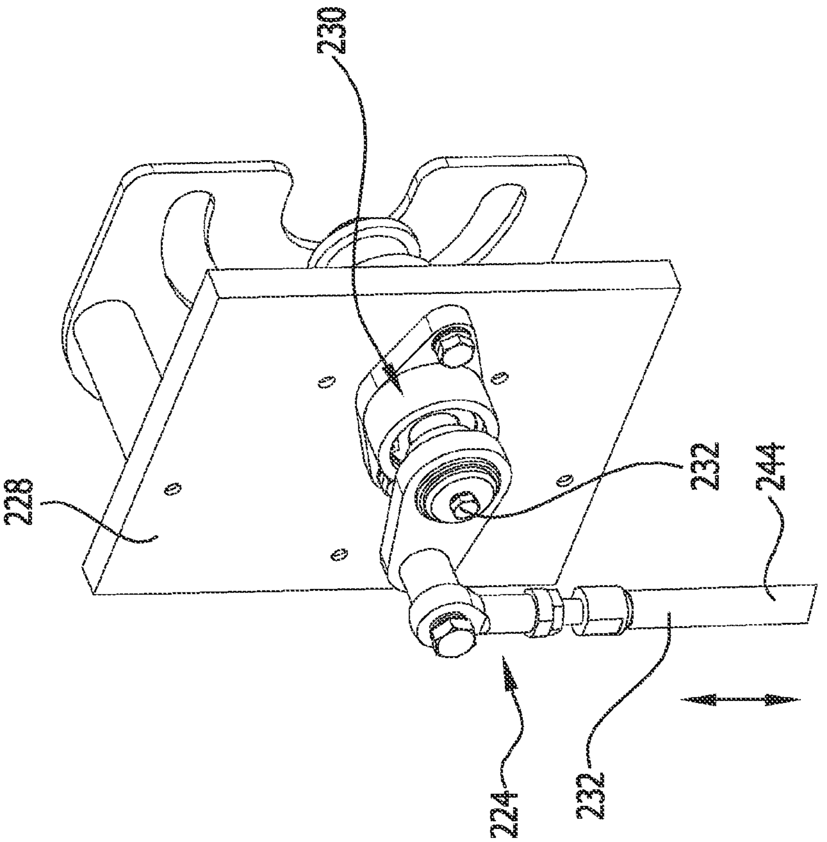
FIG. 27 shows an enlarged illustration of the region XXVI in FIG. 22, with a different viewing direction.

The one or more sensor devices 238 preferably each comprise one or more sensor elements 240 which are arranged outside the treatment chamber 148 and preferably coupled purely mechanically to one or more transducer elements 242 within the treatment chamber 148 (see in particular FIGS. 25 through 27). In particular, it may be provided that a coupling device 224 produce a mechanical connection between the one or more sensor elements 240, on the one hand, and the one or more transducer elements 242 on the other. By means of the one or more sensor elements 240 arranged outside the treatment chamber 148, a workpiece 102 arranged within the treatment chamber 148 can then in particular be detected, and preferably its position determined or monitored.

It may be favorable if the one or more sensor elements 240 are arranged above a maximum filling-level or above a maximum filling-height of the treatment chamber 148, and/or on an outer side 226 of a side wall 228 of the treatment container 136 surrounding the treatment chamber 148.

Preferably, one or more sensor elements 240 are arranged in a region, close to the ceiling, of a side wall 228 of the treatment container 136.

The coupling device 224 of the sensor device 238 is preferably guided through the side wall 228, and preferably at the height of the one or more sensor elements 240. A through-opening 230 for guiding the coupling device 224 is preferably arranged and/or formed above a maximum filling-level or a maximum filling-height of the treatment chamber 148. A coupling element 232, guided through the side wall 228, of the coupling device 224 is preferably a rotating shaft or coupling shaft.

The rotating shaft or coupling shaft is preferably connected by means of a pulling element or pressure element, and in particular by means of a coupling rod 244, to a further rotating shaft or coupling shaft, which is arranged, for example, in a bottom region and/or in the region of a guide path section 222 and is connected to a transducer element 242. By actuating the transducer element 242, e.g., by rotating the transducer element 242, a rotation of the further rotating shaft or coupling shaft, and thereby a—for example—vertical displacement of the coupling rod 244, and thereby a rotation of the (upper) rotating shaft or coupling shaft, can preferably be brought about, wherein the (upper) rotating shaft or coupling shaft guided out of the treatment chamber 148 finally carries out or brings about a movement which can be detected by means of the at least one sensor element 240. By purely mechanical actuation of the coupling device 224, a change in the orientation or another movement of the transducer element 242 can thus be detected by means of the one or more sensor elements 240.

Preferred embodiments are as follows:

1. Treatment station (114) for treating workpieces (102), and in particular for cleaning and/or coating vehicle bodies (104),
   wherein the treatment station (114) comprises a treatment container (136) surrounding a treatment chamber (148) for accommodating the workpieces (102).

2. Treatment station (114) according to embodiment 1, characterized in that the treatment chamber (148) can be flooded with a fluid,
   wherein the treatment container (136) comprises at least one access opening (158) for introducing the workpieces (102) into the treatment chamber (148) and/or for discharging the workpieces (102) from the treatment chamber (148),
   wherein the treatment container (136) comprises a closing device (164) for selectively closing and opening the at least one access opening (158).

3. Treatment station (114) according to embodiment 2, characterized in that the at least one access opening (158) is arranged and/or formed in one or more side walls (154) of the treatment container (136), and in particular in one or more front walls (156) of the treatment container (136).

4. Treatment station (114) according to one of embodiments 2 or 3, characterized in that the closing device (164) serves for the fluid-tight closing of the at least one access opening (158).

5. Treatment station (114) according to one of embodiments 2 through 4, characterized in that the closing device (164) comprises a lifting device (170) for raising and lowering a closing element (166) of the closing device (164), and in particular for raising the closing element (166) in order to bring it into an open position, and for lowering the closing element (166) in order to bring it into a closed position.

6. Treatment station (114) according to one of embodiments 2 through 5, characterized in that the closing device (164) comprises a pivoting device for pivoting a closing element (166) of the closing device (164), wherein the closing element (166) can in particular be pivoted about an at least approximately horizontal pivot axis.

7. Treatment station (114) according to one of embodiments 2 through 6, characterized in that the closing device (164) comprises a closing drive (168) for automatically moving a closing element (166) of the closing device (164).

8. Treatment station (114) according to one of embodiments 2 through 7, characterized in that the treatment station (114) comprises a fluid tank (134) for accommodating a fluid, and in particular a treatment fluid, wherein the fluid can be introduced from the fluid tank (134) into the treatment chamber (148) by means of a fluid guide (140) in order to flood the treatment chamber (148) and/or wherein the fluid can be guided from the treatment chamber (148) back into the fluid tank (134) by means of the fluid guide (140) in order to empty the treatment chamber (148).

9. Treatment station (114) according to one of embodiments 2 through 8, characterized in that the treatment station (114) comprises a conveying device (110) for conveying the workpieces (102), and in particular for introducing the workpieces (102) into the treatment chamber (148) and/or for discharging the workpieces (102) from the treatment chamber (148).

10. Treatment station (114) according to embodiment 9, characterized in that the workpieces (102) can be moved, and in particular introduced into the treatment chamber (148) and/or discharged from the treatment chamber (148), by means of the conveying device (110) along a horizontal plane.

11. Treatment station (114) according to one of embodiments 9 or 10, characterized in that the conveying device (110) comprises one or more drive units for moving the workpieces (102), wherein the drive units, and in particular all drive units of the conveying device (110), are arranged outside the treatment chamber (148), at least during the performance of a workpiece treatment.

12. Treatment station (114) according to one of embodiments 9 through 11, characterized in that the conveying device (110) comprises a guiding device (176) for the load-bearing accommodation of the workpieces (102), wherein the guiding device (176) extends from outside the treatment chamber (148) into the treatment chamber (148), and in particular through at least one access opening (158).

13. Treatment station (114) according to one of embodiments 9 through 12, characterized in that the conveying device (110) comprises a guiding device (176) for the load-bearing accommodation of the workpieces (102), wherein the guiding device (176) comprises both at least one guide path section arranged outside the treatment chamber (148) and at least one guide path section arranged within the treatment chamber (148), wherein the workpieces (102) can be transferred through the access opening (158) from a guide path section arranged outside the treatment chamber (148) to a guide path section arranged within the treatment chamber (148), and in particular by driving the workpieces (102) by means of one or more drive units.

14. Treatment station (114) according to one of embodiments 9 through 13, characterized in that the conveying device (110) comprises a locking device for locking the workpieces (102) in a treatment position within the treatment chamber (148), wherein a movement of the workpiece (102) counter to the direction of gravity (g) can in particular be blocked by means of the locking device.

15. Treatment station (114) according to one of embodiments 9 through 14, characterized in that the conveying device (110) comprises a movement device for tilting and/or turning the workpieces (102), and in particular for temporarily changing the position relative to an at least approximately horizontal normal position.

16. Treatment station (114) according to one of embodiments 1 through 15, wherein the treatment chamber (148) can be flooded with a fluid, wherein the treatment station (114) comprises one or more installation elements (188) which are arranged or can be arranged in the treatment chamber (148) for supporting a flooding process.

17. Treatment station (114) according to embodiment 16, characterized in that one or more installation elements (188) are adapted or can be adapted with regard to their position and/or with regard to their function and/or with regard to their shape to the workpieces (102) to be treated.

18. Treatment station (114) according to one of embodiments 16 or 17, characterized in that one or more installation elements (188) are designed as displacement elements (190), by means of which free spaces within the treatment chamber (148) can in particular be filled which remain free during the flooding process without the respective installation element (188) and would therefore need to be filled with fluid.

19. Treatment station (114) according to embodiment 18, characterized in that one or more displacement elements (190) are adapted or can be adapted at least in sections or in regions to a shape of the workpiece (102) to be treated.

20. Treatment station (114) according to one of embodiments 18 or 19, characterized in that one or more displacement elements (190) have a hollow body which can be filled and/or kept filled and/or emptied independently of the flooding process.

21. Treatment station (114) according to one of embodiments 18 through 20, characterized in that one or more displacement elements (190) are designed to be reshapeable and/or resizable, e.g., inflatable, and that the treatment station (114) comprises a variation device for varying the shape and/or size of the one or more displacement elements (190), and in particular for reducing a free space, within the treatment chamber (148), to be flooded for a treatment process.

22. Treatment station (114) according to one of embodiments 18 through 21, characterized in that one or more displacement elements (190) fill one or more free spaces in the region of a conveying device (110) of the treatment station (114).

23. Treatment station (114) according to one of embodiments 18 through 22, characterized in that one or more displacement elements (190) fill a free space above a workpiece (102) designed as a vehicle body (104), and in particular above a vehicle front and/or above a vehicle rear of the vehicle body (104).

24. Treatment station (114) according to one of embodiments 16 through 23, characterized in that one or more installation elements (188) are designed as support elements (192) for supporting a workpiece (102) to be treated during the flooding process.

25. Treatment station (114) according to embodiment 24, characterized in that one or more of the support elements (192) respectively have a support section which serves for the direct abutment on the workpiece (102) for supporting the same.

26. Treatment station (114) according to one of embodiments 16 through 25, characterized in that one or more installation elements (188) are designed as temperature-control elements for controlling the temperature of the treatment container (136) and/or of the fluid.

27. Treatment station (114) according to one of embodiments 16 through 26, characterized in that one or more installation elements (188) are arranged or can be arranged temporarily, for one or more treatment processes and/or flooding processes, or permanently in the treatment chamber (148).

28. Treatment station (114) according to one of embodiments 16 through 27, characterized in that one or more installation elements (188) for performing a flooding process can automatically be introduced into a free space of the treatment chamber (148) that is to be flooded and, after the flooding process has been performed, can be automatically removed from the free space to be flooded.

29. Treatment station (114) according to embodiment 28, characterized in that one or more installation elements (188) are arranged or can be arranged on a closing element (166) for closing an access opening (158) of the treatment container (136), and that, by moving the closing element (166) into a closed position, the one or more installation elements (188) can be brought into a position in which they support the flooding process.

30. Treatment station (114) according to one of embodiments 1 through 29, characterized in that the treatment station (114) comprises a fluid tank (134) for accommodating a fluid, and that the treatment station (114) comprises a fluid guide, by means of which the fluid can be guided a) from the fluid tank (134) into the treatment container (136) in order to flood the treatment chamber (148); and/or b) from the treatment container (136) into the fluid tank (134) in order to empty the treatment chamber (148).

31. Treatment station (114) according to embodiment 30, characterized in that the fluid tank (134) is arranged above the treatment container (136) with respect to the direction of gravity (g).

32. Treatment station (114) according to one of embodiments 30 or 31, characterized in that the fluid guide (140) comprises a pump device (198) by means of which the fluid can be pumped from the treatment chamber (148) into the fluid tank (134).

33. Treatment station (114) according to one of embodiments 30 through 32, characterized in that the fluid guide (140) comprises a fluid line, designed as a feed line (142), by means of which the fluid can be fed to the treatment chamber (148), wherein the feed line (142) opens into the treatment container (136) in a bottom region (146) of the same.

34. Treatment station (114) according to embodiment 33, characterized in that the treatment container (136) comprises an inflow region (194), which is in particular located below an access opening (158) of the treatment container (136) and is filled with fluid even in an emptied state of the treatment container (136) provided for exchanging a workpiece (102), wherein the feed line (142) opens into the inflow region (194).

35. Treatment station (114) according to one of embodiments 30 through 34, characterized in that the fluid guide (140) comprises a cleaning device (200) for cleaning the fluid, wherein the cleaning device (200) is in particular arranged in a return line of the fluid guide (140) for returning the fluid into the fluid tank (134).

36. Treatment station (114) according to one of embodiments 30 through 35, characterized in that the treatment station (114) comprises a control device, by means of which a flooding process in the treatment chamber (148) can be controlled and/or regulated—in particular, by controlling and/or regulating a valve device (144) for opening and closing a feed line (142) for feeding fluid to the treatment chamber (148).

37. Treatment station (114) according to embodiment 36, characterized in that one or more workpiece parameters, and in particular a geometry and/or size and/or position of the respective workpiece (102) within the treatment chamber (148), are taken into account in the control and/or regulation of the flooding process.

38. Treatment station (114) according to one of embodiments 36 or 37, characterized in that the flooding process can be controlled by means of the control device in such a way that a filling speed and/or a rate of change of the fill-level of the fluid in the treatment chamber (148) during the flooding is varied, and in particular adapted to local stability differences of the workpieces (102).

39. Treatment station (114) according to one of embodiments 36 through 38, characterized in that the treatment station (114) comprises one or more measuring devices by means of which a volume flow of the fluid flowing into the treatment chamber (148) and/or a fill-level or filling-level within the treatment chamber (148) and/or a fill-level or filling-level in the fluid tank (134) can be determined, wherein one or more measured values of the one or more measuring devices are taken into account in the control and/or regulation of the flooding process.

40. Treatment station (114) according to one of embodiments 30 through 39, characterized in that the treatment station (114) has a counter tank (196) which is in particular arranged below the treatment chamber (148) with respect to the direction of gravity (g) and to which the fluid to be discharged from the treatment chamber (148) can be fed.

41. Treatment station (114) according to embodiment 40, characterized in that the fluid flows from the fluid tank (134) into the treatment chamber (148) and/or from the treatment chamber (148) into the counter tank (196) by using only gravity (g).

42. Treatment station (114) according to one of embodiments 30 through 41, characterized in that the treatment station (114) comprises two or more than two treatment chambers (148), and in particular two or more than two treatment containers (136) with one treatment chamber (148) each, wherein a common fluid tank (134) is provided for feeding the fluid to the two or more than two treatment chambers (148).

43. Treatment station (114) according to one of embodiments 30 through 42, characterized in that the treatment station (114) comprises a flushing device for flushing and/or cleaning the treatment chamber (148), wherein a flushing medium can be introduced, and in particular sprayed, into the treatment chamber (148) and removed from the same by means of the flushing device—in particular, independently of the fluid, independently of the fluid tank (134), and/or independently of a counter tank (196).

44. Treatment plant (100) comprising one or more treatment stations (114)—in particular, according to one of embodiments 1 through 43—characterized in that each treatment station (114) comprises at least one treatment container (136) which surrounds a treatment chamber (148) for accommodating workpieces (102), wherein each treatment station (114) separately, or one or more treatment stations (114) jointly, comprise a fluid tank (134) for accommodating a fluid, and wherein the treatment stations (114) comprise a fluid guide (140), by means of which the fluid can be guided a) from the fluid tank (134) into the respective treatment container (136) in order to flood one or more treatment chambers (148); and/or b) from the respective treatment container (136) into the fluid tank (134) in order to empty the treatment chambers (148).

45. Treatment plant (100) according to embodiment 44, characterized in that the treatment plant (100) comprises several first treatment stations (114) for performing a first treatment step and several second treatment stations (114) for performing a second treatment step, wherein one or more first treatment stations (114) and one or more second treatment stations (114) respectively are part of or form a treatment unit (106) of the treatment plant (100) that is passed through by the workpieces (102) in order to perform the treatment steps.

46. Treatment plant (100) according to embodiment 45, characterized in that the treatment plant (100) comprises several treatment units (106), each of which comprises one or more first treatment stations (114) and one or more second treatment stations (114) and which, in particular, form distinct treatment lines of the treatment plant (100), a) wherein one or more first treatment stations (114) of distinct treatment units (106) have a common fluid guide (140) and/or a common fluid tank (134); and/or b) wherein one or more second treatment stations (114) of distinct treatment units (106) have a common fluid guide (140) and/or a common fluid tank (134).

47. Treatment plant (100) according to one of embodiments 44 through 46, characterized in that a fluid, and in particular a first treatment fluid, can be fed, by means of the fluid guide, first a) to one or more treatment chambers (148) of one or more treatment stations (114), and in particular first treatment stations (114), of a first treatment unit (106), and thereafter b) to one or more treatment chambers (148) of one or more treatment stations (114), and in particular first treatment stations (114), of a second treatment unit (106).

48. Treatment plant (100) according to one of embodiments 44 through 47, characterized in that a fluid, and in particular a second treatment fluid, can be fed, by means of the fluid guide (140), first a) to one or more treatment chambers (148) of one or more treatment stations (114), and in particular second treatment stations (114), of a first treatment unit (106), and thereafter b) to one or more treatment chambers (148) of one or more treatment stations (114), and in particular second treatment stations (114), of a second treatment unit (106).

49. Treatment plant (100) according to one of embodiments 44 through 48, characterized in that the fluid can alternately be fed, by means of the fluid guide (140), to treatment chambers (148) of distinct treatment units (106).

50. Treatment plant (100) according to one of embodiments 44 through 49, characterized in that the fluid guide (140) is connected to a cleaning device (200) so that the fluid can in particular be cleaned after removal from one of the treatment chambers (148) and/or before a new feeding to a further one of the treatment chambers (148).

51. Treatment plant (100) according to one of embodiments 44 through 50, characterized in that a total quantity of a fluid contained overall in a fluid guide (140) is at most approximately twice, and in particular at most approximately three times, a quantity of the fluid required for performing a single flooding process in a treatment chamber (148).

52. Treatment plant (100) according to one of embodiments 44 through 51, characterized in that several, and in particular all, treatment stations (114) of a treatment unit (106), and in particular one or more or all first treatment stations (114) and one or more or all second treatment stations (114) of a treatment unit (106), are arranged on a common level of the treatment plant (100).

53. Treatment plant (100) according to one of embodiments 44 through 52, characterized in that several treatment units (106) of the treatment plant (100) are arranged on distinct levels of the treatment plant (100).

54. Treatment plant (100) according to one of embodiments 44 through 53, characterized in that one or more treatment stations (114) of distinct treatment units (106) of the treatment plant (100), which have a common fluid guide (140) and/or which serve to perform the same treatment step, are arranged one above the other along the direction of gravity (g).

55. Treatment plant (100) according to one of embodiments 44 through 54, characterized in that the treatment plant (100) comprises several fluid guides (140) for guiding distinct treatment fluids, wherein the fluid guides (140) are assigned to distinct treatment stations (114) for performing different treatment steps.

56. Treatment plant (100)—in particular, according to one of embodiments 44 through 55—comprising:

- several treatment stations (114) for treating the workpieces (102), and in particular for cleaning and/or coating vehicle bodies (104),
- wherein one or more treatment stations (114) respectively comprise at least one treatment container (136) which surrounds a treatment chamber (148) for accommodating the workpieces (102),
- wherein the treatment plant (100) comprises a fluid guide (140) by means of which one or more of the treatment chambers (148) can selectively be flooded or emptied,
- wherein the treatment plant (100) comprises a conveying device (110) for conveying the workpieces (102), by means of which, in an emptied state of the one or more treatment chambers (148), the workpieces (102) can be introduced into and/or discharged from the same.

57. Treatment plant (100) according to embodiment 56, characterized in that the workpieces (102) can be moved, and in particular introduced into the treatment chamber (148) and/or discharged from the treatment chamber (148), by means of the conveying device (110) along a horizontal plane.

58. Treatment plant (100) according to one of embodiments 56 or 57, characterized in that the treatment plant (100) comprises a main conveying path (118) which extends in a main conveying direction (116) and along which the workpieces (102) can be conveyed by means of the conveying device (110) from a treatment station (114) to a further treatment station (114).

59. Treatment plant (100) according to one of embodiments 56 through 58, characterized in that the workpieces (102) can be conveyed in a transverse orientation (132) of the same along the main conveying direction (116) and/or along the main conveying path (118).

60. Treatment plant (100) according to one of embodiments 56 through 59, characterized in that the workpieces (102), in a longitudinal orientation (202) of the same, can be introduced into and/or discharged from one or more treatment chambers (148).

61. Treatment plant (100) according to one of embodiments 56 through 60, characterized in that the workpieces (102) can be introduced into the treatment chambers (148) in an introduction direction (182), wherein the introduction direction (182) is transverse, and in particular perpendicular, to a main conveying direction (116) of the conveying device (110).

62. Treatment plant (100) according to one of embodiments 56 through 61, characterized in that the treatment plant (100) comprises several treatment stations (114) for performing identical treatment steps, wherein two or more such treatment stations (114) are arranged on opposite sides of a main conveying path (118) of the conveying device (110).

63. Treatment plant (100) according to one of embodiments 56 through 62, characterized in that the treatment plant (100) comprises several treatment stations (114) for performing identical treatment steps, wherein two or more such treatment stations (114) are arranged in succession and/or next to one another along a main conveying direction (116) of the conveying device (110).

64. Treatment plant (100) according to one of embodiments 56 through 63, characterized in that several treatment stations (114) form a treatment unit (106), wherein several, and in particular all, treatment stations (114) of a treatment unit (106), and in particular one or more or all first treatment stations (114) and one or more or all second treatment stations (114) of a treatment unit (106), are arranged on a common level of the treatment plant (100).

65. Treatment plant (100) according to one of embodiments 56 through 64, characterized in that the treatment plant (100) comprises a main conveying path (118) which extends in a main conveying direction (116) and along which the workpieces (102) can be conveyed by means of the conveying device (110) from a treatment station (114) to a further treatment station (114), wherein the main conveying path (118) comprises one or more tunnel sections (120) for housing the main conveying path (118), wherein one or more tunnel sections (120), and in particular one or more tunnel sections (120) arranged along the main conveying direction (116) between two treatment stations (114), have a cleaning station (122) and/or flushing station (126) and/or spraying station (124).

66. Treatment plant (100) of one of embodiments 56 through 65, characterized in that the treatment plant (100) comprises two treatment units (106) which are arranged on a common level of the treatment plant (100), wherein main conveying paths (118) of the conveying devices (110) of the two treatment units (106) are oriented in antiparallel to one another and/or are arranged linearly in succession.

67. Treatment plant (100) according to embodiment 66, characterized in that the two treatment units (106) have a) feeding stations (108), arranged facing away from one another, for feeding the workpieces (102), and/or b) removal stations (128), arranged facing one another, for removing the workpieces (102), and/or c) a common removal station (128) for removing the workpieces (102).

68. Treatment plant (100) according to one of embodiments 56 through 67, characterized in that the conveying device (110) comprises one or more branching conveyors by means of which the workpieces (102)
- a) can be removed from a main conveying path (116) and can be introduced into one or more treatment chambers (148); and/or
- b) can be discharged from one or more treatment chambers (148) and can be brought back onto the main conveying path (116).

69. Treatment plant (100)—in particular, according to one of embodiments 44 through 68—comprising:
- several treatment stations (114) for treating the workpieces (102), and in particular for cleaning and/or coating vehicle bodies (114),
- wherein one or more treatment stations (114) respectively comprise at least one treatment container (136) which surrounds a treatment chamber (148) for accommodating the workpieces (102),
- wherein the treatment plant (100) comprises a fluid guide (140) by means of which one or more of the treatment chambers (148) can selectively be flooded or emptied,
- wherein the treatment plant (100) comprises a conveying device (110) for conveying the workpieces (102), by means of which, in an emptied state of the respective treatment chamber (148), the workpieces (102) can be introduced into the same through an access opening (158) designed as an introduction opening (160) and by means of which, in an emptied state of the respective treatment chamber (148), the workpieces (102) can be discharged from the same through an access opening (158) designed as a discharge opening (162), wherein the introduction opening (160) and the discharge opening (162) are distinct access openings (158).

70. Treatment plant (100) according to embodiment 69, characterized in that the workpieces (102) can be moved, and in particular introduced into the treatment chamber (148) and/or discharged from the treatment chamber (148), by means of the conveying device (110) along a horizontal plane.

71. Treatment plant (100) according to one of embodiments 69 or 70, characterized in that the treatment plant (100) comprises a main conveying path (118) which extends in a main conveying direction (116) and along which the workpieces (102) can be conveyed by means of the conveying device (110) from a treatment station (114) to a further treatment station (114).

72. Treatment plant (100) according to one of embodiments 69 through 71, characterized in that the workpieces (102) can be conveyed, in a longitudinal orientation (202) of the same, along the main conveying direction (116) and/or along the main conveying path (118).

73. Treatment plant (100) according to one of embodiments 69 through 72, characterized in that the workpieces (102), in a longitudinal orientation (202) of the same, can be conveyed through one or more treatment chambers (148).

74. Treatment plant (100) according to one of embodiments 69 through 73, characterized in that the conveying device (110) comprises one or more transfer stations (210), on which or by means of which the workpieces (102) can selectively be transferred from a treatment station (114) to a further treatment station (114), which follows along a main conveying direction (116), of the same treatment unit (106) and/or of a treatment unit (106) different therefrom of the treatment plant (100).

75. Treatment plant (100) according to one of embodiments 69 through 74, characterized in that the treatment plant (100) comprises several treatment stations (114) for performing identical treatment steps, wherein two or more such treatment stations (114) are arranged adjacently to one another and/or are parts of treatment units (106), extending in parallel to one another, or treatment lines of the treatment plant (100).

76. Treatment plant (100) according to one of embodiments 69 through 75, characterized in that the treatment plant (100) comprises a main conveying path (118) which extends in a main conveying direction (116) and along which the workpieces (102) can be conveyed by means of the conveying device (110) from a treatment station (114) to a further treatment station (114), wherein the main conveying path (118) comprises one or more tunnel sections (120) for housing the main conveying path (118), wherein one or more tunnel sections (120), and in particular one or more tunnel sections (120) arranged along the main conveying direction (116) between two treatment stations (114), have a cleaning station (122) and/or flushing station (126) and/or spraying station (124).

77. Treatment plant (100) according to one of embodiments 69 through 76, characterized in that one or more cleaning stations (122) and/or flushing stations (126) and/or spraying stations (124) are arranged or formed on one or more transfer stations (210).

78. Treatment plant (100) according to one of embodiments 69 through 77, characterized in that the treatment plant (100) comprises at least two treatment stations (114) for performing the same treatment process, and in that a distributor device (112) or a combining device (130) are arranged in front of and/or after these treatment stations (114) with respect to a main conveying direction (116) of the workpieces (102).

79. Treatment plant (100) according to embodiment 78, characterized in that the distributor device (112) and/or the combining device (130) are respectively designed as a transverse displacement device (208).

80. Treatment plant (100) according to one of embodiments 69 through 79, characterized in that the treatment plant (100) comprises one or more treatment stations (114) for performing flooding processes and one or more treatment stations (114) for performing dipping processes.

81. Treatment plant (100) according to embodiment 80, characterized in that
- a) the one or more treatment stations (114) for performing flooding processes are used for pretreating, and in particular cleaning, degreasing, and/or phosphating, the workpieces (102); and/or
- b) the one or more treatment stations (114) for performing dipping processes are used for coating, and in particular painting, the workpieces (102).

82. Method for treating workpieces (102), and in particular for cleaning and/or coating vehicle bodies (104), wherein in particular one or more treatment stations (114) according to one of embodiments 1 through 43 and/or one or more treatment plants (100) according to one of embodiments 44 through 81 are used.

83. Method—in particular, according to embodiment 82—wherein the method comprises the following:
- introducing a workpiece (102) into a treatment chamber (148) of a treatment container (136);

flooding the treatment chamber (148) with a fluid for performing a workpiece treatment, wherein the fluid is guided a) from the fluid tank (134) into the treatment container (136) in order to flood the treatment chamber (148); and/or b) from the treatment container (136) into the fluid tank (134) in order to empty the treatment chamber (148).

84. Method—in particular, according to one of embodiments 82 or 83—wherein the method comprises the following:

introducing one or more workpieces (102) into one or more treatment chambers (148) of one or more treatment stations (114);

flooding the one or more treatment chambers (148) with a fluid for performing the treatment, wherein, by means of a fluid guide (140), the fluid is guided a) from the fluid tank (134) into the respective treatment chamber (148) in order to flood one or more treatment chambers (148); and/or b) from the respective treatment chamber (148) into the fluid tank (134) in order to empty the treatment chambers (148).

85. Method according to one of embodiments 82 through 84, characterized in that the fluid is successively, and in particular completely staggered in time, a) removed from the fluid tank (134) and fed to one or more treatment chambers (148), and b) thereafter, and in particular subsequently or at a later time, e.g., after a cleaning of the fluid in a cleaning device (200), is guided back into the fluid tank (134), wherein the fluid tank (134) and/or the one or more treatment chambers (148) are thereby preferably alternately filled and emptied.

86. Method according to one of embodiments 82 through 85, characterized in that the fluid is successively, and in particular completely staggered in time, a) fed to one or more treatment chambers (148) of a treatment station (114) of a first treatment unit (106), and b) thereafter, and in particular subsequently or at a later time, e.g., after an interim storage in an interim storage tank, is fed to one or more treatment chambers (148) of a treatment station (114) of a second treatment unit (106).

87. Method—in particular, according to one of embodiments 82 through 86—for treating workpieces (102), and in particular for cleaning and/or coating vehicle bodies (104), wherein the method comprises the following:

introducing a workpiece (102) through an access opening (158) of a treatment container (136) into a treatment chamber (148) of the treatment container (136);

closing the access opening (158) of the treatment container (136) by means of a closing device (164);

flooding the treatment chamber (148) with a fluid for performing a workpiece treatment.

88. Method—in particular, according to one of embodiments 82 through 87—for treating workpieces (102), and in particular for cleaning and/or coating vehicle bodies (104), wherein the method comprises the following:

conveying one or more workpieces (102) by means of a conveying device (110);

introducing the one or more workpieces (102) into a treatment chamber (148) of a treatment station (114) for performing a treatment step;

flooding the treatment chamber (148) with a fluid;

removing the fluid and discharging the workpieces (102) from the treatment chamber (148) by means of the conveying device (110), wherein the workpieces (102) are introduced into the treatment chamber (148) and discharged from the same in particular in an at least approximately horizontal direction.

89. Method—in particular, according to one of embodiments 82 through 88—for treating workpieces (102), characterized in that the workpieces (102) are conveyed along a main conveying direction (116) from one treatment station (114) to the next and are introduced into the treatment chambers (148) of the treatment stations (114) in an introduction direction (182) extending transversely, and in particular perpendicularly, to the main conveying direction (116).

90. Method—in particular, according to one of embodiments 82 through 89—for treating workpieces (102), and in particular for cleaning and/or coating vehicle bodies (104), wherein the method comprises the following:

introducing a workpiece (102) into a treatment chamber (148) of a treatment container (136);

flooding the treatment chamber (148) with a fluid for performing a workpiece treatment, wherein the flooding is supported by means of one or more installation elements (188) that are arranged or can be arranged in the treatment chamber (148).

91. Method—in particular, according to one of embodiments 82 through 90—for treating workpieces (102), and in particular for cleaning and/or coating vehicle bodies (104), wherein the method comprises the following:

conveying one or more workpieces (102) by means of a conveying device (110);

introducing the one or more workpieces (102) into a treatment chamber (148) of a treatment station (114) for performing a treatment step;

flooding the treatment chamber (148) with a fluid;

removing the fluid and discharging the workpieces (102) from the treatment chamber (148) by means of the conveying device (110), wherein, by means of the conveying device (110), in an emptied state of the respective treatment chamber (148), the workpieces (102) are introduced into the same through an access opening (158) designed as an introduction opening (160) and by means of which, in an emptied state of the respective treatment chamber (148), the workpieces (102) are discharged from the same through an access opening (158) designed as a discharge opening (162), wherein the introduction opening (160) and the discharge opening (162) are distinct access openings (158).

92. Method according to embodiment 91, characterized in that the workpieces (102) are conveyed, in a longitudinal orientation (202) of the same, along a main conveying direction (116) from one treatment station (114) to the next and are conveyed through the treatment chambers (148) of the treatment stations (114) in the same longitudinal orientation (202).

LIST OF REFERENCE SIGNS

100 Treatment plant
102 Workpiece
104 Vehicle body
106 Treatment unit
108 Feeding station
110 Conveying device

112 Distributor device
114 Treatment station
116 Main conveying direction
118 Main conveying path
120 Tunnel section
122 Cleaning station
124 Spraying station
126 Flushing station
128 Removal station
130 Combining device
132 Transverse orientation
134 Fluid tank
136 Treatment container
138 Collecting element
140 Fluid guide
142 Feed line
144 Valve device
146 Bottom region
148 Treatment chamber
150 Bottom wall
152 Ceiling wall
154 Side wall
156 Front wall
158 Access opening
160 Introduction opening
162 Discharge opening
164 Closing device
166 Closing element
168 Closing drive
170 Lifting device
172 Lock gate
174 Guiding device
176 Guiding device
178 Accommodation device
180 Skid
182 Introduction direction
184 Horizontal direction
186 Discharge line
188 Installation element
190 Displacement element
192 Support element
194 Inflow region
196 Counter tank
198 Pump device
200 Cleaning device
202 Longitudinal orientation
204 Turntable
206 End
208 Transverse displacement device
210 Transfer station
212 Dip tank
214 Folding element
216 Collecting funnel
218 Collecting container
220 Drive unit
222 Guide path section
224 Coupling device
226 Outer side
228 Side wall
230 Through-opening
232 Coupling element
234 Pulling element
236 Tensioning element
238 Sensor device
240 Sensor element
242 Transducer element
244 Coupling rod
g Direction of gravity

The invention claimed is:

1. Treatment plant for treating workpieces, comprising:
treatment stations for treating the workpieces,
wherein each treatment station includes at least one treatment container surrounding a treatment chamber for accommodating the workpieces,
wherein each treatment station separately, or one or more treatment stations jointly, include a fluid tank for accommodating a fluid which is a liquid, and
wherein the treatment stations include a fluid guide, by which the fluid can be guided
a) from the fluid tank into the respective treatment container to flood one or more treatment chambers; and/or
b) from the respective treatment container into the fluid tank to empty the treatment chambers, and
wherein the treatment chamber is configured to be filled with the fluid during flooding to a maximum filling-height selected according to a workpiece geometry and/or position.

2. Treatment plant according to claim 1, wherein the treatment plant includes several first treatment stations for performing a first treatment step and several second treatment stations for performing a second treatment step, wherein one or more first treatment stations and one or more second treatment stations respectively are part of or form a treatment unit of the treatment plant that is passed through by the workpieces in order to perform the treatment steps.

3. Treatment plant according to claim 2, wherein the treatment plant includes several treatment units which respectively include one or more first treatment stations and one or more second treatment stations,
a) wherein one or more first treatment stations of distinct treatment units have a common fluid guide and/or a common fluid tank; and/or
b) wherein one or more second treatment stations of distinct treatment units have a common fluid guide and/or a common fluid tank.

4. Treatment plant according to claim 2, wherein a first treatment fluid can be fed, by the fluid guide, first a) to one or more treatment chambers of first treatment stations of a first treatment unit, and thereafter b) to one or more treatment chambers of first treatment stations of a second treatment unit.

5. Treatment plant according to claim 2, wherein a second treatment fluid can be fed, by the fluid guide, first a) to one or more treatment chambers of second treatment stations of a first treatment unit, and thereafter b) to one or more treatment chambers of second treatment stations of a second treatment unit.

6. Treatment plant according to claim 2, wherein the fluid can alternately be fed, by the fluid guide, to treatment chambers of distinct treatment units.

7. Treatment plant according to claim 1, wherein the fluid guide is connected to a cleaning device so that the fluid can be cleaned after removal from one of the treatment chambers and/or before a new feeding to a further one of the treatment chambers.

8. Treatment plant according to claim 1, wherein a total quantity of a fluid contained overall in a fluid guide is at most twice a quantity of the fluid required for performing a single flooding process in a treatment chamber.

9. Treatment plant according to claim 2, wherein treatment stations of a treatment unit are arranged on a common level of the treatment plant.

10. Treatment plant according to claim 2, wherein several treatment units of the treatment plant are arranged on distinct levels of the treatment plant.

11. Treatment plant according to claim 2, wherein one or more treatment stations of distinct treatment units of the treatment plant, which have a common fluid guide and/or which serve to perform the same treatment step, are arranged one above the other along a direction of gravity (g).

12. Treatment plant according to claim 1, wherein the treatment plant includes several fluid guides for guiding distinct treatment fluids, wherein the fluid guides are assigned to distinct treatment stations for performing different treatment steps.

13. Method for treating workpieces, the method comprising:

introducing one or more workpieces into one or more treatment chambers of one or more treatment stations;

flooding the one or more treatment chambers with a fluid, which is a liquid, for performing the treatment, wherein, by a fluid guide, the fluid is guided:

a) from a fluid tank into the respective treatment chamber in order to flood one or more treatment chambers; and/or b) from the respective treatment chamber into the fluid tank in order to empty the treatment chambers, and wherein the treatment chamber is configured to be filled with the fluid during flooding to a maximum filling-height selected according to a workpiece geometry and/or position.

14. Method according to claim 13, wherein the fluid is successively, a) removed from the fluid tank and fed to one or more treatment chambers, and b) thereafter is guided back into the fluid tank, wherein the fluid tank and/or the one or more treatment chambers are thereby preferably alternately filled and emptied.

15. Method according to claim 13, wherein the fluid is successively staggered in time, a) fed to one or more treatment chambers of a treatment station of a first treatment unit, and b) thereafter, and in particular subsequently or at a later time is fed to one or more treatment chambers of a treatment station of a second treatment unit.

* * * * *